(12) United States Patent
Yoshida

(10) Patent No.: US 8,874,573 B2
(45) Date of Patent: Oct. 28, 2014

(54) INFORMATION PROCESSING APPARATUS, INFORMATION PROCESSING METHOD, AND PROGRAM

(75) Inventor: Kaoru Yoshida, Kanagawa (JP)

(73) Assignee: Sony Corporation, Tokyo (JP)

(*) Notice: Subject to any disclaimer, the term of this patent is extended or adjusted under 35 U.S.C. 154(b) by 231 days.

(21) Appl. No.: 13/085,059

(22) Filed: Apr. 12, 2011

(65) Prior Publication Data

US 2011/0289109 A1 Nov. 24, 2011

(30) Foreign Application Priority Data

May 21, 2010 (JP) ................................. 2010-117259

(51) Int. Cl.
  *G06F 17/30* (2006.01)
(52) U.S. Cl.
  CPC .............. *G06F 17/30985* (2013.01)
  USPC ............ 707/736; 707/749; 707/756; 707/769
(58) Field of Classification Search
  USPC .................... 707/736, 749, 756, 769
  See application file for complete search history.

(56) References Cited

U.S. PATENT DOCUMENTS

| | | | | |
|---|---|---|---|---|
| 6,018,735 | A * | 1/2000 | Hunter ........................... | 1/1 |
| 7,925,652 | B2 * | 4/2011 | Merz et al. ................... | 707/727 |
| 8,035,858 | B2 * | 10/2011 | Matoba ......................... | 358/2.1 |
| 8,150,181 | B2 * | 4/2012 | Bruna et al. .................. | 382/236 |
| 8,180,161 | B2 * | 5/2012 | Haseyama .................... | 382/224 |
| 8,244,739 | B2 * | 8/2012 | Iwamoto et al. ............. | 707/749 |
| 8,401,308 | B2 * | 3/2013 | Nakamura et al. ........... | 382/209 |
| 8,411,954 | B2 * | 4/2013 | Takagi et al. ................ | 382/181 |
| 8,676,818 | B2 * | 3/2014 | Curbera et al. .............. | 707/755 |
| 2007/0025615 | A1 * | 2/2007 | Zhou et al. ................... | 382/173 |
| 2007/0292014 | A1 * | 12/2007 | Nakatani ...................... | 382/141 |
| 2008/0263663 | A1 * | 10/2008 | Ide et al. ....................... | 726/22 |
| 2008/0294651 | A1 * | 11/2008 | Masuyama et al. .......... | 707/100 |
| 2009/0167958 | A1 * | 7/2009 | Wredenhagen .............. | 348/699 |
| 2009/0171955 | A1 | 7/2009 | Merz et al. | |
| 2010/0191723 | A1 * | 7/2010 | Perez et al. .................. | 707/723 |
| 2011/0288836 | A1 * | 11/2011 | Lacaille et al. .............. | 703/2 |
| 2012/0232865 | A1 * | 9/2012 | Maucec et al. ............... | 703/2 |

FOREIGN PATENT DOCUMENTS

WO    WO 2009/085555 A2    7/2009

* cited by examiner

*Primary Examiner* — Hanh Thai
(74) *Attorney, Agent, or Firm* — Oblon, Spivak, McClelland, Maier & Neustadt, L.L.P.

(57) ABSTRACT

An information processing apparatus according to the present invention includes a data retrieval unit for obtaining at least two element data, a dissimilarity calculation unit for calculating a dissimilarity between the element data obtained by the data retrieval unit, a transition cost calculation unit for calculating a cost of transition from one of the element data obtained by the data retrieval unit to another of the element data thereof which is different therefrom, and a distance calculation unit for calculating an element distance representing the degree of dissimilarity between the element data by using the dissimilarity calculated by the dissimilarity calculation unit and the transition cost calculated by the transition cost calculation unit.

14 Claims, 29 Drawing Sheets

| d | j | 0 | 1 | 2 | 3 | 4 | 5 | 6 |
|---|---|---|---|---|---|---|---|---|
|   | k | 0 | 1 | 0 | 1 | 0 | 1 | 0 |
| i | D |   | F | o | r | u | m | s |
| 0 |   | -1 | 1 | 1 | 1 | 1 | 1 | 1 |
|   |   |   | 0 | 1 | 2 | 3 | 4 | 5 | 6 |
| 1 | f | 1 | 0.4 | 1 | 1 | 1 | 1 | 1 |
|   |   |   | 1 | 0.4 | 1.64 | 2.64 | 3.64 | 4.64 | 5.64 |
| 2 | o | 1 | 1 | 0 | 1 | 1 | 1 | 1 |
|   |   |   | 2 | 1.64 | 0.6 | 2 | 3 | 4 | 5 |
| 3 | r | 1 | 1 | 1 | 0 | 1 | 1 | 1 |
|   |   |   | 3 | 2.64 | 2 | 0.6 | 2 | 3 | 4 |
| 4 | m | 1 | 1 | 1 | 1 | 1 | 0 | 1 |
|   |   |   | 4 | 3.64 | 3 | 2 | 2 | 2.5 | 3.9 |

Level 2

| d2 | j | | 0 | | 1 | | 2 | | 3 | | |
|---|---|---|---|---|---|---|---|---|---|---|---|
| | k | | 0 | | 1 | | 0 | | 1 | | |
| D i | D2 | | | | Parent | | Education | | Forums | | d3 |
| 0 | | -1 | | 1 | | 1 | | 1 | | | |
| | | | 0 | | 1 | | 2 | | 3 | | |
| 1 | patent | 1 | | 0.66 | | 0.98 | | 1.00 | | | |
| | | | 1 | 2.50 | 0.66 | 7.90 | 1.77 | 6.00 | 2.78 | | |
| 2 | application | 1 | | 1.00 | | 0.69 | | 1.00 | | | |
| | | | 2 | 10.84 | 1.80 | 5.50 | 1.37 | 11.00 | 2.49 | | |
| 3 | form | 1 | | 1.00 | | 1.00 | | 0.82 | | | |
| | | | 3 | 5.90 | 2.80 | 8.00 | 2.54 | 3.90 | 2.23 | 0.93 |

Level 1

| d | j | 0 | | 1 | | 2 | | 3 | | 4 | | 5 | | 6 | | |
|---|---|---|---|---|---|---|---|---|---|---|---|---|---|---|---|---|
| | k | 0 | | 1 | | 0 | | 1 | | 0 | | 1 | | 0 | | |
| i | D | | | F | | o | | r | | u | | m | | s | | d2 |
| 0 | | -1 | | 1 | | 1 | | 1 | | 1 | | 1 | | 1 | | |
| | | | 0 | | 1 | | 2 | | 3 | | 4 | | 5 | | 6 | |
| 1 | f | 1 | | 0.4 | | 1 | | 1 | | 1 | | 1 | | 1 | | |
| | | | 1 | | 0.4 | | 1.64 | | 2.64 | | 3.84 | | 4.84 | | 5.64 | |
| 2 | o | 1 | | 1 | | 0 | | 1 | | 1 | | 1 | | 1 | | |
| | | | 2 | | 1.64 | | 0.6 | | 2 | | 3 | | 4 | | 5 | |
| 3 | r | 1 | | 1 | | 1 | | 0 | | 1 | | 1 | | 1 | | |
| | | | 3 | | 2.64 | | 2 | | 0.6 | | 2 | | 3 | | 4 | |
| 4 | m | 1 | | 1 | | 1 | | 1 | | 1 | | 0 | | 1 | | |
| | | | 4 | | 3.64 | | 3 | | 2 | | 2 | | 2.5 | | 3.9 | 0.82 |

FIG. 16

| d2 | j | 1 | 2 | 3 | |
|---|---|---|---|---|---|
| | k | 1 | 0 | 1 | |
| D | | Parent | Education | Forums | d4 |
| i | | | | | |
| 1 | patent | 0.66 | 0.98 | 1.00 | |
| | | 2.50 | 7.90 | 6.00 | |
| 2 | application | 1.00 | 0.69 | 1.00 | |
| | | 10.84 | 5.50 | 11.00 | |
| 3 | form | 1.00 | 1.00 | 0.82 | |
| | | 5.90 | 9.00 | 3.90 | |
| | dmin | 0.66 | 0.69 | 0.82 | |
| | Dsum | 0.66 | 1.35 | 2.17 | 0.72 |

| d | j | 0 | 1 | 2 | 3 | 4 | 5 | 6 | |
|---|---|---|---|---|---|---|---|---|---|
| | k | 0 | 1 | 0 | 1 | 0 | 1 | 0 | |
| i | D | | F | o | r | u | m | s | d2 |
| 0 | | -1 | 1 | 1 | 1 | 1 | 1 | 1 | |
| | | 0 | 1 | 2 | 3 | 4 | 5 | 6 | |
| 1 | f | 1 | 0.4 | 1 | 1 | 1 | 1 | 1 | |
| | | 1 | 0.4 | 1.64 | 2.64 | 3.64 | 4.64 | 5.64 | |
| 2 | o | 1 | 1 | 0 | 1 | 1 | 1 | 1 | |
| | | 2 | 1.64 | 0.6 | 2 | 3 | 4 | 5 | |
| 3 | r | 1 | 1 | 1 | 0 | 1 | 1 | 1 | |
| | | 3 | 2.64 | 2 | 0.6 | 2 | 3 | 4 | |
| 4 | m | 1 | 1 | 1 | 1 | 1 | 0 | 1 | |
| | | 4 | 3.64 | 3 | 2 | 2 | 2.5 | 3.9 | 0.82 |

FIG. 22

FIG. 24
| | | HD$_2$ | TMD$_2$ | | |
| --- | --- | --- | --- | --- | --- |
| | | $A_1=B_1=0$<br>$A_2=B_2=0$ | $A_1=B_1=0.3$<br>$A_2=B_2=0.3$ | $A_1=B_1=0.3$<br>$A_2=B_2=0$ | $A_1=0.3, B_1=0$<br>$A_2=0.3, B_2=0$ |
| (a) |  | 0 | 0 | 0 | 0 |
| (b) |  | 1 | 1.6 | 1.3 | 1 |
| (c) |  | 1 | 2.2 | 1.6 | 1.6 |
| (d) |  | 5 | 6.8 | 5.9 | 6.2 |
| (e) |  | 5 | 8.6 | 6.8 | 6.8 |
| (f) |  | 9 | 9 | 9 | 9 |

FIG. 25

| | $HD_3$ $A_1=B_1=0$ $A_2=B_2=0$ $A_3=B_3=0$ | $A_1=B_1=0.24$ $A_2=B_2=0.24$ $A_3=B_3=0.24$ | $TMD_3$ $A_1=B_1=0.24$ $A_2=B_2$ $A_3=B_3=0$ | $A_1=0.24, B_1=0$ $A_2=0.24, B_2=0$ $A_3=0.24, B_3=0$ |
|---|---|---|---|---|
| (a) | 0 | 0 | 0 | 0 |
| (b) | 1 | 1.72 | 1.48 | 1 |
| (c) | 1 | 3.44 | 1.48 | 1.72 |
| (d) | 15 | 19.32 | 17.16 | 18.88 |
| (e) | 13 | 25.98 | 17.32 | 19.48 |
| (f) | 27 | 27 | 27 | 27 |

FIG. 27

| | N18 | N16 | N02 | N01 | N05 | N17 | N03 | N08 | N09 | N06 | N10 | N13 | N14 | N11 | N19 | N07 | N15 | N20 | N12 | N04 |
|---|---|---|---|---|---|---|---|---|---|---|---|---|---|---|---|---|---|---|---|---|
| N18 | 0.000 | 0.262 | 0.254 | 0.254 | 0.291 | 0.333 | 0.300 | 0.322 | 0.313 | 0.308 | 0.309 | 0.266 | 0.267 | 0.290 | 0.361 | 0.342 | 0.318 | 0.359 | 0.351 | 0.512 |
| N16 | 0.262 | 0.000 | 0.182 | 0.158 | 0.158 | 0.192 | 0.196 | 0.190 | 0.198 | 0.195 | 0.194 | 0.184 | 0.187 | 0.220 | 0.218 | 0.212 | 0.191 | 0.302 | 0.302 | 0.551 |
| N02 | 0.255 | 0.182 | 0.000 | 0.093 | 0.143 | 0.154 | 0.120 | 0.136 | 0.131 | 0.139 | 0.141 | 0.160 | 0.159 | 0.169 | 0.193 | 0.187 | 0.191 | 0.277 | 0.310 | 0.536 |
| N01 | 0.254 | 0.158 | 0.093 | 0.000 | 0.120 | 0.150 | 0.130 | 0.143 | 0.135 | 0.139 | 0.135 | 0.147 | 0.147 | 0.154 | 0.189 | 0.183 | 0.179 | 0.297 | 0.294 | 0.540 |
| N05 | 0.291 | 0.158 | 0.143 | 0.120 | 0.000 | 0.127 | 0.147 | 0.125 | 0.120 | 0.124 | 0.120 | 0.151 | 0.151 | 0.154 | 0.151 | 0.136 | 0.142 | 0.302 | 0.296 | 0.538 |
| N17 | 0.333 | 0.192 | 0.154 | 0.150 | 0.127 | 0.000 | 0.108 | 0.102 | 0.106 | 0.102 | 0.108 | 0.124 | 0.137 | 0.167 | 0.167 | 0.154 | 0.151 | 0.270 | 0.334 | 0.521 |
| N03 | 0.300 | 0.196 | 0.120 | 0.130 | 0.147 | 0.108 | 0.000 | 0.112 | 0.108 | 0.118 | 0.141 | 0.160 | 0.158 | 0.157 | 0.177 | 0.165 | 0.188 | 0.259 | 0.336 | 0.525 |
| N08 | 0.322 | 0.190 | 0.136 | 0.143 | 0.125 | 0.102 | 0.112 | 0.000 | 0.042 | 0.086 | 0.099 | 0.125 | 0.124 | 0.115 | 0.119 | 0.143 | 0.152 | 0.278 | 0.305 | 0.500 |
| N09 | 0.313 | 0.198 | 0.131 | 0.135 | 0.120 | 0.106 | 0.108 | 0.042 | 0.000 | 0.085 | 0.099 | 0.123 | 0.122 | 0.111 | 0.119 | 0.146 | 0.154 | 0.279 | 0.312 | 0.513 |
| N06 | 0.308 | 0.195 | 0.139 | 0.139 | 0.124 | 0.102 | 0.118 | 0.086 | 0.085 | 0.000 | 0.099 | 0.112 | 0.111 | 0.105 | 0.115 | 0.126 | 0.150 | 0.298 | 0.287 | 0.514 |
| N10 | 0.309 | 0.194 | 0.141 | 0.135 | 0.120 | 0.108 | 0.141 | 0.099 | 0.099 | 0.099 | 0.000 | 0.110 | 0.111 | 0.104 | 0.114 | 0.138 | 0.133 | 0.292 | 0.294 | 0.528 |
| N13 | 0.266 | 0.184 | 0.160 | 0.147 | 0.151 | 0.167 | 0.160 | 0.125 | 0.123 | 0.112 | 0.110 | 0.000 | 0.066 | 0.120 | 0.153 | 0.172 | 0.149 | 0.311 | 0.278 | 0.513 |
| N14 | 0.267 | 0.187 | 0.159 | 0.147 | 0.151 | 0.167 | 0.158 | 0.124 | 0.122 | 0.111 | 0.111 | 0.066 | 0.000 | 0.120 | 0.156 | 0.173 | 0.149 | 0.314 | 0.282 | 0.511 |
| N11 | 0.290 | 0.220 | 0.169 | 0.154 | 0.154 | 0.154 | 0.157 | 0.115 | 0.111 | 0.105 | 0.104 | 0.120 | 0.120 | 0.000 | 0.131 | 0.146 | 0.146 | 0.306 | 0.284 | 0.516 |
| N19 | 0.361 | 0.218 | 0.193 | 0.189 | 0.151 | 0.151 | 0.177 | 0.118 | 0.119 | 0.115 | 0.114 | 0.153 | 0.156 | 0.131 | 0.000 | 0.133 | 0.169 | 0.313 | 0.286 | 0.474 |
| N07 | 0.342 | 0.212 | 0.187 | 0.183 | 0.136 | 0.138 | 0.165 | 0.143 | 0.146 | 0.126 | 0.138 | 0.172 | 0.173 | 0.146 | 0.133 | 0.000 | 0.171 | 0.306 | 0.308 | 0.494 |
| N15 | 0.318 | 0.191 | 0.191 | 0.179 | 0.142 | 0.184 | 0.188 | 0.152 | 0.154 | 0.150 | 0.133 | 0.149 | 0.149 | 0.146 | 0.169 | 0.171 | 0.000 | 0.326 | 0.287 | 0.548 |
| N20 | 0.359 | 0.302 | 0.277 | 0.297 | 0.302 | 0.270 | 0.259 | 0.278 | 0.279 | 0.298 | 0.292 | 0.311 | 0.314 | 0.306 | 0.313 | 0.311 | 0.326 | 0.000 | 0.375 | 0.563 |
| N12 | 0.351 | 0.302 | 0.310 | 0.294 | 0.296 | 0.334 | 0.336 | 0.305 | 0.312 | 0.287 | 0.294 | 0.278 | 0.282 | 0.284 | 0.286 | 0.306 | 0.287 | 0.375 | 0.000 | 0.451 |
| N04 | 0.512 | 0.551 | 0.536 | 0.540 | 0.538 | 0.521 | 0.525 | 0.500 | 0.513 | 0.514 | 0.528 | 0.513 | 0.511 | 0.516 | 0.474 | 0.494 | 0.548 | 0.563 | 0.451 | 0.000 |

INFORMATION PROCESSING APPARATUS, INFORMATION PROCESSING METHOD, AND PROGRAM

BACKGROUND OF THE INVENTION

1. Field of the Invention

The present invention relates to an information processing apparatus, an information processing method, and a program.

2. Description of the Related Art

In recent years, various kinds of information have been digitalized and stored, and the amount of the digitalized information keeps on increasing. In these circumstances, a method for efficiently retrieving necessary information from sources of stored information is desired.

Various kinds of methods for encoding a source of raw information have been invented recently. Accordingly, approximate string matching is applied to searches and analyses of not only documents but also information in a wide range of fields including encoded multimedia such as voice, music, images, and videos. In searches and analyses of encoded information, the string distance metric used in the approximate string matching greatly affects the efficiency of search processes and the adequateness of obtained search results.

Examples of widely used string distance metrics include Hamming distance applicable to two strings having the same length and Levenshtein distance (which may also be referred to as "edit distance") applicable to strings having different lengths.

At this occasion, another metric reflecting the dispersion and positions of unmatched portions has been introduced to the approximate string matching in order to improve the accuracy of a distance and efficiently separate strings. Other examples of such metrics include entropy metric and N-gram method (WO 2009/085555).

SUMMARY OF THE INVENTION

However, the entropy metric and the N-gram method described in WO 2009/085555 have an issue that their computational load is heavy even though a highly accurate distance metric is provided.

In light of the foregoing, it is desirable to provide an information processing apparatus, an information processing method, and a program capable of providing a highly accurate distance metric while suppressing the computational load.

According to an embodiment of the present invention, there is provided an information processing apparatus including a data retrieval unit for obtaining at least two element data, a dissimilarity calculation unit for calculating a dissimilarity between the element data obtained by the data retrieval unit, a transition cost calculation unit for calculating a cost of transition from one of the element data obtained by the data retrieval unit to another of the element data thereof which is different therefrom, and a distance calculation unit for calculating an element distance representing the degree of dissimilarity between the element data by using the dissimilarity calculated by the dissimilarity calculation unit and the cost calculated by the transition cost calculation unit.

The transition cost calculation unit may calculate, on the basis of a dissimilarity of a unit element constituting the element data, a first transition cost for transition from a dissimilarity having a relatively small value to a dissimilarity having a relatively large value or a second transition cost for transition from a dissimilarity having a relatively large value to a dissimilarity having a relatively small value.

The distance calculation unit may calculate the sum of the dissimilarity calculated by the dissimilarity calculation unit and the first transition cost and the second transition cost calculated by the transition cost calculation unit, and adopts the sum as the element distance.

The information processing apparatus may further include a data preprocessing unit for performing a predetermined preprocessing on the element data obtained by the data retrieval unit.

When the element data are structured data, the data preprocessing unit may divide the structured data into a plurality of structured elements, and the dissimilarity calculation unit, the transition cost calculation unit, and the distance calculation unit may perform the processing on each of the structured elements.

According to another embodiment of the present invention, there is provided an information processing method including a step for obtaining at least two element data, a step for calculating a dissimilarity between the element data obtained by the data retrieval unit, a step for calculating a cost of transition from one of the obtained element data to another of the element data thereof which is different therefrom, and a step for calculating an element distance representing the degree of dissimilarity between the element data by using the calculated dissimilarity and the calculated cost.

According to another embodiment of the present invention, there is provided a program for causing a computer to achieve a data retrieval function for obtaining at least two element data, a dissimilarity calculation function for calculating a dissimilarity between the element data obtained by the data retrieval function, a transition cost calculation function for calculating a cost of transition from one of the element data obtained by the data retrieval function to another of the element data thereof which is different therefrom, and a distance calculation function for calculating an element distance representing the degree of dissimilarity between the element data by using the dissimilarity calculated by the dissimilarity calculation function and the cost calculated by the transition cost calculation function.

As described above, according to the present invention, a highly accurate distance can be provided while suppressing the computational load.

BRIEF DESCRIPTION OF THE DRAWINGS

FIG. 8 is an explanatory diagram illustrating a specific example of the information processing method according to the embodiment;

Figures 9A, 9B, 9C, 9D, 9E, 9F, 9G:
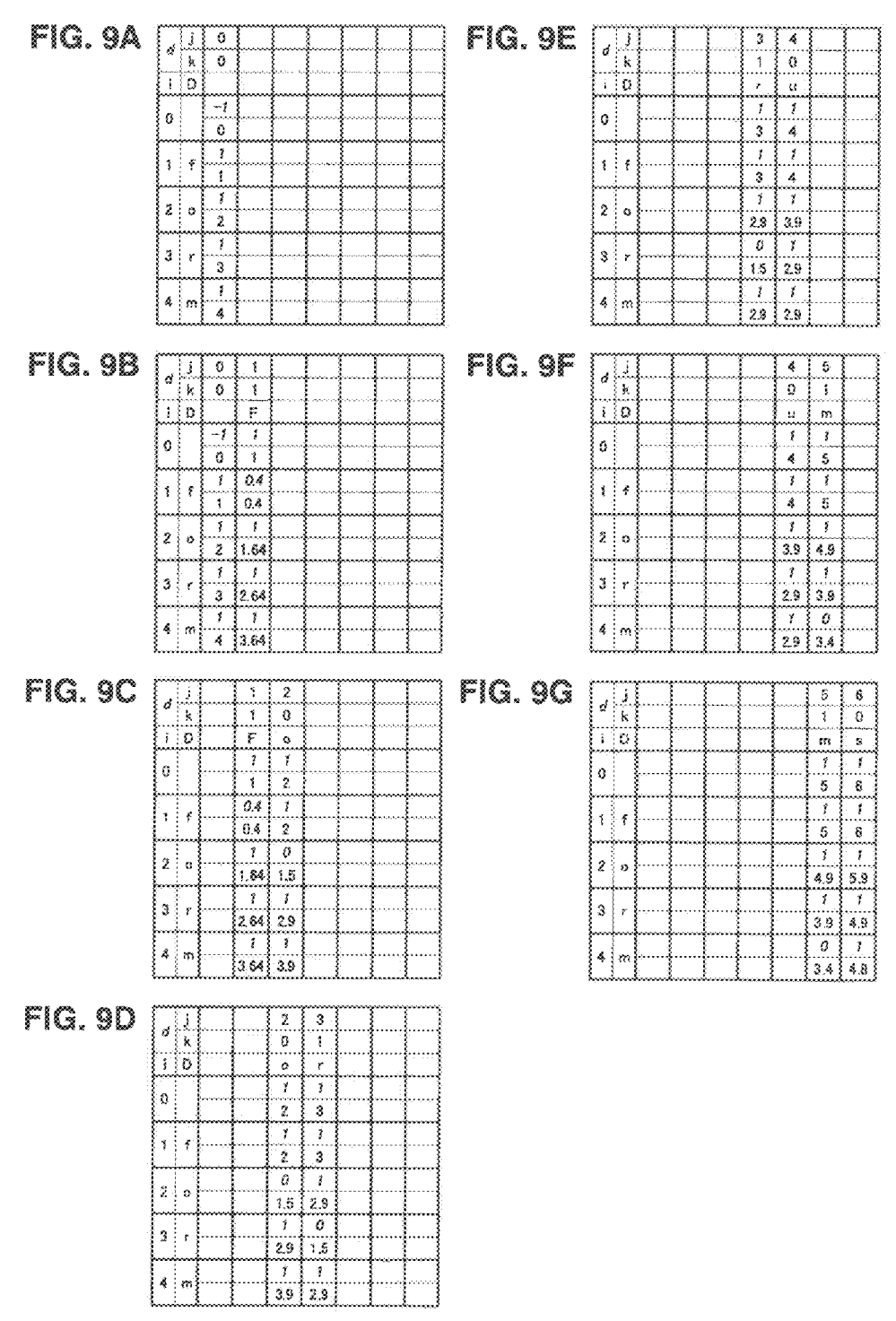

FIGS. 9A-9G are explanatory diagrams illustrating the first modification of the information processing method according to the embodiment;

FIG. 11 is an explanatory diagram illustrating the second modification of the information processing method according to the embodiment;

FIG. 16 is an explanatory diagram illustrating the third modification of the information processing method according to the embodiment;

FIG. 22 is an explanatory diagram illustrating a result of application of the information processing method according to the embodiment;

FIG. 24 is an explanatory diagram illustrating an information processing method according to the second embodiment of the present invention;

FIG. 25 is an explanatory diagram illustrating the information processing method according to the embodiment;

FIG. 27 is an explanatory diagram illustrating a result of application of the information processing method according to the embodiment;

DETAILED DESCRIPTION OF THE EMBODIMENT

Figure 1:
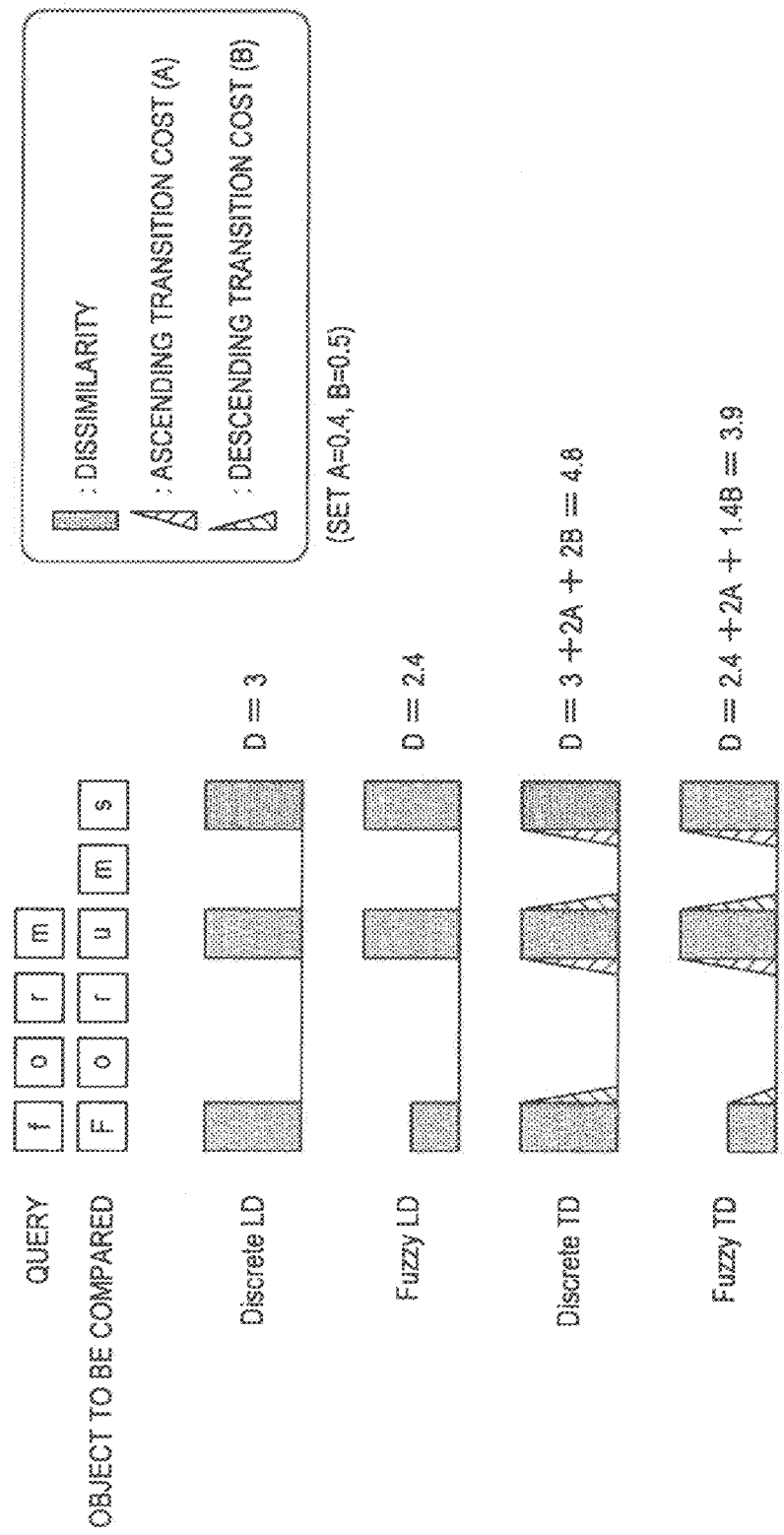
FIG. 1 is an explanatory diagram illustrating an information processing method according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The following explanation will be made in the order described below.

(1) Transition-sensitive string distance metric
  (1-1) Fundamental technique
  (1-2) Problems associated with fundamental technique
  (1-3) Overview of transition-sensitive string distance metric
  (1-4) Formulation of transition-sensitive string distance
(2) First embodiment
  (2-1) Configuration of information processing apparatus
  (2-2) Information processing method
  (2-3) First modification
  (2-4) Second modification
  (2-5) Third modification
  (2-6) Example of application of transition-sensitive string distance metric
(3) Transition-sensitive matrix metric
  (3-1) Fundamental technique and issues associated therewith
  (3-2) Overview of transition-sensitive matrix metric
  (3-3) Formulation of transition-sensitive matrix distance
(4) Second embodiment
  (4-1) Configuration of information processing apparatus
  (4-2) Information processing method
  (4-3) Example of application of transition-sensitive matrix metric
(5) Hardware configuration of information processing apparatus according to each embodiment of the present invention (Transition-Sensitive String Distance Metric)

Before explaining an information processing apparatus and an information processing method according to the first embodiment of the present invention in detail, transition-sensitive string metric according to the embodiment of the present invention will be briefly explained.

<Fundamental Technique>

First, a distance metric used in approximate string matching will be briefly explained as a technique serving as a basis of the present invention (fundamental technique).

[Hamming Distance]

One of distance metrics used in the approximate string matching is a Hamming distance (Hamming Distance: HD). The Hamming distance represents a distance metric between two strings having the same length, and is defined as the minimum number of substitutions of characters necessary for converting a string into another string.

For example, Hamming distance between a string "form" and a string "farm" will be considered. In this case, the string "form" can be converted into the string "farm" by replacing the second character "o" with "a". Therefore, the Hamming distance in this case is 1.

[Levenshtein Distance]

The Hamming distance is a distance metric defined for strings having the same length. On the other hand, one of distance metrics for two strings having different lengths is Levenshtein distance (LD). The Levenshtein distance is also referred to as the edit distance, and is defined as the minimum total number of deletions, insertions, and substitutions of characters necessary for converting one string into another string.

Now, dissimilarity (i.e., normalized distance) d(x, y) between two elements x, y constituting strings is defined in expression 11 as follows.

$$d(x, y) = \begin{cases} 0 & \text{if } x = y \\ 1 & \text{if } x \neq y \end{cases} \quad \text{(Expression 11)}$$

Now, when a string X having a length M and a string Y having a length N are given, the Levenshtein distance LD(X, Y) between the string X and the string Y is defined in expression 12 as follows.

$$LD(X, Y) = D[M, N] \quad \text{(Expression 12)}$$

In expression 12, D[i, j] is a distance matrix defined as follows.

$$D[i, 0] = 0 \ (0 \leq i \leq M) \quad \text{(Expression 13)}$$

$$D[0, j] = j \ (0 \leq j \leq N) \quad \text{(Expression 14)}$$

$$D[i, j] = \min \begin{cases} D[i-1, j] + 1 & \text{(deletion)} \\ D[i, j-1] + 1 & \text{(insertion)} \\ D[i-1, j-1] + \\ \quad d(Xi, Yj) & \text{(substitution)} \end{cases} \quad \text{(Expression 15)}$$

In expression 15, $0 \leq i \leq M$ and $0 \leq j \leq N$ hold, where Xi denotes the i-th character of the string X, and Yj denotes the j-th character of the string Y.

For example, two strings "forms" and "forum" are obtained by inserting one character, i.e., "s" and "u", respectively, into a string "form". Accordingly, the Levenshtein distance for either of the strings is the same value (distance 1).

Each string is divided into matched string portions and unmatched string portions on the basis of differences such as insertion, deletion, and substitution. In the above example, the string "forms" is divided into "form-s", i.e., a string "form" having a length of 4 and a character "s" having the length of 1. The string "forum" is divided into "for-u-m" including three portions, i.e., a string having the length of 3a character having a length of 1, and a character having a length of 1. No matter whether an insertion is at the end or in the middle, or no matter whether an unmatched portion is at one location or unmatched portions are dispersed, the Levenshtein distance is determined to be the same length of 1 as long as the number of unmatched characters is the same, i.e., 1.

<Problems Associated with Fundamental Technique>

In many application fields in which the approximate string matching is used, when the prefix or the suffix of a string to be examined is different from a query string, the query string is often estimated as having a high degree of relation to the string to be examined. Likewise, when a different character is inserted into a middle portion of a string to be examined, or when different characters are dispersed in the entire string to be examined, the query string is often estimated as being an independent string having a low degree of relation to the string to be examined.

For example, "forms" (form-s) is a variation of the word "form", and "forum" (for-u-m) is an independent word. A method for easily separating such a variation of a word from an independent word is highly desired in natural language processing. In order to separate a word as described above, it is important to improve the accuracy of a distance calculated by the approximate string matching.

In the past, another metric reflecting dispersion and positions of unmatched portions has been introduced to the approximate string matching in order to improve the accuracy of a distance and separate a string located at the same distance in a certain distance metric (for example, Levenshtein distance metric). Other examples of such metrics include entropy metric and N-gram method as described above.

In such a case, the entropy H is a value defined by expression 16 as follows, and is widely used as a metric representing the degree of segmentation of a string. The entropy H is used in combination with Levenshtein distance. In expression 16 below, $p_i$ denotes the degree of occupancy of the i-th segment.

$$H = -\Sigma p_i \log p_i \quad \text{(Expression 16)}$$

In the N-gram method, a frame having a length N is moved along a string. The N-gram method is widely used as a method for capturing positions of unmatched portions, and is used in combination with Levenshtein distance.

In this case, an entropy metric is calculated by collecting frequencies of segments of all the lengths in a string in question. In the N-gram method, it is necessary to measure frequencies of matched frames in a string in question. In the above method, computation cost for identifying such frequencies increases as the size of a string in question increases. Therefore, although the above method provides a highly accurate distance, the above method has an issue that the computational load is heavy.

<Overview of Transition-Sensitive String Distance Metric>

The inventor has assiduously studied this issue in order to solve the issue. As a result, the inventor has conceived of a string distance metric (transition-sensitive string distance metric) capable of calculating a highly accurate distance while suppressing the computation cost. An overview of a transition-sensitive string distance metric according to an embodiment of the present invention will be hereinafter explained with reference to FIGS. 1 and 2.

The transition-sensitive string distance metric according to the embodiment of the present invention is a string distance metric for determining a distance between two strings. In addition to the two strings, at least two environmental variables are used to calculate the distance metric.

The string in question may be a string of symbolic elements which can be quantitatively compared. A symbolic element may be either a single element or a complex element. In this case, the single element includes all kinds of symbols such as characters and codes. On the other hand, the complex element is an element including two or more single elements such as a word and a code block.

A string distance metric is calculated as follows. First, two elements are compared to determine dissimilarity between the two elements (element dissimilarity). In general, this is represented by a real number in the range between 0 and 1. Either exact matching method or fuzzy matching method can be used as the matching method of the elements. In the exact matching method, 0 is output when the two elements match each other, and 1 is output when the two elements do not match each other. In the fuzzy matching method, a real number in the range between 0 and 1 is output as the element dissimilarity. An output of 0 represents exact match. An output of 1 represents complete unmatch.

In the transition-sensitive string distance metric according to the embodiment of the present invention, not only the element dissimilarity corresponding to deletion, insertion, and substitution of an element but also transition of the element dissimilarity measured between adjacent elements are taken into consideration, and are added, as a portion of the distance, to the element dissimilarity. The transition of the element dissimilarity includes an ascending transition (in short, ascent) and a descending transition (in short, descent).

In this case, the ascending transition means a transition from a state where the element dissimilarity is a (relatively) small value to a state where the element dissimilarity is a (relatively) large value. In this case, the descending transition means a transition from a state where the element dissimilarity is a (relatively) large value to a state where the element dissimilarity is a (relatively) small value.

In other words, the transition-sensitive string distance (TD) between two strings according to the embodiment of the present invention is defined as the minimum value of the sum of the element dissimilarities corresponding to deletions, insertions, and substitutions of elements for converting one string into another string and the costs for transitions of the element dissimilarities.

Figure 2:
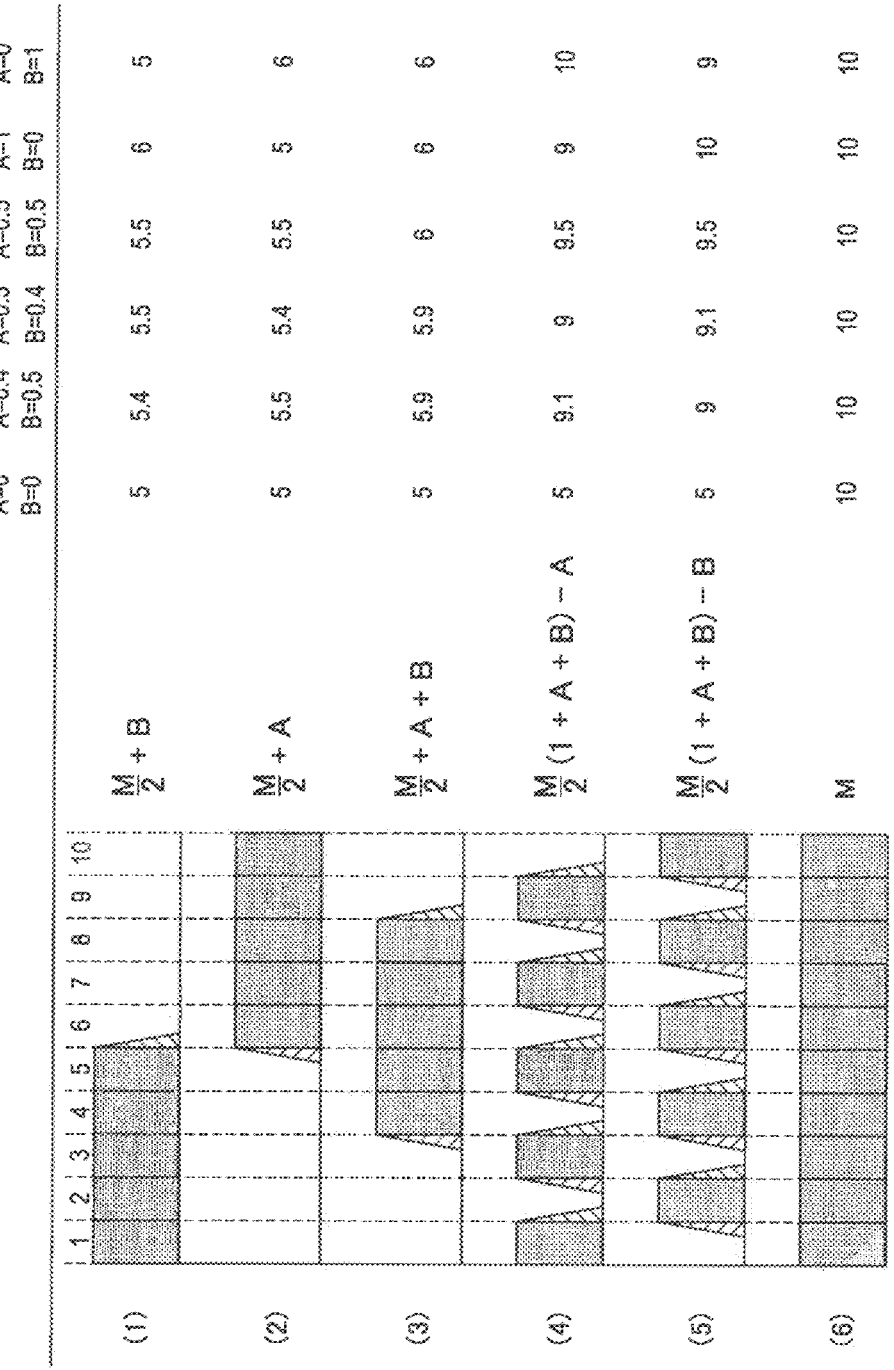
FIG. 2 is an explanatory diagram illustrating the information processing method according to the embodiment of the present invention.

Subsequently, a transition-sensitive string distance metric according to the embodiment of the present invention will be briefly explained with reference to FIGS. 1 and 2. FIGS. 1 and 2 are explanatory diagrams illustrating the information processing method according to the embodiment of the present invention.

FIG. 1 illustrates a principle for calculating a distance between two strings, i.e., "form" and "Forums", using four kinds of distance metrics, i.e., discrete LD, fuzzy LD, discrete TD, and fuzzy TD.

As described above, an LD metric (Levenshtein distance metric) is obtained by adding element dissimilarities represented as rectangles in FIG. 1. On the other hand, the TD metric (transition-sensitive string distance metric) according to the embodiment of the present invention is obtained by adding not only the element dissimilarities represented by the rectangles but also the ascending transitions and the descending transitions represented as triangles located at the sides of the rectangles representing the element dissimilarities. In other words, the LD in the related art corresponds to the total size of areas of the rectangles, whereas the TD according to the embodiment of the present invention corresponds to the total size of areas of trapezoids. In this case, in FIG. 1, the cost for the ascending transition (ascending transition cost) is denoted with A, and the cost for the descending transition (descending transition cost) is denoted with B.

Whether a distance metric is discrete or fuzzy simply means whether the element dissimilarities are made into binary values or not, which are represented as the heights of the rectangles. For example, in the discrete metric, the dissimilarity between the suffix "f" of "form" and the suffix "F" of "Forums" is deemed as 1. In the fuzzy metric, it is deemed as 0.4, for example.

As shown in FIG. 1, the discrete LD metric between the string "form" and the string "Forums" is 3, but the discrete TD metric therebetween is 4.8. These values are greatly different. Likewise, the fuzzy LD metric between the string "form" and the string "Forums" is 2.4, but the fuzzy TD metric therebetween is 3.9. These values are greatly different.

In a case of two strings, i.e., "forms" and "forum", the distance of the string "forms" with respect to the string "form" is as follows: D=1+A=1.4. The distance of the string "forum" with respect to the string "form" is as follows: D=1+A+B=1.9. In this case, the different distances can be given to the two strings.

As described above, the transition-sensitive string distance (TD) metric according to the embodiment of the present invention is characterized in that, even when strings has the same number of unmatched characters, i.e., 1, the strings are given different distances according to whether the character unmatched is located at either the first, last or middle of the string. When there are multiple unmatched characters, the distance greatly varies according to whether the unmatched characters are concentrated at a certain location or dispersed throughout the entire string.

FIG. 2 illustrates transition-sensitive string distances (TD) of six strings (1) to (6) which have the same length but are different in ratios, positions, and the degrees of dispersions of unmatched portions with respect to a string having a length M=10. In this case, when both of the ascending transition cost A and the descending transition cost B are 0, the distance is equivalent to the Levenshtein distance in the related art.

As can be seen from FIG. 2, each of the transition-sensitive string distances (TD) greatly changes according to the values of the ascending transition cost A and the descending transition cost B. As the sum A+B of the ascending transition cost A and the descending transition cost B becomes closer to 1, the distances of the strings (4) and (5) in which half of the unmatched portions are dispersed throughout the entire string become closer to the distance of the string (6) in which all the characters are different from each other, i.e., the maximum distance 10, and may even become equal thereto.

As described above, according to transition-sensitive string distance metric according to the embodiment of the present invention, a string in which different portions are dispersed throughout the string may be deemed as a string that has no relation at all like a string in which all the characters are different from each other.

<Formulation of Transition-Sensitive String Distance>

The transition-sensitive string distance (TD) having the characteristics as described above is formulated as follows.

When a string X having a length M and a string Y having a length N are given, a transition-sensitive string distance (TD) between the two strings is defined by expression 101 as follows.

$$TD(X, Y, A, B) = D[M, N] \quad \text{(Expression 101)}$$

In the above expression 101, A denotes an environmental variable representing an ascending transition cost, and B denotes an environmental variable representing a descending transition cost. In the above expression 101, $D[i, j]$ ($0 \le i \le M$, $0 \le j \le N$) is a string distance matrix, and is defined by expressions 102 to 104 as follows.

$$D[i, 0] = 0 \; (0 \le i \le M) \quad \text{(Expression 102)}$$

$$D[0, j] = j \; (0 \le j \le N) \quad \text{(Expression 103)}$$

$$D[i, j] = \min \begin{cases} D[i-1, j] + 1 + \\ t(d[i, j], d[i-1, j-1], A, B) & \text{(deletion)} \\ D[i, j-1] + 1 + \\ t(d[i, j], d[i, j-1], A, B) & \text{(insertion)} \\ D[i-1, j-1] + d[i, j] + \\ t(d[i, j], d[i-1, j-1], A, B) & \text{(substitution)} \end{cases} \quad \text{(Expression 104)}$$

In the above expression 104, $d[i, j]$ ($0 \le i \le M$, $0 \le j \le N$) is a element dissimilarity matrix, and is defined by expressions 105 to 108 as follows.

$$d[0, 0] = -1 \quad \text{(Expression 105)}$$

$$d[i, 0] = 1 \; (0 \le i \le M) \quad \text{(Expression 106)}$$

$$d[0, j] = 1 \; (0 \le j \le N) \quad \text{(Expression 107)}$$

$$d[i, j] = d(Xi, Yj) \; (1 \le i \le M, 1 \le j \le N) \quad \text{(Expression 108)}$$

In expression 108, Xi denotes the i-th element of the string X, and Yj denotes the j-th element of the string Y.

In the above expression 108, d(x, y) is a function for outputting the element dissimilarity (dissimilarity) or a normalized distance between the two elements x and y. The element dissimilarity is represented by a real number in the range between 0 to 1 as shown in expression 109 below.

$$0 \leq d(x, y) = |x-y| \leq 1 \quad \text{(Expression 109)}$$

In this case, when the element dissimilarity d(x, y) is 0, this means that the element x exactly matches the element y. When the element dissimilarity d(x, y) is 1, this means that the element x does not match the element y at all. The element dissimilarity d(x, x) between the same elements is 0.

The element dissimilarity d(x, y) may be made into a binary value using a threshold value C called a dissimilarity threshold value (dissimilarity threshold) as shown in expression 110 below.

$$d(x, y) = \begin{cases} 0 & (\text{if } |x - y| \leq C) \\ 1 & (\text{otherwise}) \end{cases} \quad \text{(Expression 110)}$$

In the above expression 104, a function t(d1, d2, A, B) is a function for outputting a cost (transition cost) for changing from a certain element dissimilarity d1 to a different element dissimilarity d2, and is represented by expression 111 as follows.

$$t(d1, d2, A, B) = \begin{cases} A \cdot (d2 - d1) & (\text{if } 0 \leq d1 \leq d2) \\ B \cdot (d1 - d2) & (\text{if } 0 \leq d2 \leq d1) \\ 0 & (\text{otherwise}) \end{cases} \quad \text{(Expression 111)}$$

In the above expression 111, the coefficient A denotes a coefficient representing the cost of the ascending transition, and the coefficient B denotes a coefficient representing the cost of the descending transition. The coefficients A and B satisfy the condition 0≤A+B≤1. This transition cost is the amount reflecting the concept of entropy.

When the two environmental variables, i.e., the ascending transition cost coefficient (ascent cost coefficient) A and the descending transition cost coefficient (descent cost coefficient) B, are given, a transition-sensitive string distance TD(X, Y, A, B) between the string X having the length M and the string Y having the length N has the following characteristics. In this case, however, binarization of the element dissimilarity with a positive threshold value (C>0) is not considered.

Characteristic 1): TD(X, Y, A, B)≥0
Characteristic 2): as long as X=Y holds, TD(X, Y, A, B)=0
Characteristic 3): TD(X, Y, A, B)=TD(Y, X, A, B)
Characteristic 4): TD(X, Z, A, B)≤TD(X, Y, A, B)+TD(Y, Z, A, B)
Characteristic 5): |M−N|+min(A, B)·sign(|M−N|)≤TD(X, Y, A, B)≤max(M, N)
Characteristic 6-1): where A1≤A2 holds, TD(X, Y, A1, B)≤TD(X, Y, A2, B)
Characteristic 6-2): where B1≤B2 holds, TD(X, Y, A, B1)≤TD(X, Y, A, B2)
Characteristic 7): LD(X, Y)=TD(X, Y, 0, 0)≤TD(X, Y, A, B)

In view of the above formulation and characteristics, an information processing apparatus and an information processing method capable of calculating the above transition-sensitive string distance will be hereinafter explained in detail.

(First Embodiment)

As described above, the Levenshtein distance is generally used as a metric for string matching in string search. As described above, when there are two strings which may have different lengths, the Levenshtein distance is defined as a total number of substitutions (or dissimilarities), insertions, and deletions of characters necessary for converting one string into another string. The Levenshtein distance does not reflect the degree of dispersion and positions of unmatched portions including differences, insertions, deletions. Therefore, with the Levenshtein distance, test strings having no relation to each other may be evaluated as having the same distance, and this may lead to an erroneous determination.

Accordingly, the inventor of the present application has conceived of a "transition-sensitive string distance metric" in which a value obtained by adding a Levenshtein distance to a total cost of transitions of adjacent element dissimilarities is adopted as a string distance so that the string distance reflects the degree of dispersion and positions of unmatched portions. When the element dissimilarity transition total cost is added, a string in which unmatched characters are randomly dispersed throughout the string is given a larger distance, so that a rank is lowered and the string is excluded from a matching group. Thus, superior separation performance can be obtained.

<Configuration of Information Processing Apparatus>

Figure 3:
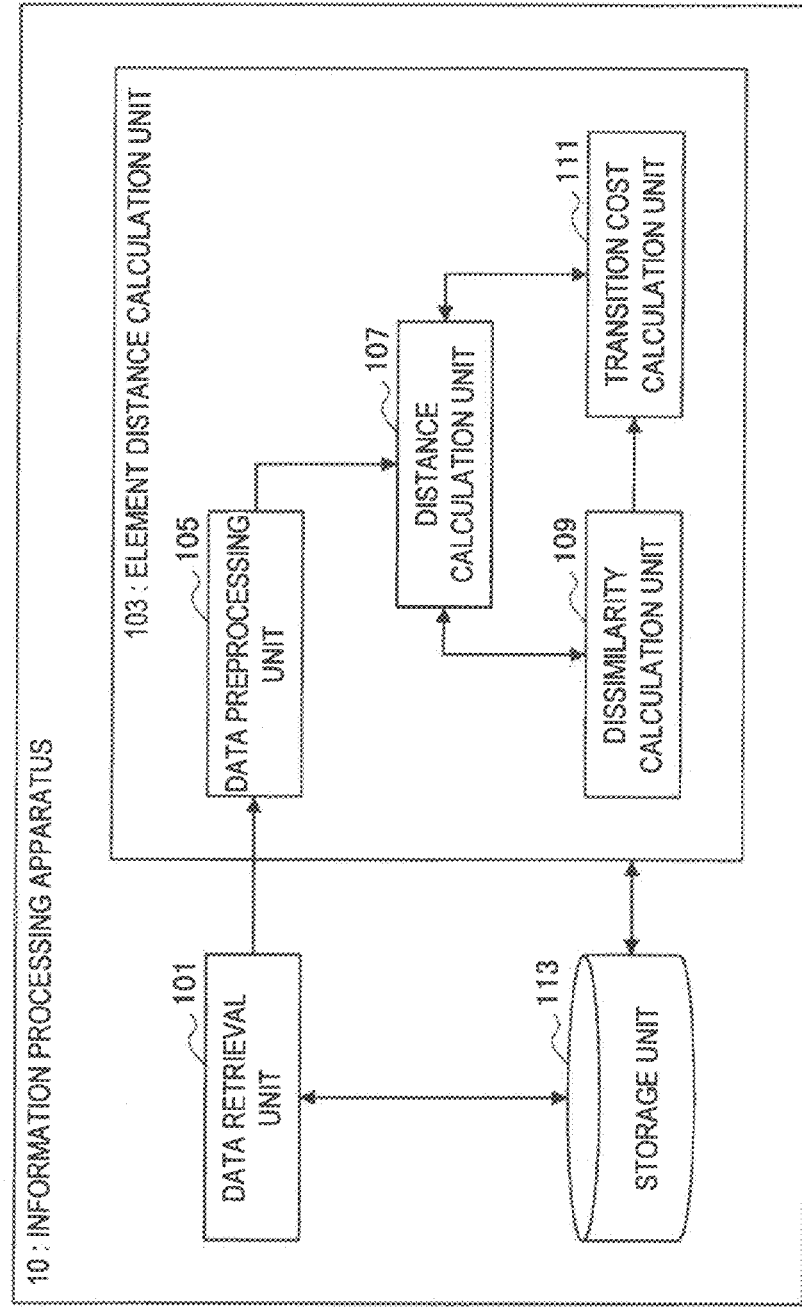
FIG. 3 is a block diagram illustrating a configuration of an information processing apparatus according to the first embodiment of the present invention.

First, configuration of an information processing apparatus according to the first embodiment of the present invention will be explained with reference to FIG. 3. FIG. 3 is a block diagram illustrating a configuration of an information processing apparatus according to the present embodiment.

As shown in FIG. 3, an information processing apparatus 10 according to the present embodiment mainly includes a data retrieval unit 101, an element distance calculation unit 103, and a storage unit 113.

The data retrieval unit 101 is achieved with, for example, a CPU (Central Processing Unit), a ROM (Read Only Memory), a RAM (Random Access Memory), an input device, a communication device, and the like. The data retrieval unit 101 obtains at least two pieces of element data for which a transition-sensitive string distance is calculated as described above. The element data obtained by the data retrieval unit 101 may be a string of symbolic elements which can be quantitatively compared, and may be in any data format. A symbolic element constituting the element data may be either a single element or a complex element.

The data retrieval unit 101 may obtain the element data from various kinds of apparatuses connected via a network such as the Internet and a home network, or may obtain the element data from various kinds of apparatuses directly connected to the information processing apparatus 10 wirelessly or via a wire. The data retrieval unit 101 may adopt, as the element data, data directly input to the information processing apparatus 10 by a user with various kinds of input devices such as a keyboard and a touch panel.

The data retrieval unit 101 outputs the obtained element data to the element distance calculation unit 103 explained later. In addition, the data retrieval unit 101 may associate the obtained element data with time information about a time and a date at which the element data are obtained, and may store the element data and the time information to, e.g., the storage unit 113 explained later.

The element distance calculation unit 103 is achieved with, for example, a CPU, a ROM, a RAM, a communication device, and the like. The element distance calculation unit 103 uses the element data output from the data retrieval unit 101 to calculate an element distance representing the degree of dissimilarity between the element data.

As shown in FIG. 3, the element distance calculation unit 103 further includes a data preprocessing unit 105, a distance calculation unit 107, a dissimilarity calculation unit 109, and a transition cost calculation unit 111.

The data preprocessing unit 105 is achieved with, for example, a CPU, a ROM, a RAM, a communication device, and the like. The data preprocessing unit 105 performs, as necessary, various kinds of preprocessing on the element data output from the data retrieval unit 101.

The preprocessing performed by the data preprocessing unit 105 is not particularly limited. For example, when element data are structured data, the preprocessing includes processing for separating the element data into a plurality of structural elements (blocks) such as words and physical blocks.

An example of such structured data includes language-like structure. Document data constituted by a plurality of sentences are characterized in having a structure. A sentence is constituted by a plurality of paragraphs. Each paragraph is constituted by a plurality of words. Each word is constituted by a plurality of characters. The data preprocessing unit 105 can divide data having language-like structure into such blocks (sentences, paragraphs, words, and the like). The data preprocessing unit 105 does not have to divide data as described above. Alternatively, the data preprocessing unit 105 may divide document data into physical units having a certain length such as pages and blocks.

The structured data are not limited to the above examples. For example, the structured data may be codes in a structured program language.

When the data preprocessing unit 105 performs the above preprocessing, the data preprocessing unit 105 may use various kinds of methods such as morphological analysis, and may use various kinds of dictionary files, databases, programs, and the like stored in the storage unit 113 later explained. Alternatively, the data preprocessing unit 105 may request various kinds of apparatuses such as various kinds of servers existing on a network capable of communicating with the information processing apparatus 10 to perform the preprocessing, and may obtain data subjected to the preprocessing from the various kinds of apparatuses.

The above preprocessing may be performed when the element data can be divided into several groups as described above. Even when the element data can be subjected to the above preprocessing, the preprocessing does not have to be performed.

When the data preprocessing unit 105 performs the preprocessing, the element data can be divided into several groups, so that the computation cost and the like can be further suppressed when the element distance explained later is calculated.

The data preprocessing unit 105 outputs the preprocessed element data to the distance calculation unit 107 explained later. Alternatively, when the data preprocessing unit 105 does not perform the preprocessing, the data preprocessing unit 105 outputs the element data given by the data retrieval unit 101 to the distance calculation unit 107 without processing the element data at all. When the element data is not subjected to the preprocessing, the element data output from the data retrieval unit 101 may be input to the distance calculation unit 103 without passing through the data preprocessing unit 105.

The distance calculation unit 107 is achieved with, for example, a CPU, a ROM, a RAM, and the like. The distance calculation unit 107 may calculate an element distance (transition-sensitive string distance: TD) representing the degree of dissimilarity between the element data while cooperating with the dissimilarity calculation unit 109 and the transition cost calculation unit 111 explained later.

The distance calculation unit 107 counts the number of elements (such as characters and numerals) constituting element data output from the data preprocessing unit 105, and sets an element dissimilarity matrix and a string distance matrix explained above. Further, the distance calculation unit 107 initializes the element dissimilarity matrix and the string distance matrix thus set.

At this occasion, the distance calculation unit 107 may store the initialized element dissimilarity matrix and the initialized string distance matrix to a predetermined location such as the storage unit 113 and the element distance calculation unit 103, so that the dissimilarity calculation unit 109, the transition cost calculation unit 111, and the like can use the element dissimilarity matrix and the string distance matrix as necessary.

Thereafter, the distance calculation unit 107 requests the dissimilarity calculation unit 109 to calculate the element dissimilarity for each element constituting the element data, and requests the transition cost calculation unit 111 to calculate the transition cost.

When the distance calculation unit 107 obtains information representing a dissimilarity output from the dissimilarity calculation unit 109, the distance calculation unit 107 stores the calculated dissimilarity to a corresponding location of the element dissimilarity matrix on the basis of the obtained information. When the distance calculation unit 107 obtains information representing a transition cost output from the transition cost calculation unit 111, the distance calculation unit 107 calculates an element distance (transition-sensitive string distance) using the obtained information and the element dissimilarity matrix on the basis of the above expression 104. The distance calculation unit 107 stores the calculated element distance to a corresponding position of the string distance matrix. When the above processing is performed to the end of the element data in question, the transition-sensitive string distance between the element data in question can be calculated.

The distance calculation unit 107 may use the calculated transition-sensitive string distance to further calculate a total dissimilarity between the two element data. A known method may be used to calculate the total dissimilarity between the element data.

In this case, elements (elements constituting element data) used by the distance calculation unit 107 are not limited to one character or numeral such as one alphabet or a numeral from "0" to "9". A set of a plurality of characters and numerals may be used as an element. For example, when element data includes a set of data enumerating certain numbers such as "100, 0.05, 40, . . . ", the distance calculation unit 107 does not further divide the set of data having meanings such as "100", "0.05", "40" into elements, i.e., "1, 0, 0, 0, 0, 5, 4, 0. . . ". In this case, the distance calculation unit 107 use the set of data such as "100", "0.05", "40" as the elements.

When the distance calculation unit 107 calculates the element distance of the element data output from the data preprocessing unit 105, the distance calculation unit 107 outputs the calculated element distance to a display unit such as a display via a display control unit (not shown) and the like. Further, the distance calculation unit 107 may output the calculated element distance to another apparatus as data. The distance calculation unit 107 may store the calculated element distance to the storage unit 113 and the like.

When the data preprocessing unit 105 divides the element data into a plurality of structured elements, the distance calculation unit 107 performs the processing for each of the structured elements, and ultimately calculates the transition-sensitive string distance of the element data themselves.

The dissimilarity calculation unit 109 is achieved with, for example, a CPU, a ROM, a RAM, and the like. The dissimilarity calculation unit 109 calculates the element dissimilarity of the elements requested by the distance calculation unit 107 (more specifically, each of the elements extracted from each piece of element data). More specifically, when the distance calculation unit 107 outputs the two elements x and y, the dissimilarity calculation unit 109 compares the elements x and y with each other to calculate the element dissimilarity d(x, y) as shown in expression 109. Thereafter, the dissimilarity calculation unit 109 outputs the calculated dissimilarity to the distance calculation unit 107 and the transition cost calculation unit 111.

The element dissimilarity d(x, y) calculated by the dissimilarity calculation unit 109 may be represented by a real number in the range between 0 and 1, or may be a binary value, i.e., either 0 or 1. Alternatively, the dissimilarity calculation unit 109 may treat alphabets case-insensitive or case-sensitive. When alphabets are treated case-sensitive, the calculated dissimilarity may be appropriately set between 0 and 1.

The transition cost calculation unit 111 is achieved with, for example, a CPU, a ROM, a RAM, and the like. Regarding element data output from the data retrieval unit 101, the transition cost calculation unit 111 calculates a cost for changing from one of the element data to another of the element data. More specifically, transition cost calculation unit 111 calculates the transition cost for changing from one of the element data to another of the element data on the basis of expression 111 for each of the elements in question. When the transition cost calculation unit 111 calculates the transition cost, the transition cost calculation unit 111 outputs the calculated transition cost to the distance calculation unit 107.

The ascending transition cost coefficient A and the descending transition cost coefficient B used for calculation of the transition cost may be set as necessary. For example, such coefficients may be stored as user setting information in advance to the element distance calculation unit 103, the storage unit 113, and the like, and may be specified by a user every time the element distance calculation unit 103 calculates a transition-sensitive string distance.

Figure 4:
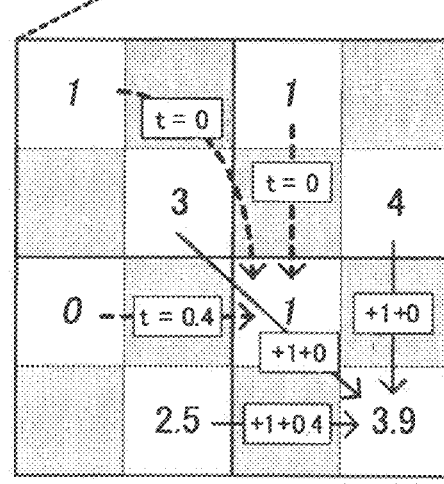
FIG. 4 is an explanatory diagram illustrating the information processing method according to the embodiment.

As described above, the distance calculation unit 107, the dissimilarity calculation unit 109, and the transition cost calculation unit 111 according to the present embodiment cooperate with each other and calculate the transition-sensitive string distance. A specific example of processing performed by the distance calculation unit 107, the dissimilarity calculation unit 109, and the transition cost calculation unit 111 will be hereinafter explained with reference to FIG. 4. FIG. 4 is an explanatory diagram illustrating a specific example of processing executed by the element distance calculation unit 103.

A table shown in FIG. 4 is a combination of the element dissimilarity matrix and the string distance matrix explained above. In FIG. 4, element data representing a string "form" and element data representing a string "Forums" are input to the element distance calculation unit 103. In the example of FIG. 4, it is assumed that the data preprocessing unit 105 does not perform the preprocessing.

When the element data representing the two kinds of strings are input to the distance calculation unit 107, the distance calculation unit 107 counts the number of elements constituting each piece of the element data. Therefore, in the example as shown in FIG. 4, the number of elements of the string "form" is determined to be 4, and the number of elements of the string "Forums" is determined to be 6.

Subsequently, the distance calculation unit 107 initializes each matrix. In the example as shown in FIG. 4, predetermined values are set in a line in which i=0 holds (a set of fields in which i=0 and j=0 to 6 hold) and a column in which j=0 holds (a set of fields in which j=0 and i=0 to 4 hold).

Thereafter, the distance calculation unit 107 requests the dissimilarity calculation unit 109 to calculate an element dissimilarity for each combination of (i, j), requests the transition cost calculation unit 111 to calculate a transition cost therefor, and stores each value thus calculated to a corresponding position of each field as shown in FIG. 4.

In this case, in FIG. 4, each field stores two numerical values. A numerical value in italic letters located at an upper left corner is a value of the element dissimilarity matrix d[i, j] calculated by the dissimilarity calculation unit 109. A numerical value located at a lower right corner is a value of a string distance matrix D[i, j] calculated using expression 104 on the basis of the element dissimilarity and the transition cost. In the example shown in FIG. 4, numerical values are shown under the following condition. The ascending transition cost coefficient A is 0.4, and the descending transition cost coefficient B is 0.5. The dissimilarity between an uppercase letter "F" and a lowercase letter "f" is calculated as 0.4.

Now, how a string distance matrix D[4, 6] stored in a field at (i, j)=(4, 6) is calculated will be explained concretely with reference to an enlarged view shown in the lower part of FIG. 4.

As can be understood from expression 104, the distance D[4, 6] is calculated from three kinds of string distance matrix values, i.e., D[3, 5], D[3, 6], D[4, 5], and four kinds of element dissimilarity matrix values, i.e., d[3, 5], d[3, 6], d[4, 5], d[4, 6].

First, transition from a field (i, j)=(3, 5) will be considered. At this occasion, both of the element dissimilarity values stored in the two fields in question are "1". Therefore, in this case, the transition cost is a value corresponding to t(1, 1, 0.4, 0.5) in expression 111. Therefore, the transition cost t is 0. Therefore, in this case, D[3, 5]+1+t(1, 1, 0.4, 0.5) is calculated, which yields 3+1+0=4.

Likewise, transition from a field (i, j)=(3, 6) will be considered. At this occasion, both of the element dissimilarity values stored in the two fields in question are "1". Therefore, in this case, the transition cost is a value corresponding to t(1, 1, 0.4, 0.5) in expression 111. Therefore, the transition cost t is 0. Therefore, in this case, D[3, 6]+1+t(1, 1, 0.4, 0.5) is calculated, which yields 4+1+0=5.

Then, transition from a field (i, j)=(4, 5) will be considered. At this occasion, the element dissimilarity matrix values stored in the two fields in question are as follows: d[4, 5]=0 and d[4, 6]=1. Therefore, in this case, the transition cost is a value corresponding to t(0, 1, 0.4, 0.5) in expression 111. Therefore, the transition cost t is 0.4×(1−0)=0.4. Therefore, in this case, D[4, 5]+1+t(0, 1, 0.4, 0.5) is calculated, which yields 2.5+1+0.4=3.9.

As can be understood from expression 104, the value of D[i, j] is the minimum value of the three types of calculated values. Accordingly, in this case, since the minimum value of (4, 5, 3.9) is "3.9", and "3.9" is the value of D[4, 6].

The specific example of processing performed by the distance calculation unit 107, the dissimilarity calculation unit 109, and the transition cost calculation unit 111 has been hereinabove explained with reference to FIG. 4. The storage unit 113 of the information processing apparatus 10 will be hereinafter explained with reference back to FIG. 3.

The storage unit 113 is an example of a storage device provided in the information processing apparatus 10 according to the present embodiment. The storage unit 113 may store element data used for calculating the transition-sensitive string distance. In addition, the storage unit 113 may store various kinds of history information such as history information about calculation of the transition-sensitive string distance and history information about retrieval of the element data. Further, this storage unit 113 may store various parameters or progress of processing that are necessary to be stored while the information processing apparatus 10 according to the present embodiment performs certain processing, and may store various kinds of databases, programs, and the like as necessary.

This storage unit 113 can be freely read and written by each processing unit of the information processing apparatus 10 according to the present embodiment.

An example of functions of the information processing apparatus 10 according to the present embodiment has been hereinabove explained. Each of the above constituent elements may be made with a generally-used part and circuit, or may be made with hardware dedicated for the function of each constituent element. Alternatively, all of the functions of the constituent elements may be performed by a CPU and the like. Therefore, the used configuration may be changed as necessary in accordance with the state of the art at the time when the present embodiment is carried out.

It is possible to create a computer program for realizing the functions of the above-described information processing apparatus according to the present embodiment, and the computer program can be implemented on a personal computer and the like. Further, a computer-readable recording medium storing such computer program can be provided. Examples of recording media include a magnetic disk, an optical disk, a magneto-optical disk, and a flash memory. Further, for example, the above computer program may be distributed through a network, without using any recording medium.

<Information Processing Method>

Figure 5:
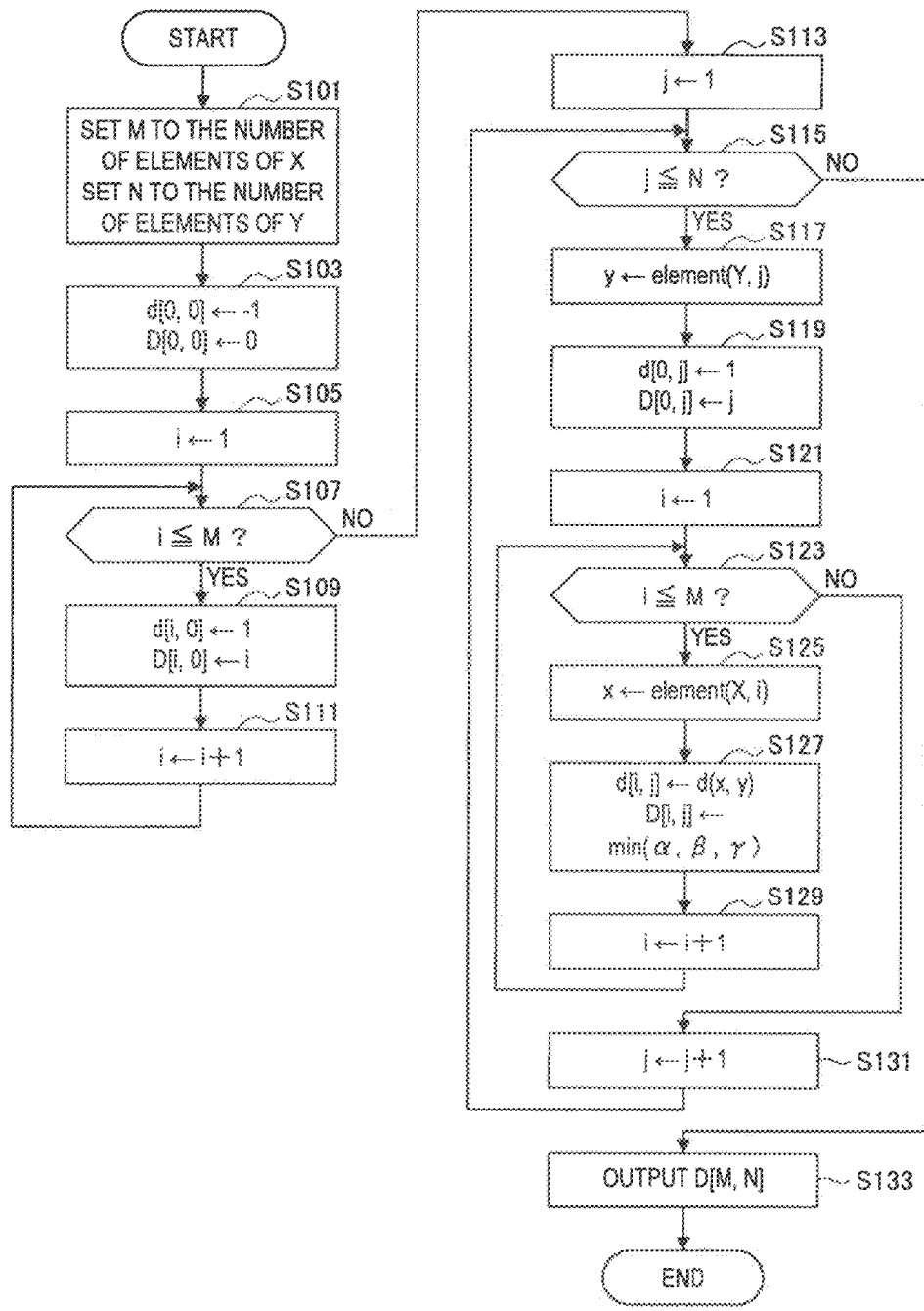
FIG. 5 is a flow diagram illustrating a flow of the information processing method according to the embodiment.
Figure 6:
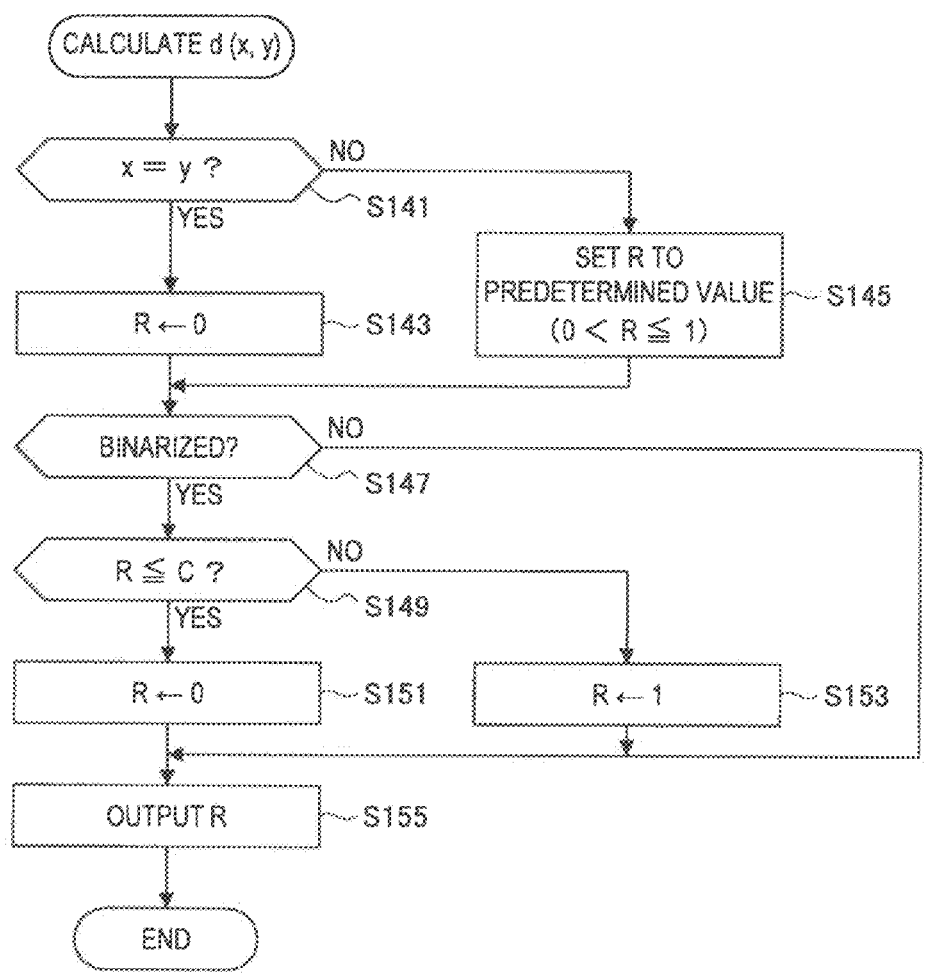
FIG. 6 is a flow diagram illustrating a flow of the information processing method according to the embodiment.
Figure 7:
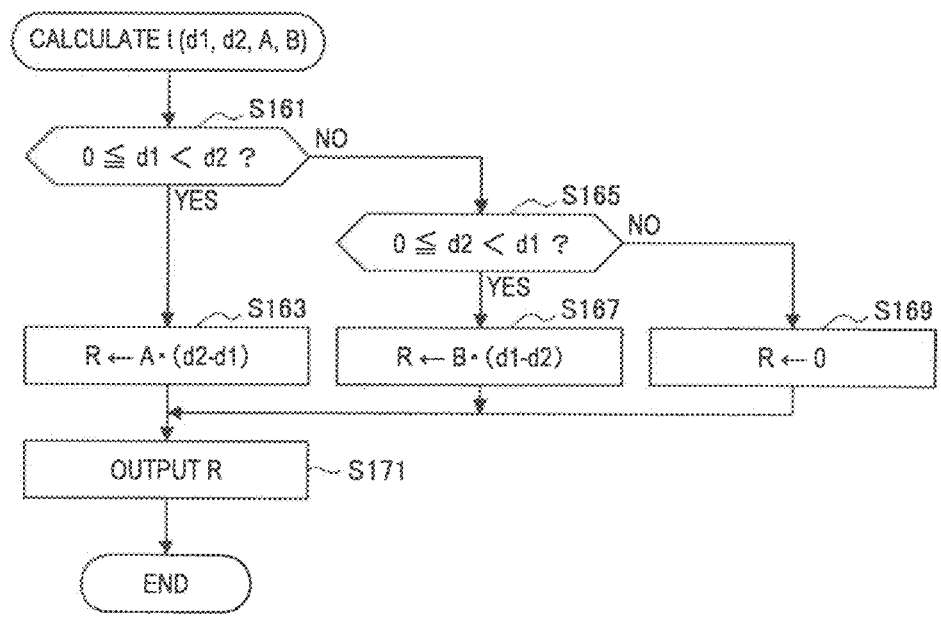
FIG. 7 is a flow diagram illustrating a flow of the information processing method according to the embodiment.

Subsequently, a flow of an information processing method according to the present embodiment (transition-sensitive string distance calculation method) will be explained with reference to FIGS. 5 to 7. FIGS. 5 to 7 are flow diagrams illustrating a flow of the information processing method according to the present embodiment.

[Calculation Processing of TD(X, Y, A, B)]

First, an overall flow of a transition-sensitive string distance calculation method according to the present embodiment will be explained with reference to FIG. 5.

When the distance calculation unit 107 obtains, from the data preprocessing unit 105 (or the data retrieval unit 101), element data X and element data Y for which a transition-sensitive string distance is to be calculated, the distance calculation unit 107 counts the number of elements constituting each piece of the element data (step S101). In this case, the distance calculation unit 107 sets the number of elements of the element data X to M, and sets the number of elements of the element data Y to N.

Subsequently, the distance calculation unit 107 initializes the values in the element dissimilarity matrix and the string distance matrix. More specifically, the distance calculation unit 107 sets the value of the element dissimilarity matrix d[0, 0] to −1, and sets a value of a string distance matrix D[0, 0] to 0 (step S103).

Subsequently, the distance calculation unit 107 sets the value of a parameter i($0 \leq i \leq M$) to 1 (step S105). This parameter i is a parameter representing the position of the element in question of the element data X with respect to the head of the data. Thereafter, the distance calculation unit 107 determines whether the value of the parameter i having been set is equal to or less than M (step S107).

When the value of the parameter i is determined to be equal to or less than M, the distance calculation unit 107 sets the value of the element dissimilarity matrix d[i, 0] to 1, and sets a value of a string distance matrix D[i, 0] to i (the value of the parameter i) (step S109). Thereafter, the distance calculation unit 107 increases the value input to the parameter i by one (step S111), and executes the processing of step S107 again.

On the other hand, when the value of the parameter i is determined not to be equal to or less than M (when the value of the parameter i is more than M), the distance calculation unit 107 sets the value of the parameter j($0 \leq j \leq N$) to 1 (step S113). This parameter j is a parameter representing the position of the element in question of the element data Y with respect to the head of the data. Thereafter, the distance calculation unit 107 determines whether the value of the parameter j is equal to or less than N (step S115).

When the value of the parameter j is determined to be equal to or less than N, the distance calculation unit 107 sets the value of the parameter y to the j-th element of the element data Y (step S117). Thereafter, the distance calculation unit 107 sets the value of the element dissimilarity matrix d[0, j] to 1, and sets a value of a string distance matrix D[0, j] to j (the value of the parameter j) (step S119).

Subsequently, the distance calculation unit 107 sets the value of the parameter i to 1 (step S121). Thereafter, the distance calculation unit 107 determines whether the value of the parameter i is equal to or less than M (step S123). When the value of the parameter i is determined to be equal to or less than M, the distance calculation unit 107 sets the value of the parameter x to the i-th element of the element data X (step S125). When the value of the parameter i is determined not to be equal to or less than M (the value of the parameter i is more than M), the distance calculation unit 107 increases the value of the parameter j by one (step S131), and executes step S115 again.

Thereafter, the distance calculation unit 107 outputs the parameter x and the parameter y to the dissimilarity calculation unit 109, and requests the dissimilarity calculation unit 109 to calculate the element dissimilarity. Further, the distance calculation unit 107 outputs the parameter i and the parameter j to the transition cost calculation unit 111, and requests the transition cost calculation unit 111 to calculate the transition cost. The dissimilarity calculation unit 109 and the transition cost calculation unit 111 look up the output parameters and the stored element dissimilarity matrix to calculate the dissimilarity and the transition cost, and output the dissimilarity and the transition cost to the distance calculation unit 107.

The distance calculation unit 107 sets the value of the element dissimilarity matrix d[i, j] to the element dissimilarity d(x, y) output from the dissimilarity calculation unit 109 (step S127). Further, the distance calculation unit 107 uses the element dissimilarity matrix, the string distance matrix, and the transition cost output from the transition cost calculation unit 111 to set the value of the string distance matrix D[i, j] to the value of min($\alpha, \beta, \gamma$) (step S127). In this case, $\alpha, \beta, \gamma$ are obtained from expressions 121 to 123 as follows.

$$\alpha = D[i-1, j] + 1 + t(d[i, j], d[i-1, j-1], A, B) \quad \text{(Expression 121)}$$

$$\beta = D[i, j-1] + 1 + t(d[i, j], d[i, j-1], A, B) \quad \text{(Expression 122)}$$

$$\gamma = D[i-1, j-1] + d[i, j] + t(d[i, j], d[i-1, j-1], A, B) \quad \text{(Expression 123)}$$

Thereafter, the distance calculation unit 107 increases the value input to the parameter i by one (step S129), and executes the processing of step S123 again.

On the other hand, when the value of the parameter j is determined not to be equal to or less than N in step S115 (when the value of the parameter j is more than N), the distance calculation unit 107 outputs the value stored in D[M, N] (step S133). Thus, the transition-sensitive string distance TD(X, Y, A, B) between the element data X and the element data Y is calculated.

[Calculation Processing d(x, y)]

Subsequently, a flow of an element dissimilarity calculation method performed by the dissimilarity calculation unit 109 will be briefly explained with reference to FIG. 6.

First, when the distance calculation unit 107 outputs the values of the parameter x and the parameter y, the dissimilarity calculation unit 109 compares the value of the parameter x and the value of the parameter y, and determines whether x=y holds or not (step S141).

When x=y holds, the dissimilarity calculation unit 109 determines that x is the same as y, and sets a value of a parameter R to 0 (step S143). On the other hand, when x=y does not hold, the dissimilarity calculation unit 109 determines that x is different from y, and sets the value of the parameter R to a predetermined value more than 0 but equal to or less than 1 (step S145). The value of the parameter R set where x is not equal to y is not particularly limited, and may be set in a range of $0 < R \leq 1$ as necessary.

Subsequently, the dissimilarity calculation unit 109 determines whether the value set in the parameter R is to be binarized or not (step S147). When the value is determined not to be binarized, the dissimilarity calculation unit 109 performs step S155 explained later. When the value is determined to be binarized, the dissimilarity calculation unit 109 determines whether the value of the parameter R is equal to or less than a predetermined threshold value C (step S149).

When the value of the parameter R is determined to be equal to or less than the threshold value C, the dissimilarity calculation unit 109 sets the value of the parameter R to 0 (step S151). When the value of the parameter R is determined to be more than the threshold value C, the dissimilarity calculation unit 109 sets the value of the parameter R to 1 (step S153).

Thereafter, the dissimilarity calculation unit 109 outputs the value set in the parameter R to the distance calculation unit 107 (step S155). Thus, the dissimilarity calculation unit 109 calculates the element dissimilarity d(x, y) between the parameter x and the parameter y. The distance calculation unit 107 stores the value of the element dissimilarity d(x, y) to the element dissimilarity matrix d[x, y].

When the value calculated in step S143 or step S145 is used without being binarized at all times, the dissimilarity calculation unit 109 does not have to execute the processing from step S147 to step S153. When the binarization is executed at all times, the dissimilarity calculation unit 109 may omit the processing of step S147.

[Calculation Processing t(d1, d2, A, B)]

Subsequently, a flow of a transition cost calculation method performed by the transition cost calculation unit 111 will be briefly explained with reference to FIG. 7.

First, when the distance calculation unit 107 outputs the parameter i and the parameter j, the transition cost calculation unit 111 obtains the value of the element dissimilarity d[i, j] output from the dissimilarity calculation unit 109. Further, the transition cost calculation unit 111 looks up the element distance matrix stored at the predetermined location, and obtains the value of d[i−1, j−1] and the value of d[i, j−1] on the basis of the parameter i and the parameter j. Thereafter, the transition cost calculation unit 111 uses the thus obtained values to calculate the values of t(d[i, j], d[i−1, j−1], A, B), t(d[i, j], d[i−1, j], A, B), and t(d[i, j], d[i, j−1], A, B) in accordance with the following flow.

A flow of calculation of the transition cost t(d1, d2, A, B) will be hereinafter explained. In the calculation of the transition cost, four kinds of arguments are used. Arguments d1 and d2 correspond to the element dissimilarity d.

When the transition cost calculation unit 111 identifies the arguments d1 and d2, the transition cost calculation unit 111 compares the magnitudes of the arguments d1 and d2. In other words, first, the transition cost calculation unit 111 determines whether an in equation $0 \leq d1 < d2$ holds or not (step S161). When $0 \leq d1 < d2$ holds, the transition cost calculation unit 111 uses the ascending transition cost coefficient A to calculate A·(d2−d1), and sets the value of the parameter R to the calculated value (step S163).

On the other hand, when $0 \leq d1 < d2$ does not hold, the transition cost calculation unit 111 further determines whether an in equation $0 \leq d2 < d1$ holds or not (step S165). When $0 \leq d2 < d1$ holds, the transition cost calculation unit 111 uses the descending transition cost coefficient B to calculate B·(d1−d2), and sets the value of the parameter R to the calculated value (step S167).

On the other hand, when $0 \leq d2 < d1$ does not hold, this means that d1=d2 holds. Accordingly, the transition cost calculation unit 111 sets the value of the parameter R to 0 (step S169).

Thereafter, the transition cost calculation unit 111 outputs the value set in the parameter R to the distance calculation unit 107 as the calculation result of the transition cost t(d1, d2, A, B) (step S171). The transition cost calculation unit 111 performs the above processing to provide the values of t(d[i, j], d[i−1, j−1], A, B), t(d[i, j], d[i−1, j], A, B), and t(d[i, j], d[i, j−1], A, B) to the distance calculation unit 107.

The flow of the information processing method according to the present embodiment has been hereinabove explained with reference to FIGS. 5 to 7. Subsequently, a specific example of the information processing method according to the present embodiment will be briefly explained with reference to FIG. 8.

Figure 8:
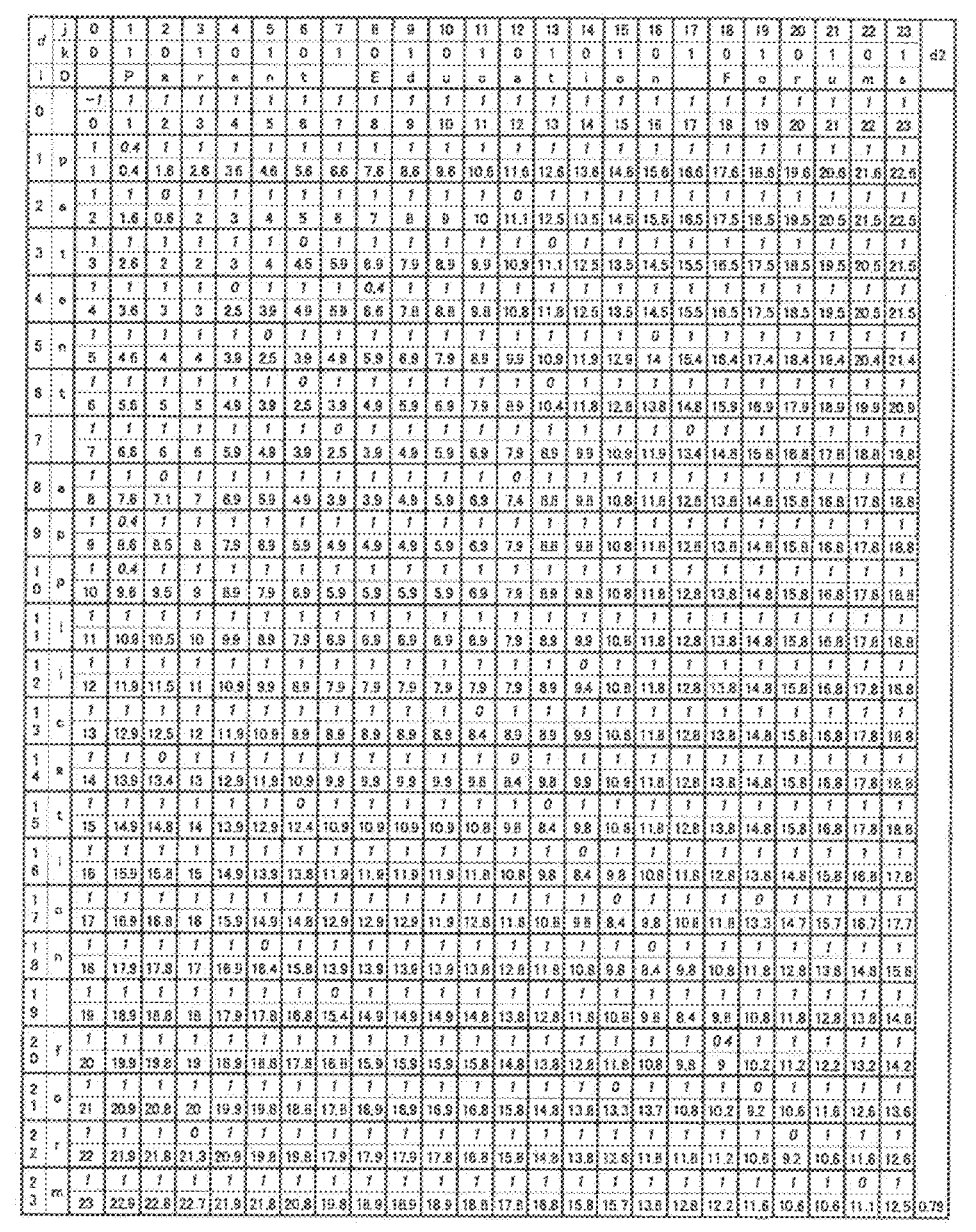

FIG. 8 is an example where the transition-sensitive string distance calculation method according to the present embodiment is applied to calculation of a string distance between two strings, i.e., "patent application form" and "Parent Education Forums". In this case, the first string "patent application form" is constituted by 23 elements including spaces, and the second string "Parent Education Forums" is also constituted by 23 elements including spaces.

In FIG. 8, two kinds of numerical values are shown in each field defined by a combination of (i, j). A numerical value in italic letters described in an upper portion is the value of the element dissimilarity matrix d[i, j]. A numerical value described in a lower portion is the value of the string distance matrix D[i, j]. The values of string distance matrix D[i, j] as shown in FIG. 8 are under the following condition. The ascending transition cost coefficient A is 0.4. The descending transition cost coefficient B is 0.5. The dissimilarity d(F, f) is 0.4.

The number of elements of the first string and the number of elements of the second string are both 23. Accordingly, the transition-sensitive string distance of these strings is equal to the value of the string distance matrix D[23, 23]. Therefore, as shown in FIG. 8, the transition-sensitive string distance of these strings is 12.5.

In the example as shown in FIG. 8, the distance calculation unit 107 calculates the entire dissimilarity (d2) between the element data. The entire dissimilarity between the element data is a so-called normalized string distance. In the example as shown in FIG. 8, the entire dissimilarity d2 between the element data is calculated as follows.

First, the larger one of the number of elements constituting the first string and the number of elements constituting the second string is set as a parameter L. In other words, the value of the parameter L is 23 in the example as shown in FIG. 8. A smaller one of the number of elements constituting the first string and the number of elements constituting the second string is set as a parameter S. In other words, the value of the parameter S is 23 in the example as shown in FIG. 8. Further, the entire dissimilarity d2 is calculated by expression 124 below using the calculated transition-sensitive string distance Ld.

$$d2 = 1 - \frac{(L - Ld)^2}{L \cdot S} \quad \text{(Expression 124)}$$

Therefore, in the example as shown in FIG. 8, the entire dissimilarity d2 is calculated as follows: $1-\{(23-12.5)^2/(23\times 23)\}=0.79$.

As described above, the above transition-sensitive string distance calculation method is the so-called whole-string matching method in which the strings are collated using the element data in question without processing the element data.

<First Modification>

The above transition-sensitive string distance calculation method is a method using the element data in question without processing the element data. Accordingly, when a string X having a length M and a string Y having a length N are processed, each of an element dissimilarity matrix d[i, j] and a string distance matrix D[i, j] is a matrix having a size of (M+1) by (N+1). In such a case, a parameter i and a parameter j have values within ranges of 0≤i≤M, 0≤j≤N, respectively. Therefore, the longer the length of the string is, the larger the storage region for storing the above two kinds of matrices is.

In this case, as can be understood from the figure shown in the lower portion of FIG. 4 and expression 104, only the values in the (j−1)th column are used to calculate the values in the j-th column in the matrices d[i, j] and D[i, j]. When the values in the (j+1)th column subsequent thereto are calculated, the values in the (j−1)th column are not used, and only the values in the j-th column are used. Therefore, as shown in FIGS. 9A-9G, the size of the element dissimilarity matrix d and the size of the string distance matrix D can be reduced to the size of 2 (M+1) with respect to the string X having the length M and the string Y having the length N. This method will be hereinafter referred to as two column processing method.

In this case, the element distance calculation unit 103 (more specifically, the distance calculation unit 107) prepares an element dissimilarity matrix d[i, k] and a string distance matrix D[i, k] each having a size of 2(M+1). In such a case, a parameter i and a parameter k have values within ranges of 0≤i≤M, 0≤k=j mod 2≤1, respectively.

[Configuration of Information Processing Apparatus]

The configuration of the information processing apparatus according to the present modification is the same as the configuration of the information processing apparatus 10 according to the first embodiment of the present invention as shown in FIG. 3. However, the transition-sensitive string distance calculation method performed by the element distance calculation unit 103 is different. The detailed description about the configuration of the information processing apparatus according to the present modification is omitted in the explanation below.

[Information Processing Method]

Figure 10:
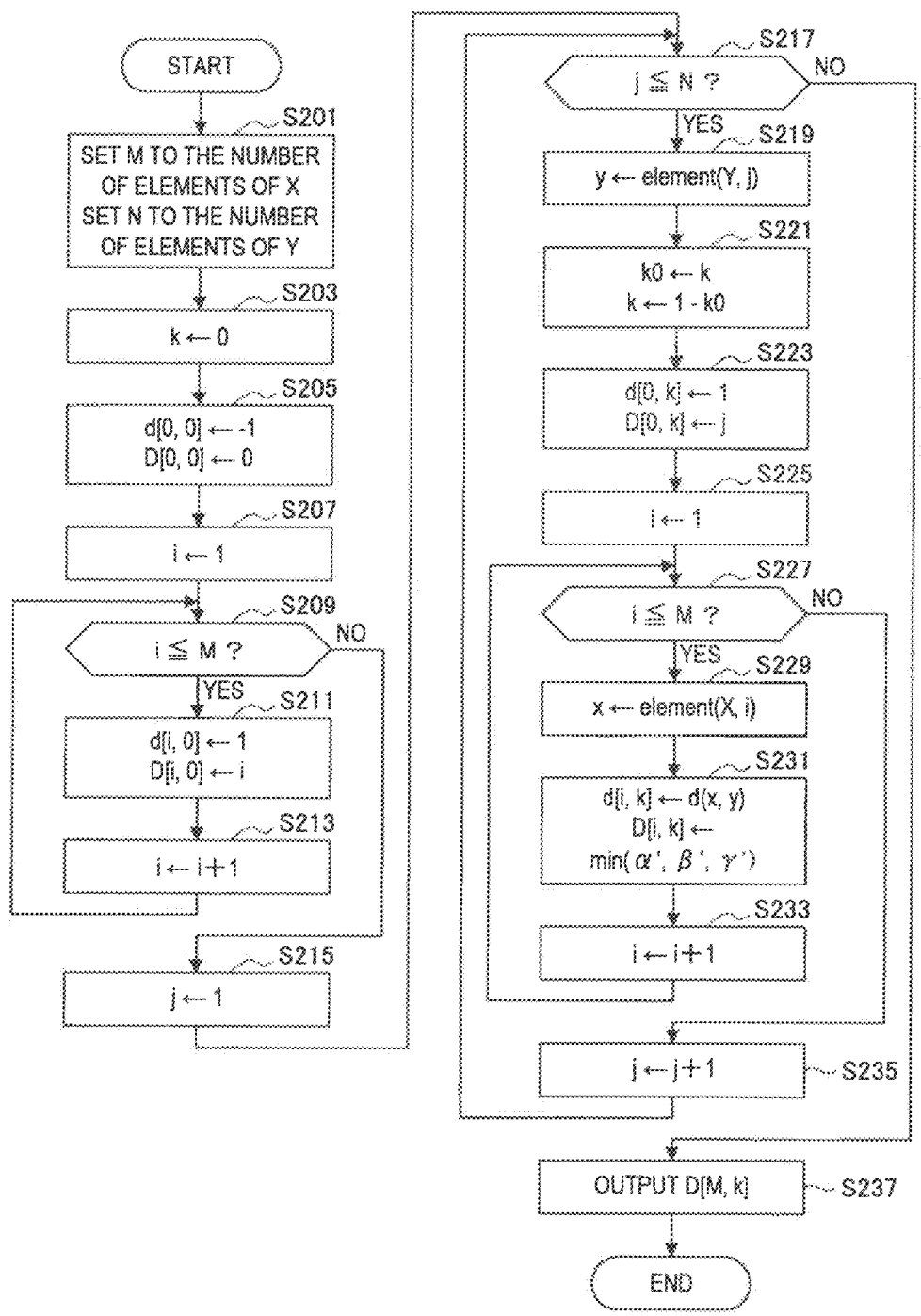
FIG. 10 is a flow diagram illustrating a flow of the first modification of the information processing method according to the embodiment.

Subsequently, a flow of the information processing method (transition-sensitive string distance calculation method) performed by the element distance calculation unit 103 according to the present modification will be explained with reference to FIG. 10. FIG. 10 is a flow diagram illustrating a flow of the transition-sensitive string distance calculation method according to the present modification.

When the distance calculation unit 107 obtains, from the data preprocessing unit 105 (or the data retrieval unit 101), element data X and element data Y for which a transition-sensitive string distance is to be calculated, the distance calculation unit 107 counts the number of elements constituting each piece of the element data (step S201). In this case, the distance calculation unit 107 sets the number of elements of the element data X to M, and sets the number of elements of the element data Y to N.

Subsequently, the distance calculation unit 107 sets the value of the parameter k to 0 (step S203), and thereafter initializes the values of the element dissimilarity matrix and the string distance matrix. More specifically, the distance calculation unit 107 sets the value of the element dissimilarity matrix d[0, 0] to −1, and sets the value of the string distance matrix D[0, 0] to 0 (step S205).

Subsequently, the distance calculation unit 107 sets the value of a parameter i(0≤i≤M) to 1 (step S207). Thereafter, the distance calculation unit 107 determines whether the value of the parameter i having been set is equal to or less than M (step S209).

When the value of the parameter i is determined to be equal to or less than M, the distance calculation unit 107 sets the value of the element dissimilarity matrix d[i, 0] to 1, and sets the value of the string distance matrix D[i, 0] to i (the value of the parameter i) (step S211). Thereafter, the distance calculation unit 107 increases the value input to the parameter i by one (step S213), and executes the processing of step S209 again.

On the other hand, when the value of the parameter i is determined not to be equal to or less than M (when the value of the parameter i is more than M), the distance calculation unit 107 sets the value of the parameter j(0≤j≤N) to 1 (step S215). Thereafter, the distance calculation unit 107 determines whether the value of the parameter j is equal to or less than N (step S217).

When the value of the parameter j is determined to be equal to or less than N, the distance calculation unit 107 sets the value of the parameter y to the j-th element of the element data Y (step S219).

Subsequently, the distance calculation unit 107 sets the value of the parameter k0 to the value of the parameter k, and sets the value of the parameter k to the value calculated from (1−k0) (step S221).

Thereafter, the distance calculation unit 107 sets the value of the element dissimilarity matrix d[0, k] to 1, and sets the value of the string distance matrix D[0, k] to j (the value of the parameter j) (step S223).

Subsequently, the distance calculation unit 107 sets the value of the parameter i to 1 (step S225). Thereafter, the distance calculation unit 107 determines whether the value of the parameter i is equal to or less than M (step S227). When the value of the parameter i is determined to be equal to or less than M, the distance calculation unit 107 sets the value of the parameter x to the i-th element of the element data X (step S229). When the value of the parameter i is determined not to be equal to or less than M (the value of the parameter i is more than M), the distance calculation unit 107 increases the value of the parameter j by one (step S235), and executes step S217 again.

Thereafter, the distance calculation unit 107 outputs the parameter x and the parameter y to the dissimilarity calculation unit 109, and requests the dissimilarity calculation unit 109 to calculate the element dissimilarity. Further, the distance calculation unit 107 outputs the parameter i and the parameter j to the transition cost calculation unit 111, and requests the transition cost calculation unit 111 to calculate the transition cost. The dissimilarity calculation unit 109 and the transition cost calculation unit 111 look up the output parameters and the stored element dissimilarity matrix to calculate the dissimilarity and the transition cost, and output the dissimilarity and the transition cost to the distance calculation unit 107.

The distance calculation unit 107 sets the value of the element dissimilarity matrix d[i, k] to the element dissimilarity d(x, y) output from the dissimilarity calculation unit 109 (step S231). Further, the distance calculation unit 107 uses the element dissimilarity matrix, the string distance matrix, and the transition cost output from the transition cost calculation unit 111 to set the value of the string distance matrix D[i, k] to the value of min($\alpha'$, $\beta'$, $\gamma'$) (step S231). In this case, $\alpha'$, $\beta'$, $\gamma'$ are obtained from expressions 131 to 133 as follows.

$$\alpha' = D[i-1, k] + 1 + t(d[i, k], d[i-1, k], A, B) \quad \text{(Expression 131)}$$

$$\beta' = D[i, k0] + 1 + t(d[i, k], d[i, k0], A, B) \quad \text{(Expression 132)}$$

$$\gamma' = D[i-1, k0] + d[i, k] + t(d[i, k], d[i-1, k0], A, B) \quad \text{(Expression 133)}$$

Thereafter, the distance calculation unit 107 increases the value input to the parameter i by one (step S233), and executes the processing of step S227 again.

On the other hand, when the value of the parameter j is determined not to be equal to or less than N in step S217 (when the value of the parameter j is more than N), the distance calculation unit 107 outputs the value stored in D[M, k] (step S237). Thus, the transition-sensitive string distance TD(X, Y, A, B) between the element data X and the element data Y is calculated.

<Second Modification>

When the element data in question include a string having a certain structure, it is desirable to use the structure to collate the test string in terms of the efficiency of calculation. Accordingly, in the hierarchical string matching method explained below, each of the strings in question is first divided into coarse grain elements such as words and physical blocks. Then, in the method according to the present modification, elements of still finer grains (fine grains) constituting the coarse grain are compared first. Subsequently, in the method according to the present modification, the above calculation result at the lower level is used to calculate a string distance at a still higher level (for example, a coarse grain element). In other words, the hierarchical string matching method explained later is a method for recursively applying the transition-sensitive string distance calculation method according to the first embodiment of the present invention.

In the example below, a string serving as element data is divided into two levels. However, the number of levels is not limited to this example, and may be two or more. When a word is used as a coarse grain element, this is referred to as an ordered word-wise matching method.

In the method explained below, the distance obtained from a string matching procedure at the lower level is converted into a dissimilarity, and the dissimilarity is given to a string matching procedure at the upper level. Thus, the calculation results obtained at the plurality of different levels are connected. The method for converting the calculated string distance into the dissimilarity may be selected as necessary, and is not particularly limited.

FIG. 11 illustrates an example where the above ordered word-wise matching method is applied to calculation of a string distance between two strings, i.e., "patent application form" and "Parent Education Forums". In the example as shown in FIG. 11, the input strings are divided into words by morphological analysis performed by the data preprocessing unit 105. Then, the distance calculation unit 107, the dissimilarity calculation unit 109, and the transition cost calculation unit 111 perform processings.

As shown in FIG. 11, in this example, each string is divided into three words. These three words are coarse grain elements, which are classified as Level 2, i.e., the upper level. Each coarse grain is constituted by elements made of alphabets (fine grain elements). Processing on these fine grain elements is processing of Level 1, i.e., the lower level.

The processing of Level 1 is performed using the method as described above so as to respectively calculate a transition-sensitive string distance D at the level "Level 1" and a dissimilarity d2 obtained by normalizing the transition-sensitive string distance D.

In the processing of Level 2, a transition-sensitive string distance between coarse grains is calculated using the dissimilarity d2 normalized and calculated in the processing of Level 1. When the obtained transition-sensitive string distance between the coarse grains is used, a normalized dissimilarity d3 of the entire string can be calculated.

Tables as shown in FIG. 11 will be explained. As explained above, the table in FIG. 11 showing the processing result at Level 1 includes both of an element dissimilarity matrix and a string distance matrix. The numerical value in italic letters located at the upper left corner of each field is the value of an element dissimilarity. The numerical value located at the lower right corner is a string distance.

The table showing the processing result of Level 2 includes three numerical values in each field. Two kinds of numerical values at the left represent a normalized dissimilarity at the lower level (numerical value at the upper left) and a string distance (numerical value at the lower right). A numerical value at the right represents a transition-sensitive string distance between coarse grains calculated in the processing of Level 2.

In this case, the processing as shown in FIG. 11 uses two levels. The processing at each level uses an ascending transition cost coefficient, a descending transition cost coefficient, and a dissimilarity between the uppercase and the lowercase of the same letter. In this case, the ascending transition cost coefficient and the descending transition cost coefficient of the processing of Level 1 are denoted with A and B, respectively. The ascending transition cost coefficient and the descending transition cost coefficient of the processing of Level 2 are denoted with A2 and B2, respectively. The values of string distance matrix D[i, j] as shown in FIG. 11 are under the following condition. The ascending transition cost coefficient A=A2=0.4. The descending transition cost coefficient B=B2=0.5. The dissimilarity d(F, f)=0.4.

[Configuration of Information Processing Apparatus]

The configuration of the information processing apparatus according to the present modification is the same as the configuration of the information processing apparatus 10 according to the first embodiment of the present invention as shown in FIG. 3. However, the transition-sensitive string distance calculation method performed by the element distance calculation unit 103 is different. The detailed description about the configuration of the information processing apparatus according to the present modification is omitted in the explanation below.

[Information Processing Method]

Subsequently, a flow of the information processing method (transition-sensitive string distance calculation method) performed by the element distance calculation unit 103 according to the present modification will be explained with reference to FIGS. 12 to 15. FIGS. 12 to 15 are flow diagrams illustrating a flow of the transition-sensitive string distance calculation method according to the present modification.

The transition-sensitive string distance calculation method at the first level (Level 1) may use the method according to the first embodiment of the present invention explained above or the method according to the first modification as necessary. Accordingly, detailed explanation about the transition-sensitive string distance calculation method at the first level (Level 1) is omitted in the following. It is assumed that the transition-sensitive string distance D and the normalized dissimilarity d2 have already been calculated in the calculation processing at the first level.

[Calculation Processing of TD2(X, Y, A, B, A2, B2)]

Figure 12:
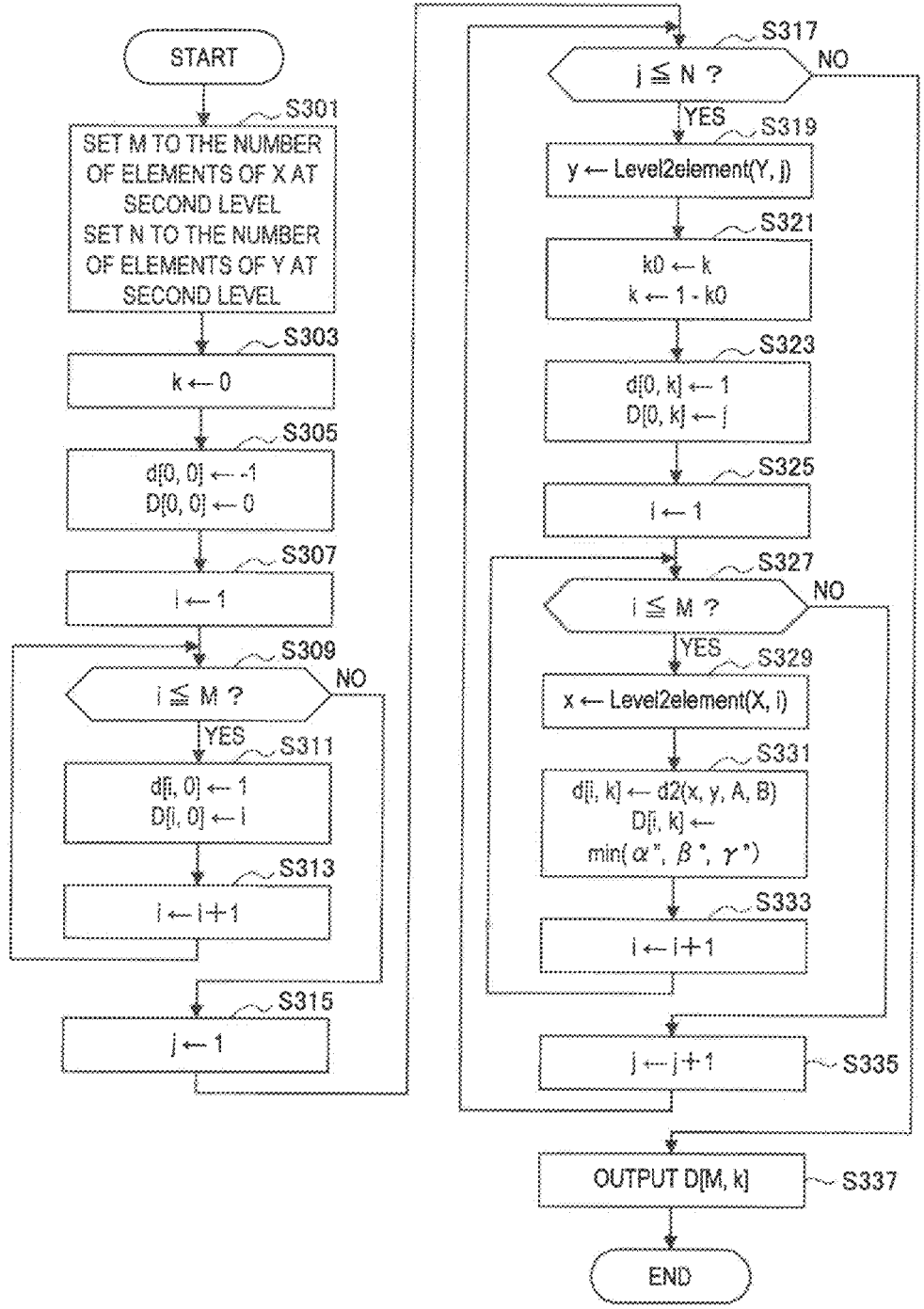
FIG. 12 is a flow diagram illustrating a flow of the second modification of the information processing method according to the embodiment.

First, the overall flow of the transition-sensitive string distance calculation method at the second level according to the present modification will be explained with reference to FIG. 12.

First, the distance calculation unit 107 counts the number of elements of each of the element data X and the element data Y at the second level (step S301). In this case, the distance calculation unit 107 sets the number of elements of the element data X at the second level to M, and sets the number of elements of the element data Y at the second level to N.

Subsequently, the distance calculation unit 107 sets the value of the parameter k to 0 (step S303), and thereafter initializes the values of the element dissimilarity matrix and the string distance matrix at the second level. More specifically, the distance calculation unit 107 sets the value of the element dissimilarity matrix d[0, 0] to −1, and sets the value of the string distance matrix D[0, 0] to 0 (step S305).

Subsequently, the distance calculation unit 107 sets the value of the parameter i(0≤i≤M) to 1 (step S307). Thereafter, the distance calculation unit 107 determines whether the value of the parameter i having been set is equal to or less than M (step S309).

When the value of the parameter i is determined to be equal to or less than M, the distance calculation unit 107 sets the value of the element dissimilarity matrix d[i, 0] to 1, and sets the value of the string distance matrix D[i, 0] to i (the value of the parameter i) (step S311). Thereafter, the distance calculation unit 107 increases the value input to the parameter i by one (step S313), and executes the processing of step S309 again.

On the other hand, when the value of the parameter i is determined not to be equal to or less than M (when the value of the parameter i is more than M), the distance calculation unit 107 sets the value of the parameter j(0≤j≤N) to 1 (step S315). Thereafter, the distance calculation unit 107 determines whether the value of the parameter j is equal to or less than N (step S317).

When the value of the parameter j is determined to be equal to or less than N, the distance calculation unit 107 sets the value of the parameter y to the j-th element of the element data Y at the second level (step S319).

Subsequently, the distance calculation unit 107 sets the value of the parameter k0 to the value of the parameter k, and sets the value of the parameter k to the value calculated from (1−k0) (step S321).

Thereafter, the distance calculation unit 107 sets the value of the element dissimilarity matrix d[0, k] to 1, and sets the value of the string distance matrix D[0, k] to j (the value of the parameter j) (step S323).

Subsequently, the distance calculation unit 107 sets the value of the parameter i to 1 (step S325). Thereafter, the distance calculation unit 107 determines whether the value of the parameter i is equal to or less than M (step S327). When the value of the parameter i is determined to be equal to or less than M, the distance calculation unit 107 sets the value of the parameter x to the i-th element of the element data X at the second level (step S329). When the value of the parameter i is determined not to be equal to or less than M (the value of the parameter i is more than M), the distance calculation unit 107 increases the value of the parameter j by one (step S335), and executes step S317 again.

Thereafter, the distance calculation unit 107 outputs the parameter i and the parameter j to the transition cost calculation unit 111, and requests the transition cost calculation unit 111 to calculate the transition cost. The transition cost calculation unit 111 looks up the output parameters and the stored element dissimilarity matrix to calculate the transition cost, and outputs the transition cost to the distance calculation unit 107.

The distance calculation unit 107 sets the value of the element dissimilarity matrix d[i, k] to the normalized dissimilarity d2(x, y, A, B) obtained from the processing at the first level (step S331). Further, the distance calculation unit 107 uses the element dissimilarity matrix, the string distance matrix, and the transition cost output from the transition cost calculation unit 111 to set the value of the string distance matrix D[i, k] to the value of min($\alpha''$, $\beta''$, $\gamma''$) (step S331). In this case, $\alpha''$, $\beta''$, $\gamma''$ are obtained from expressions 141 to 143 as follows.

$$\alpha''=D[i-1, k]+1+t(d[i, k], d[i-1, k], A2, B2) \quad \text{(Expression 141)}$$

$$\beta''=D[i, k0]+1+t(d[i, k], d[i, k0], A2, B2) \quad \text{(Expression 142)}$$

$$\gamma''=D[i-1, k0]+d[i, k]+t(d[i, k], d[i-1, k0], A2, B2) \quad \text{(Expression 143)}$$

Thereafter, the distance calculation unit 107 increases the value input to the parameter i by one (step S333), and executes the processing of step S327 again.

On the other hand, when the value of the parameter j is determined not to be equal to or less than N in step S317 (when the value of the parameter j is more than N), the distance calculation unit 107 outputs the value stored in D[M, k] (step S337). Thus, a transition-sensitive string distance TD2(X, Y, A, B, A2, B2) between the element data X and the element data Y is calculated.

[Calculation Processing of d2(X, Y, A, B)]

Figure 13:
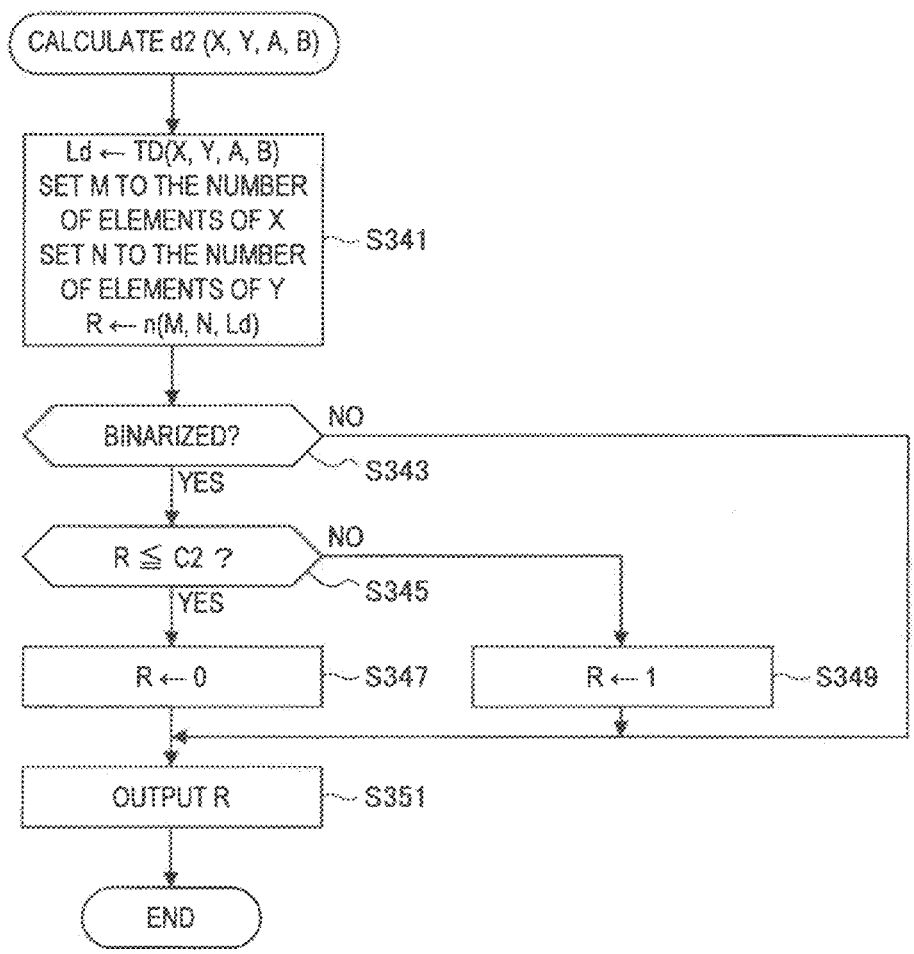
FIG. 13 is a flow diagram illustrating a flow of the second modification of the information processing method according to the embodiment.

Subsequently, the flow of a calculation method of the normalized dissimilarity d2(X, Y, A, B), which uses the transition-sensitive string distance TD(X, Y, A, B) calculated by the processing at the first level, will be briefly explained with reference to FIG. 13.

First, the distance calculation unit 107 sets the value of a parameter Ld to the value of the calculated transition-sensitive string distance TD(X, Y, A, B) (step S341). The distance calculation unit 107 counts the number of elements constituting each one of the element data (step S341). In this case, the distance calculation unit 107 sets the number of elements of the element data X to M, and sets the number of elements of the element data Y to N. Further, the distance calculation unit 107 calculates the value of n(M, N, Ld) using these parameters and a function n(Lx, Ly, Ld) for calculating a normalized dissimilarity, explained later, and sets the value of a parameter R to the value of n(M, N, Ld) (step S341).

Subsequently, the distance calculation unit 107 determines whether the value set in the parameter R is to be binarized or not (step S343). When the value is determined not to be binarized, the distance calculation unit 107 performs step S351 explained later. When the value is determined to be binarized, the distance calculation unit 107 determines whether the value of the parameter R is equal to or less than a predetermined threshold value C2 (step S345).

In this case, when the value of the parameter R is determined to be equal to or less than the threshold value C2, the distance calculation unit 107 sets the value of the parameter R to 0 (step S347). When the value of the parameter R is determined to be more than the threshold value C2, the distance calculation unit 107 sets the value of the parameter R to 1 (step S349).

Thereafter, the distance calculation unit 107 outputs the value set in the parameter R as the normalized dissimilarity d2(X, Y, A, B) (step S351).

When the value calculated in step S341 is used without being binarized at all times, the distance calculation unit 107 does not have to execute the processing from step S343 to step S349. When the binarization is executed at all times, the distance calculation unit 107 may omit the processing of step S343.

[Calculation Processing of d3(X, Y, A, B, A2, B2)]

Figure 14:
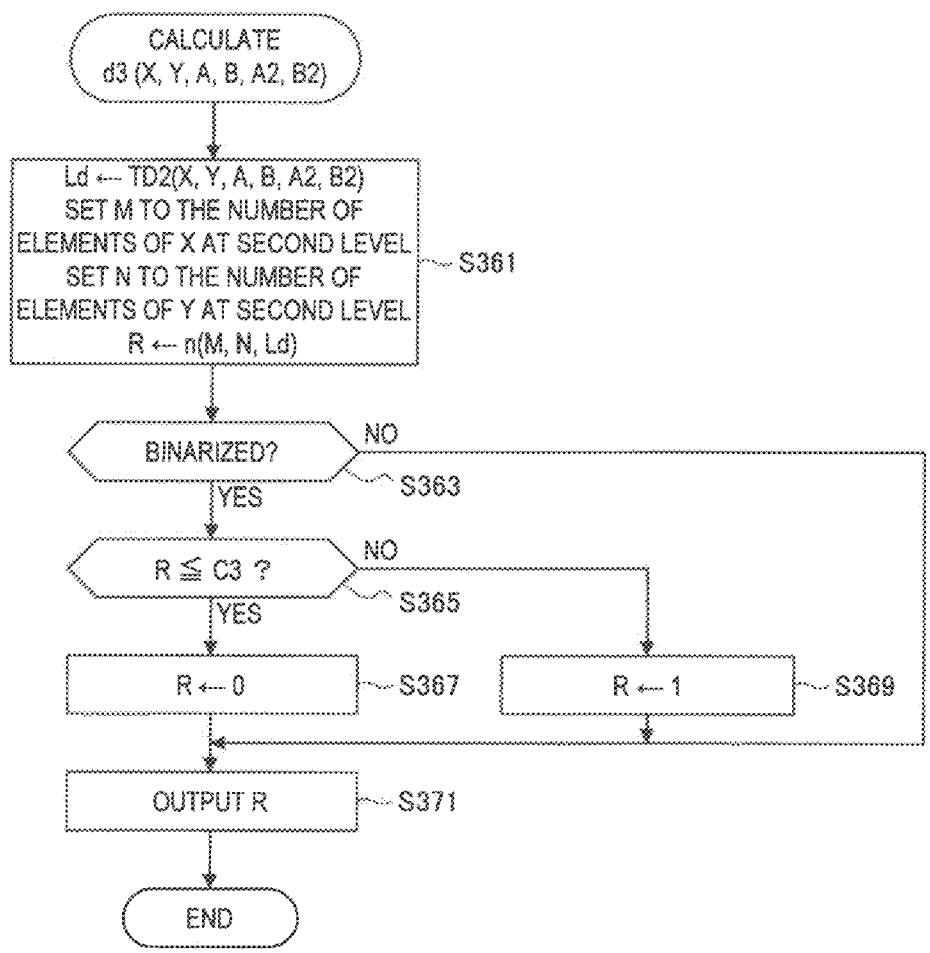
FIG. 14 is a flow diagram illustrating a flow of the second modification of the information processing method according to the embodiment.

Subsequently, the flow of a calculation method of the normalized dissimilarity d3(X, Y, A, B, A2, B2), which uses the transition-sensitive string distance TD2(X, Y, A, B, A2, B2) calculated by the processing at the second level, will be briefly explained with reference to FIG. 14.

First, the distance calculation unit 107 sets the value of a parameter Ld to the calculated transition-sensitive string distance TD2(X, Y, A, B, A2, B2) (step S361). The distance calculation unit 107 counts the number of elements constituting each one of the element data at the second level (step S361). In this case, the distance calculation unit 107 sets the number of elements of the element data X at the second level to M, and sets the number of elements of the element data Y at the second level to N. Further, the distance calculation unit 107 calculates the value of n(M, N, Ld) using these parameters and a function n(Lx, Ly, Ld) for calculating a normalized dissimilarity, explained later, and sets the value of a parameter R to the value of n(M, N, Ld) (step S361).

Subsequently, the distance calculation unit 107 determines whether the value set in the parameter R is to be binarized or not (step S363). When the value is determined not to be binarized, the distance calculation unit 107 performs step S371 explained later. When the value is determined to be binarized, the distance calculation unit 107 determines whether the value of the parameter R is equal to or less than a predetermined threshold value C3 (step S365).

In this case, when the value of the parameter R is determined to be equal to or less than the threshold value C3, the distance calculation unit 107 sets the value of the parameter R to 0 (step S367). When the value of the parameter R is determined to be more than the threshold value C3, the distance calculation unit 107 sets the value of the parameter R to 1 (step S369).

Thereafter, the distance calculation unit 107 outputs the value set in the parameter R as the normalized dissimilarity d3(X, Y, A, B, A2, B2) (step S371).

When the value calculated in step S361 is used without being binarized at all times, the distance calculation unit 107 does not have to execute the processing from step S363 to step S369. When the binarization is executed at all times, the distance calculation unit 107 may omit the processing of step S363.

[Calculation Processing of n(Lx, Ly, Ld)]

Figure 15:
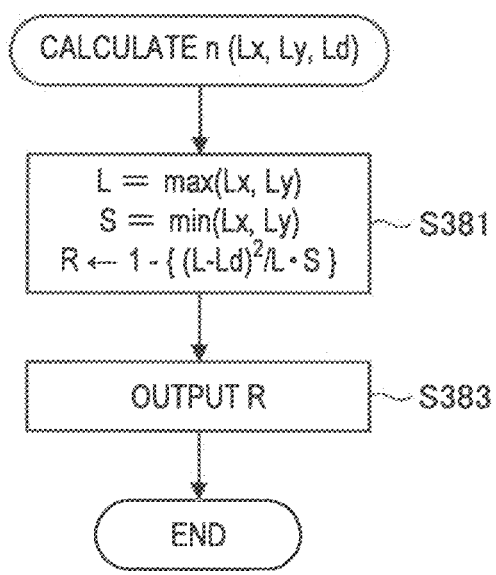
FIG. 15 is a flow diagram illustrating a flow of the second modification of the information processing method according to the embodiment.

Subsequently, the flow of a numerical value normalization method will be briefly explained with reference to FIG. 15. The numerical value normalization method explained below can be executed by each processing unit in the element distance calculation unit 103 as necessary. In the explanation below, however, it is assumed that, for example, the distance calculation unit 107 performs the numerical value normalization method. It should be noted that the numerical value normalization method explained in FIG. 15 is merely an example. In addition to the normalization method described below, any known method may be used.

First, the distance calculation unit 107 looks up Lx and Ly input as arguments of the function n(Lx, Ly, Ld), and sets a parameter L to the larger one of Lx and Ly (step S381). Further, the distance calculation unit 107 sets a parameter S to the smaller one of Lx and Ly (step S381). Thereafter, the distance calculation unit 107 uses the argument Ld and the parameters L and S to calculate a value represented as $1-\{(L-Ld)^2/L \cdot S\}$, and sets the value of the parameter R to the value thus calculated (step S381).

Subsequently, the distance calculation unit 107 outputs the value of the parameter R as the result of n(Lx, Ly, Ld) (step S383). As a result, the value input as the argument Ld is normalized.

<Third Modification>

In the ordered word-wise matching method explained in the second modification, words in the two strings are collated with each other with a fixed order. Alternatively, a method for performing comparison without fixing the order may also be achieved. In the present modification, the following case will be briefly explained: words in two strings are compared not in a particular order, and a transition-sensitive string distance metric is used for comparing words. In the explanation below, this method will be referred to as the order-free word-wise matching method.

Also in this method, each of the strings in question is first divided into coarse grain elements such as words and physical blocks. Then, in the method according to the present modification, elements of still finer grains (fine grains) constituting the coarse grain are compared first. Subsequently, in the method according to the present modification, the above calculation result at the lower level is used to calculate a normalized dissimilarity.

In the example below, each string serving as an element data is divided into two levels. However, the number of levels is not limited to this example, and may be two or more.

In the method explained below, the distance obtained from a string matching procedure at the lower level is converted into a dissimilarity, so that the calculation results obtained in the plurality of different levels are connected. The method for converting the calculated string distance into the dissimilarity may be selected as necessary, and is not particularly limited.

FIG. 16 illustrates an example where the above order-free word-wise string matching method is applied to calculation of a string distance between two strings, i.e., "patent application form" and "Parent Education Forums". In the example as shown in FIG. 16, the input strings are divided into words by morphological analysis performed by the data preprocessing unit 105. Then, the distance calculation unit 107, the dissimilarity calculation unit 109, and the transition cost calculation unit 111 perform processings.

In this example, each string is divided into three words. These three words are coarse grain elements, which are classified as Level 2, i.e., the upper level. Each coarse grain is constituted by elements made of alphabets (fine grain elements). Processing on these fine grain elements is processing of Level 1, i.e., the lower level.

The processing of Level 1 is performed using the method as described above so as to respectively calculate a transition-sensitive string distance D at the level "Level 1" and a dissimilarity d2 obtained by normalizing the transition-sensitive string distance D. In the processing of Level 2, a normalized dissimilarity d4 is calculated by using the normalized dissimilarity d2 calculated in the processing of Level 1.

The table shown in FIG. 16 will be explained. As explained above, the table in FIG. 16 showing the processing result of Level 1 includes both of an element dissimilarity matrix and a string distance matrix. A numerical value in italic letters located at the upper left corner of each field is the value of an element dissimilarity. A numerical value located at the lower right corner is a string distance.

The table showing the processing result of Level 2 includes two numerical values in each field. A numerical value in italic letters on the upper side is a value corresponding to a normalized dissimilarity d2 calculated in the processing of Level 1. A numerical value on the lower side is a transition-sensitive string distance D calculated in the processing of Level 1.

In the method according to the present modification, the following processing of Level 2 is performed. A dissimilarity d2 giving the smallest value in the column for the same parameter j is selected, and the sum of the smallest dissimilarities d2 for individual parameters is calculated throughout all the parameters j. Thereafter, the sum of the calculated dissimilarities d2 is divided by the number of elements in the string corresponding to the parameter j at the second level to obtain a normalized dissimilarity d4.

The values of string distance matrix D[i, j] as shown in FIG. 16 are under the following condition. The ascending transition cost coefficient A is 0.4. The descending transition cost coefficient B is 0.5. The dissimilarity d(F, f) is 0.4.

[Configuration of Information Processing Apparatus]

The configuration of the information processing apparatus according to the present modification is the same as the configuration of the information processing apparatus 10 according to the first embodiment of the present invention as shown in FIG. 3. However, the transition-sensitive string distance calculation method performed by the element distance calculation unit 103 is different. The detailed description about the configuration of the information processing apparatus according to the present modification is omitted in the explanation below.

[Information Processing Method]

Figure 17:
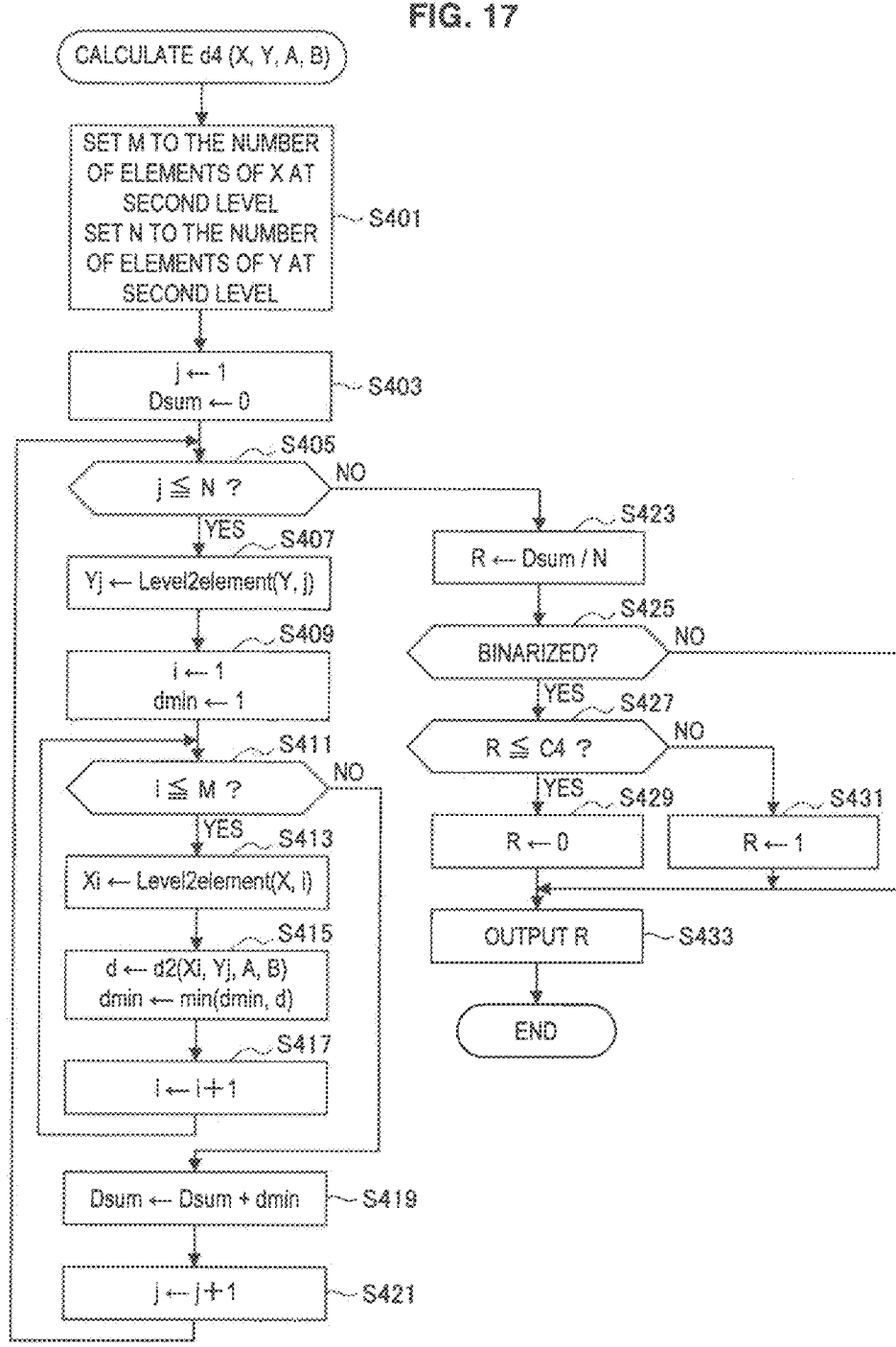
FIG. 17 is a flow diagram illustrating a flow of the third modification of the information processing method according to the embodiment.

Subsequently, the flow of the information processing method (normalized dissimilarity calculation method) performed by the element distance calculation unit 103 according to the present modification will be explained with reference to FIG. 17. FIG. 17 is a flow diagram illustrating the flow of the normalized dissimilarity calculation method according to the present modification.

The transition-sensitive string distance calculation method at the first level (Level 1) may use the method according to the first embodiment of the present invention explained above or the method according to the first modification as necessary. Accordingly, detailed explanation about the transition-sensitive string distance calculation method at the first level (Level 1) is omitted in the following. It is assumed that the transition-sensitive string distance D and the normalized dissimilarity d2 have already been calculated in the calculation processing at the first level.

[Calculation Processing of d4(X, Y, A, B)]

First, the distance calculation unit 107 counts the number of elements of each of the element data X and the element data Y at the second level (step S401). In this case, the distance calculation unit 107 sets the number of elements of the element data X at the second level to M, and sets the number of elements of the element data Y at the second level to N.

Subsequently, the distance calculation unit 107 sets the value of a parameter j to 1 and sets the value of a parameter Dsum to 0 (step S303).

Thereafter, the distance calculation unit 107 determines whether the value of the parameter $j(0 \leq j \leq N)$ is equal to or less than N (step S405).

When the value of the parameter j is determined to be equal to or less than N, the distance calculation unit 107 sets the value of the parameter Yj to the j-th element of the element data Y at the second level (step S407).

Subsequently, the distance calculation unit 107 sets the value of a parameter $i(0 \leq i \leq M)$ to 1 and sets the value of a parameter dmin to 1 (step S409).

Thereafter, the distance calculation unit 107 determines whether the value of the parameter i is equal to or less than M (step S411). When the value of the parameter i is determined to be equal to or less than M, the distance calculation unit 107 sets the value of the parameter Xi to the i-th element of the element data X at the second level (step S413). Thereafter, the distance calculation unit 107 sets the value of a parameter d to the value of d2(Xi, Yj, A, B), and sets the value of the parameter dmin to the smaller one of the parameter dmin and the parameter d (step S415). Subsequently, the distance calculation unit 107 increases the value of the parameter i by one (step S417), and executes step S411 again.

When the value of the parameter i is determined not to be equal to or less than M (the value of the parameter i is more than M) in step S411, the distance calculation unit 107 increases the value of the parameter dmin to the value of the parameter Dsum, and sets the value of the parameter Dsum to the obtained value (step S419). Thereafter, the value of the parameter j is increased by one (step S421), and step S405 is executed again.

When the value of the parameter j is determined not to be equal to or less than N (the value of the parameter j is more than N) in step S405, the distance calculation unit 107 divides the value of the parameter Dsum by N, and sets the value of the parameter R to the obtained result (step S423).

Subsequently, the distance calculation unit 107 determines whether the value set in the parameter R is to be binarized or not (step S425). When the value is determined not to be binarized, the distance calculation unit 107 performs step S433 explained later. When the value is determined to be binarized, the distance calculation unit 107 determines whether the value of the parameter R is equal to or less than a predetermined threshold value C4 (step S427).

In this case, when the value of the parameter R is determined to be equal to or less than the threshold value C4, the distance calculation unit 107 sets the value of the parameter R to 0 (step S429). When the value of the parameter R is determined to be more than the threshold value C4, the distance calculation unit 107 sets the value of the parameter R to 1 (step S431).

Thereafter, the distance calculation unit 107 outputs the value set in the parameter R as the normalized dissimilarity d4(X, Y, A, B) (step S433).

When the value calculated in step S423 is used without being binarized at all times, the distance calculation unit 107 does not have to execute the processing from step S425 to step S431. When the binarization is executed at all times, the distance calculation unit 107 may omit the processing of step S425.

The transition-sensitive string distance according to the present embodiment has been hereinabove explained in detail. In place of the Levenshtein distance (LD) metric, the transition-sensitive string distance (TD) metric according to the present embodiment may be used in combination with other metrics and methods such as the so-called tf-idf weighting factor and the N-gram method.

<Example of Application of Transition-Sensitive String Distance Metric>

Subsequently, an example of application of the transition-sensitive string distance metric according to the present embodiment will be concretely explained with reference to FIGS. 18 to 23.

[Example of Application 1]

Figure 18:
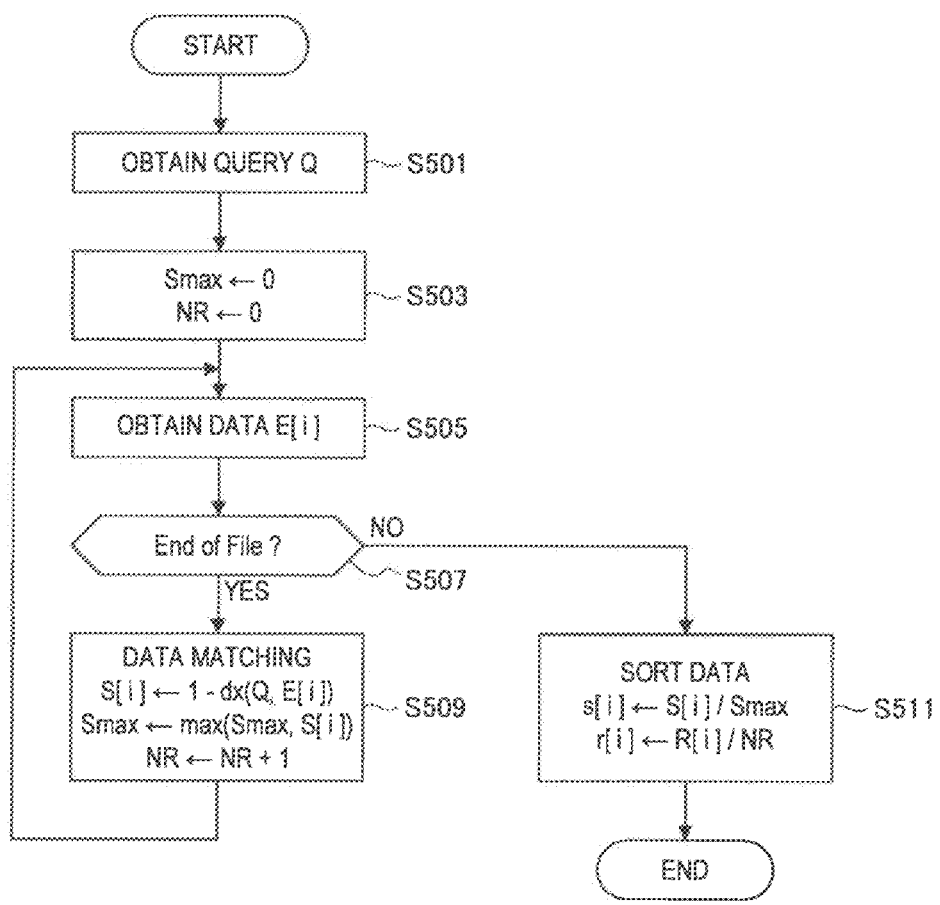
FIG. 18 is a flow diagram illustrating an example of application of the information processing method according to the embodiment.
Figure 19:
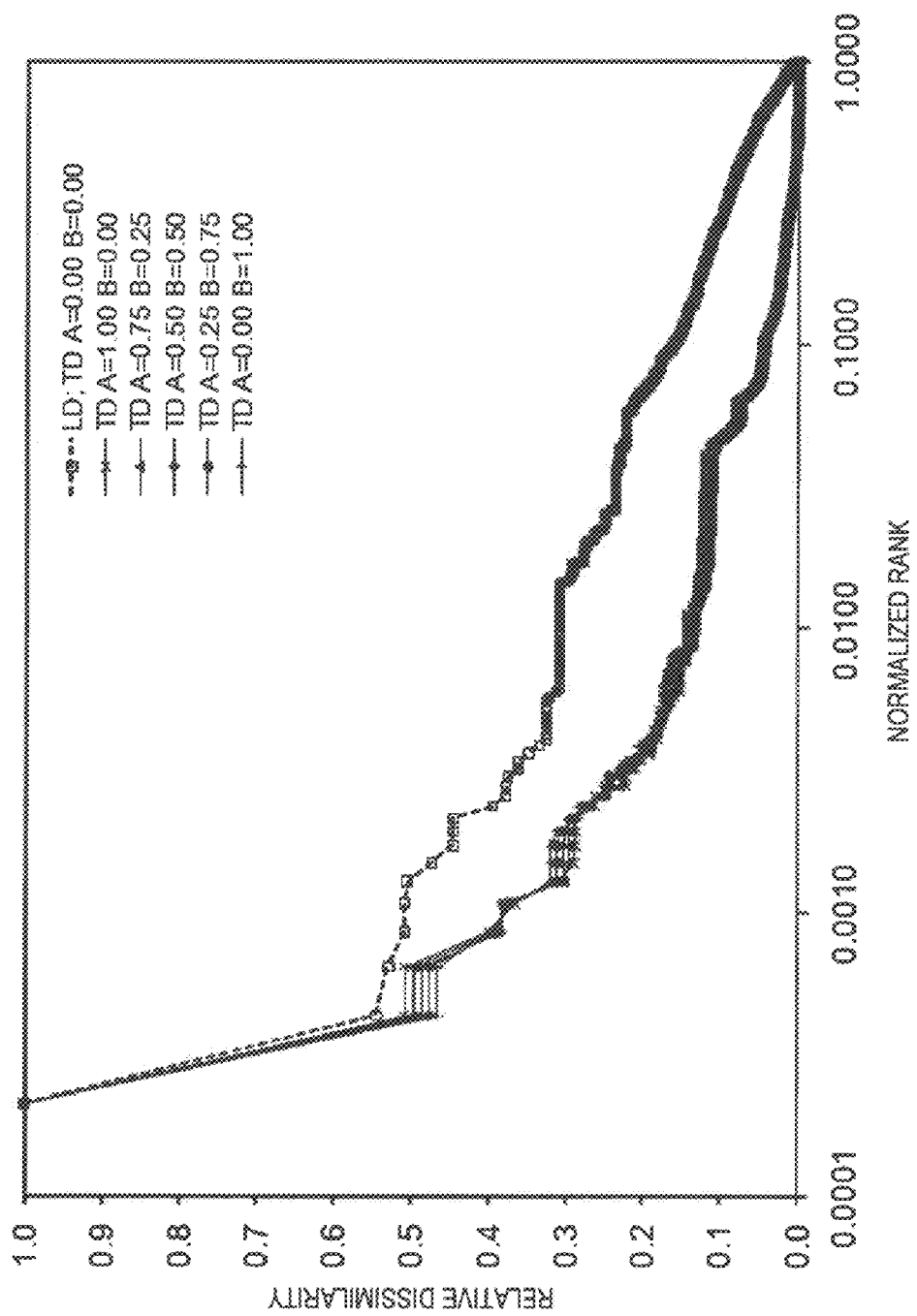
FIG. 19 is a graph chart illustrating a result of application of the information processing method according to the embodiment.
Figure 20:
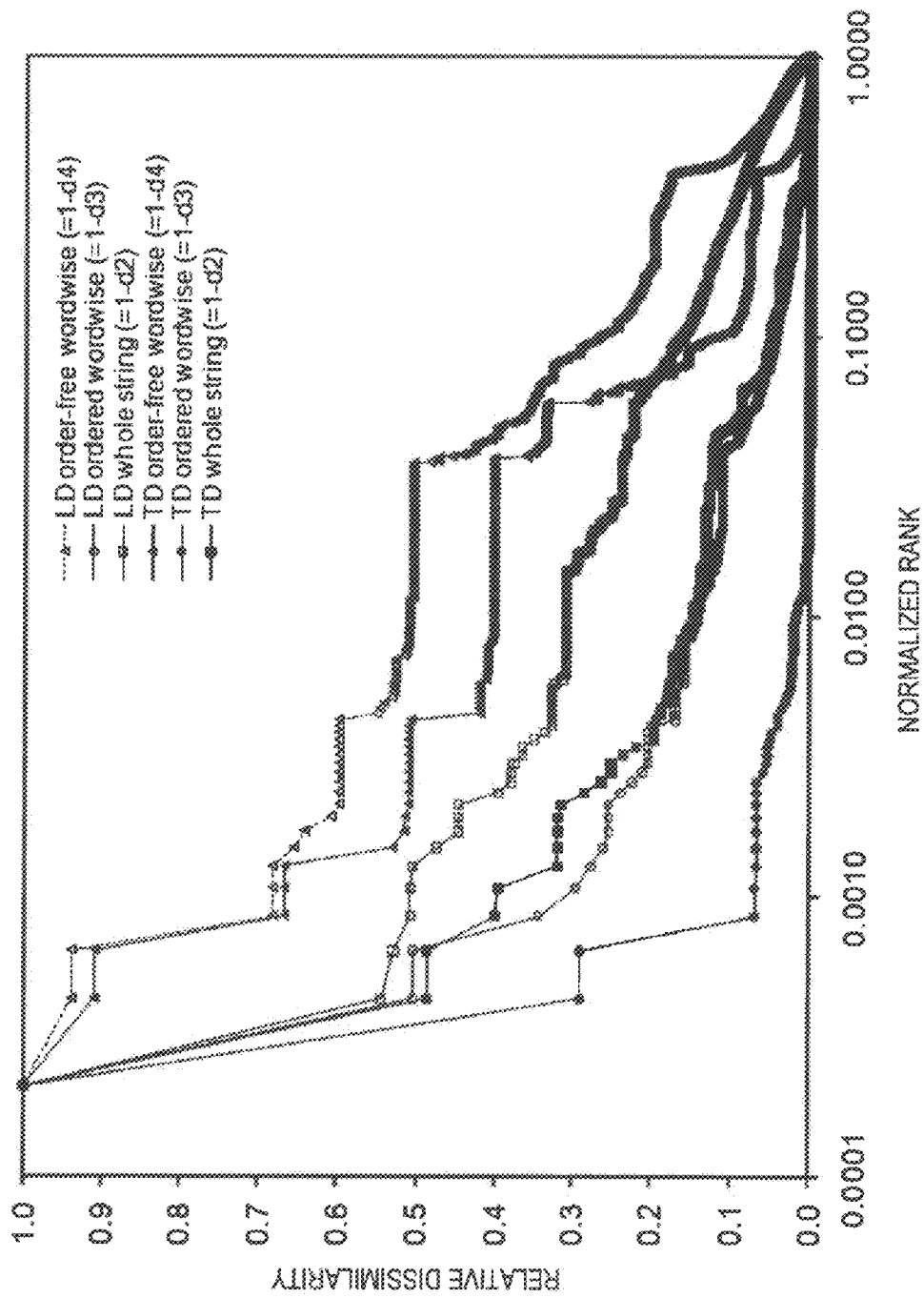
FIG. 20 is a graph chart illustrating a result of application of the information processing method according to the embodiment.

In FIGS. 18 to 20 shown below, the transition-sensitive string distance (TD) metric according to the present embodiment is applied to name search operation, and the performance of the metric is examined. FIG. 18 is a flow diagram illustrating the flow of processing when various environmental variables and various matching methods are used to perform name search operation.

In this example of application, a database including 4688 biological names such as the names of genes and proteins is prepared. In this case, "ribosomal RNA processing" is used as a query string (search query) Q. Various string distance metrics and string matching methods are used to collate the query string with each record in the database.

First, when the distance calculation unit 107 obtains data representing the query Q (step S501), the distance calculation unit 107 sets the values of both of a parameter S and a parameter NR to 0 (step S503). Thereafter, the distance calculation unit 107 tries to obtain data E[i] from the prepared database (step S505), and determines whether the data E[i] has been obtained or not (step S507).

When the distance calculation unit 107 has successfully obtained the data E[i], the distance calculation unit 107 uses various methods as described above to match the data in cooperation with the dissimilarity calculation unit 109 and the transition cost calculation unit 111 (step S509). The string dissimilarity d obtained by the matching is converted by the following expression 151 into a string similarity S[i] (step S509).

$$S[i]=1-d\times(Q, E(i))$$ (Expression 151)

The distance calculation unit 107 compares the magnitudes of the calculated string similarity S[i] and a parameter Smax, and sets the value of the parameter Smax to the larger one of them (step S509), and increases the value of the parameter NR by one (step S509). Thereafter, the distance calculation unit 107 returns back to step S505 again, and obtains new data E[i] from the database.

On the other hand, when the distance calculation unit 107 fails to obtain any new data E[i] in step S507, the distance calculation unit 107 converts the calculated similarity S[i] into a relative similarity s[i], i.e., the ratio of the similarity with respect to the maximum value Smax (step S511). The relative similarity s[i] is calculated from expression 152 below.

$$s[i]=S[i]/\text{Smax}$$ (Expression 152)

Thereafter, the distance calculation unit 107 sorts the data according to the calculated relative similarity s[i] (step S511), and rank the obtained result. When the rank of each piece of the data is denoted with R[i], the distance calculation unit 107 converts the determined rank into a normalized rank r[i], i.e., the ratio with respect to a total number of records NR (step S511). This normalized rank is calculated from expression 153 below.

$$r[i]=R[i]/NR$$ (Expression 153)

FIG. 19 is a graph chart illustrating relationship of the relative similarity s[i] with respect to the normalized rank r[i]. The relative similarity s[i] is calculated using various combinations of transition cost coefficients, A and B. The whole string matching method is used on each record E[i], and the similarity S[i] is obtained as the value of the function below. The horizontal axis of the graph chart as shown in FIG. 19 is represented as a logarithm.

$$S[i]=1-d2(Q, E[i], A, B)$$

A curve plotted with white rectangles represents a case where the environmental variable satisfy A=B=0. This corresponds to a case where Levenshtein distance LD is used. The other curves are calculated using several combinations of A and B satisfying A+B=1. These curves are somewhat different from each other. But it is understood that these curves form a group, which is away from the curve corresponding to the Levenshtein distance.

FIG. 20 is a graph chart illustrating the relationship of the relative similarity s[i] and the normalized rank r[i] calculated with a six kinds of combinations each using a different string distance metric and a different string matching method.

(1) LD+whole-string matching method: S[i]=1−d2(Q, E[i], 0, 0)
(2) LD+ordered word-wise matching method: S[i]=1−d3(Q, E[i], 0, 0, 0, 0)
(3) LD+order-free word-wise matching method: S[i]=1−d4 (Q, E[i], 0, 0)
(4) TD+whole-string matching method: S[i]=1−d2(Q, E[i], 0.4, 0.5)
(5) TD+ordered word-wise matching method: S[i]=1−d3(Q, E[i], 0.4, 0.5, 0.4, 0.5)
(6) TD+order-free word-wise matching method: S[i]=1−d4 (Q, E[i], 0.4, 0.5)

When the word-wise matching method is used, a query string and each record read from a database are divided into words. For example, a query string "ribosomal RNA processing" is divided into three words, i.e., "ribosomal", "RNA", and "processing". When three types of matching methods are compared, a curve representing the order-free word-wise matching method is at the outermost side. A curve representing the whole-string matching method is at an inner side thereof. A curve representing the ordered word-wise matching method is at the innermost side. In either of the matching methods, the curve representing the TD metric is located inside of the curve representing the LD metric. These results indicate that the TD metric differentiates the record having the highest rank more clearly than the LD metric does.

[Example of Application 2]

Each element of a string may be any type of symbol as long as it can be compared and the dissimilarity thereof can be quantified. Therefore, the transition-sensitive string distance metric according to the present embodiment can be applied to analysis of time-series data having elements of real values. The time-series data may be data in any kind of fields such as economics, music, videos, and biology.

In various kinds of life science fields of medical, pharmaceutical, cosmetics, and food industries, time-series data of gene expression are accumulated, and an efficient analysis method has been desired. Therefore, the result of a gene expression time-series data analysis will be hereinafter explained as an example of application of the time-series data analysis. In the following explanation, twenty kinds of gene expression time-series data are analyzed using a transition-sensitive string distance metric, and a procedure for identifying genes having similar time-series from the obtained dissimilarity array and results thereof will be explained.

*Analysis Data

Figure 21:
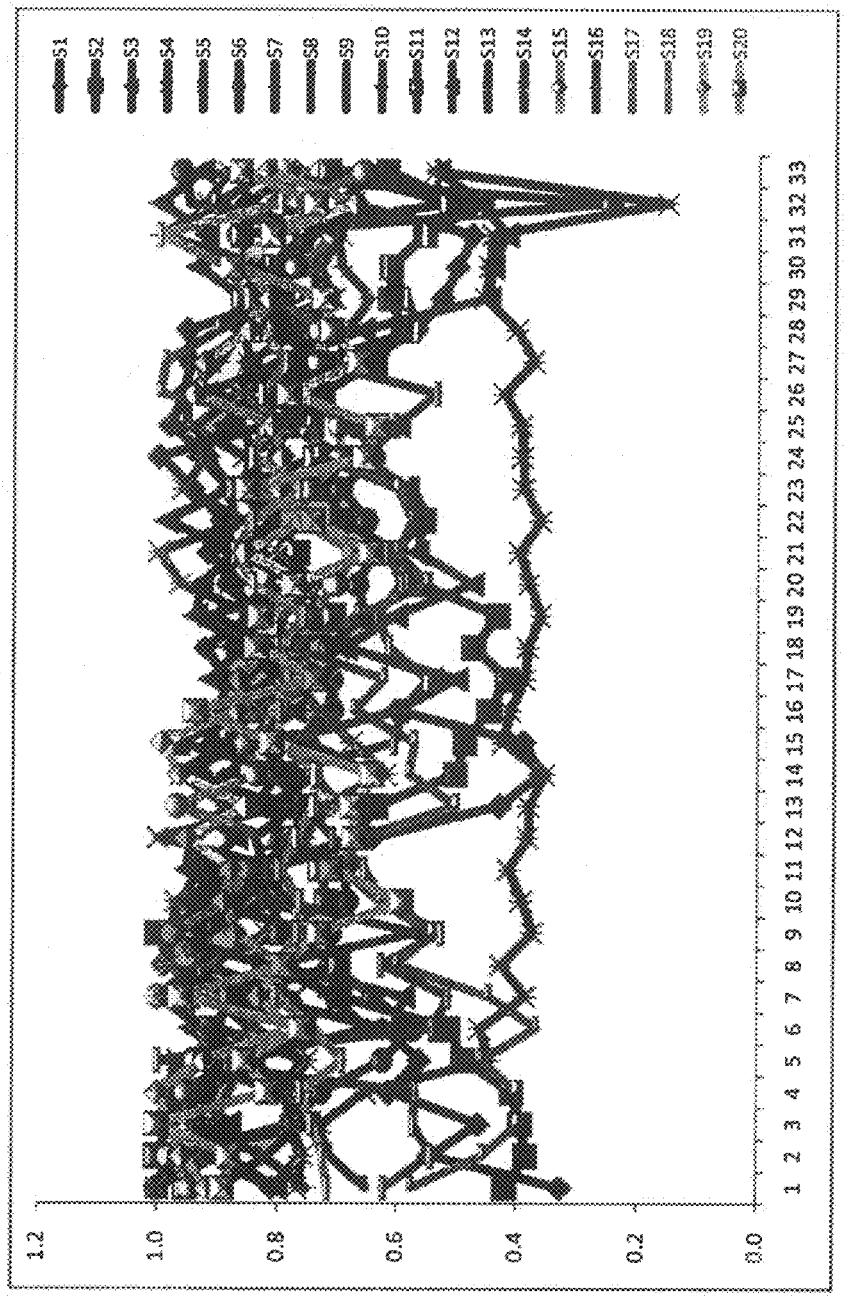
FIG. 21 is a flow diagram illustrating an example of application of the information processing method according to the embodiment.

Peng et al. reports time-series expression data observed at 33 time points with respect to 4929 kinds of genes of *Schizosaccharomyces pombe*, i.e., one of *Schizosaccharomyces* (Peng et al. 2005). Among these, 20 kinds of time-series expression data (S01-S20) without any non-assigned (NA) data as shown in FIG. 21 are analyzed. In this case, in FIG. 21, the vertical axis represents the expression level of a normalized gene, and the horizontal axis represents the expression time.

*Analysis Procedure (1) As shown in FIG. 21, each piece of the time-series expression data are divided by the maximum value thereof, and are normalized so that the data are in the range of [0, 1].

(2) A transition-sensitive string distance TD is measured for each of combinations consisting of two kinds chosen from a series of 20 kinds, i.e., totally $(20 \times 19)/2 = 190$ combinations, and the obtained distance is divided by the length 33 of the strings and normalized to obtain a string dissimilarity. In this case, the transition cost coefficient satisfies $A=B=0.5$.

Figure 22:
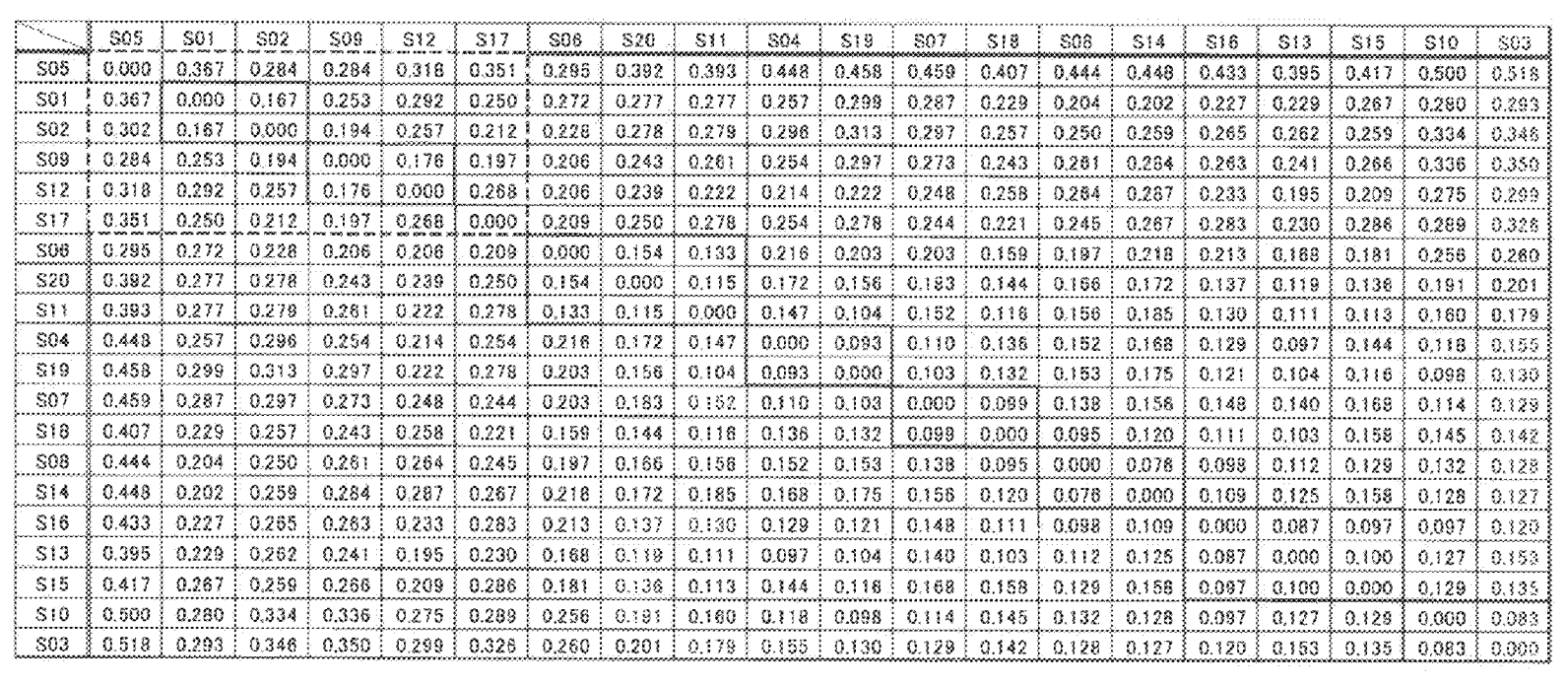

(3) A row having the maximum value in the series dissimilarity array is adopted as the vertical and horizontal axes, and the array is sorted in the ascending order, so that the array is sorted in such a manner that groups (or clusters) of series having small dissimilarities with each other are gathered. The obtained result is shown in FIG. 22.

Figure 23:
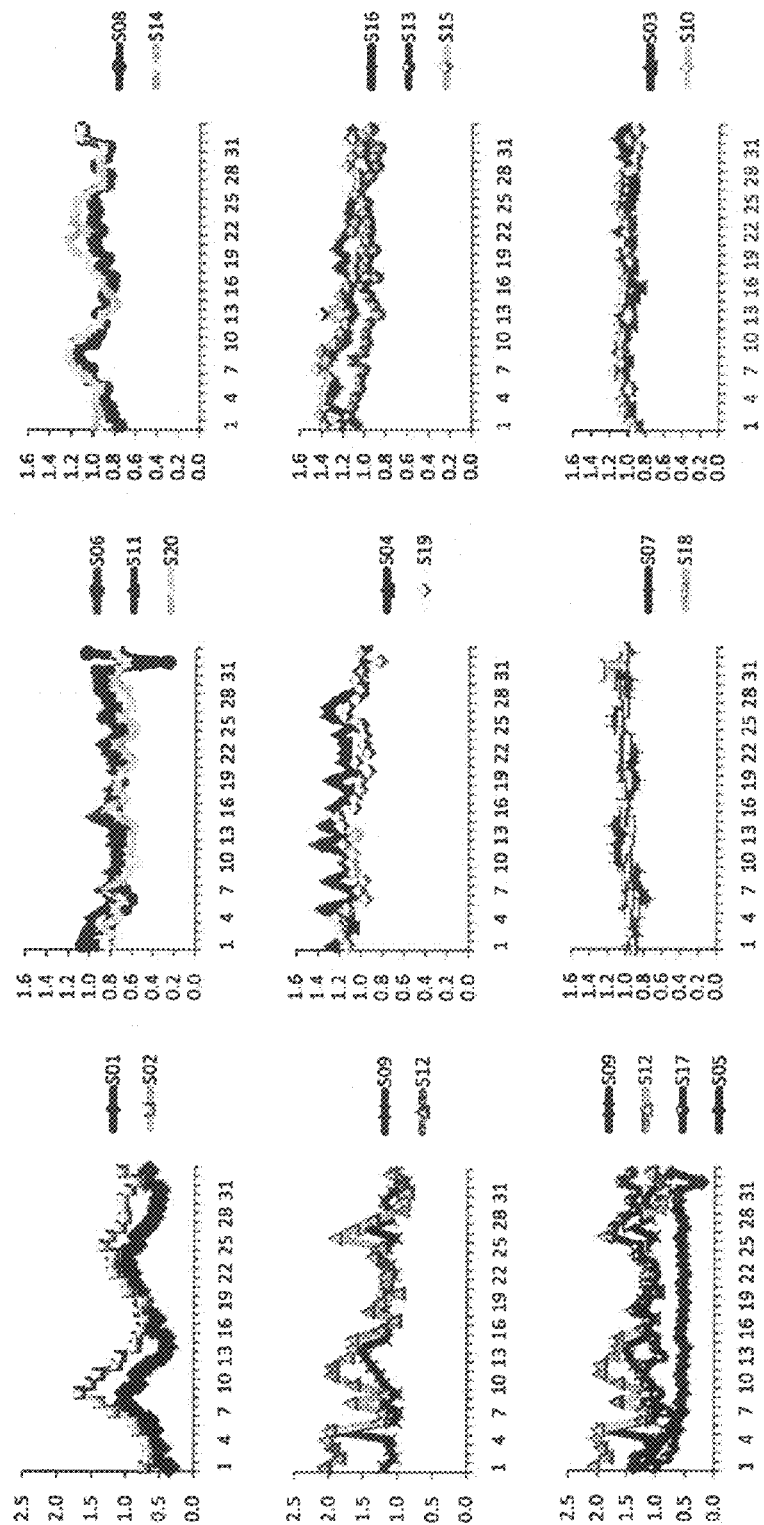
FIG. 23 is a graph chart illustrating a result of application of the information processing method according to the embodiment.

(4) The obtained close series groups (clusters) are shown in FIG. 23. In this case, however, the original non-normalized time-series are shown.

As can be seen from the comparison between FIGS. 21 and 23, it is difficult to identify time-series expression data of genes displaying similar behaviors in the state of FIG. 21. However, when the transition-sensitive string distance metric according to the present embodiment is used, complicated data can be classified into data displaying similar behaviors.

[Example of Application 3]

When a transition-sensitive string distance between two-digit or three-digit binary codes is formulated using two environmental variables A and B, a unique expression can be obtained. Therefore, the transition-sensitive string distance metric can be used as a conversion method of a binary code.

*Two-Digit Binary Code

A transition-sensitive string distance between two-digit binary codes is formulated as shown in table 1 below.

TABLE 1

|    | 00     | 01       | 10       | 11       |
|----|--------|----------|----------|----------|
| 00 | f(0)   | f(1)+A   | f(1)+B   | f(2)     |
| 01 | f(1)+A | f(0)     | f(2)     | f(1)+B   |
| 10 | f(1)+B | f(2)     | f(0)     | f(1)+A   |
| 11 | f(2)   | f(1)+B   | f(1)+A   | f(0)     |

As is evident from table 1, four kinds of expressions, i.e., f(0), f(1)+A, f(1)+B, f(2), appear only once in each row and each column. In this case, where it is assumed that expressions f(X)=X, A=10, B=00 hold, each expression is converted into a binary code.

TABLE 2

|    | 00 | 01 | 10 | 11 |
|----|----|----|----|----|
| 00 | 00 | 11 | 01 | 10 |
| 01 | 11 | 00 | 10 | 01 |
| 10 | 01 | 10 | 00 | 11 |
| 11 | 10 | 01 | 11 | 00 |

Therefore, when "01" is given as a key, each of the original binary codes can be converted into another code as follows: "00" into "11", "01" into "00", "10" into "10", "11" into "01".

*Three-Digit Binary Code

Like the two-digit code, a transition-sensitive string distance between three-digit binary codes is formulated as shown in table 3 below.

TABLE 3

|     | 000      | 001      | 100      | 010      | 101      | 011      | 110      | 111      |
|-----|----------|----------|----------|----------|----------|----------|----------|----------|
| 000 | f(0)     | f(1)+A   | f(1)+B   | f(1)+A+B | f(2)+A+B | f(2)+A   | f(2)+B   | f(3)     |
| 001 | f(1)+A   | f(0)     | f(2)+A+B | f(2)+B   | f(1)+B   | f(1)+A+B | f(3)     | f(2)+B   |
| 100 | f(1)+B   | f(2)+A+B | f(0)     | f(2)+B   | f(1)+A   | f(3)     | f(1)+A+B | f(2)+A   |
| 010 | f(1)+A+B | f(2)+A   | f(2)+B   | f(0)     | f(3)     | f(1)+A   | f(1)+B   | f(2)+A+B |
| 101 | f(2)+A+B | f(1)+B   | f(1)+A   | f(3)     | f(0)     | f(2)+B   | f(2)+A   | f(1)+A+B |
| 011 | f(2)+A   | f(1)+A+B | f(3)     | f(1)+A   | f(2)+B   | f(0)     | f(2)+A+B | f(1)+B   |
| 110 | f(2)+B   | f(3)     | f(1)+A+B | f(1)+B   | f(2)+A   | f(2)+A+B | f(0)     | f(1)+A   |
| 111 | f(3)     | f(2)+B   | f(2)+A   | f(2)+A+B | f(1)+A+B | f(1)+B   | f(1)+A   | f(0)     |

As is evident from table 3, eight kinds of expressions, i.e., f(0), f(1)+A, f(1)+B, f(1)+A+B, f(2)+A+B, f(2)+A, f(2)+B, f(3), appear only once in each row and each column. In this case, where it is assumed that equations $f(X)=(X \bmod 2) \times 2^2$, A=010, and B=001 hold, each expression is converted into a binary code.

TABLE 4

|     | 000 | 001 | 100 | 010 | 101 | 011 | 110 | 111 |
|-----|-----|-----|-----|-----|-----|-----|-----|-----|
| 000 | 000 | 110 | 101 | 111 | 011 | 010 | 001 | 100 |
| 001 | 110 | 000 | 011 | 010 | 101 | 111 | 100 | 001 |
| 100 | 101 | 011 | 000 | 001 | 110 | 100 | 111 | 010 |
| 010 | 111 | 010 | 001 | 000 | 100 | 110 | 101 | 011 |
| 101 | 011 | 101 | 110 | 100 | 000 | 001 | 010 | 111 |
| 011 | 010 | 111 | 100 | 110 | 001 | 000 | 011 | 101 |
| 110 | 001 | 100 | 111 | 101 | 010 | 011 | 000 | 110 |
| 111 | 100 | 001 | 010 | 011 | 111 | 101 | 110 | 000 |

Therefore, when "001" is given as a key, each of original binary codes can be converted into another code as follows:

"000" into "110", "001" into "000", "100" into "011", "010" into "010", "101" into "101", "011" into "111", "110" into "100", "111" into "001".

As explained above, the transition-sensitive string metric, i.e., a new metric for determining a distance between two strings, has been hereinabove explained in the first embodiment of the present invention. As compared with the Levenshtein distance (LD) in the related art, the transition-sensitive string distance (TD) can determine a highly-accurate distance at a low cost with almost the same amount of calculation even though only a minor calculation resource is added, and the transition-sensitive string distance (TD) can even distinguish strings which are determined to have the same distance by the LD in the related art.

Since the transition-sensitive string distance metric is based on a basic principle, the transition-sensitive string distance metric can be applied to not only a simple string matching but also a matching of complicated symbols and structural strings of different levels. Further, the transition-sensitive string distance metric can also be applied in combination with other metrics and methods.

Further, the transition-sensitive string distance metric can also be applied to not only the string matching but also other coding methods. A method for efficiently extracting necessary information is desired as various kinds of information are coded these days. In this context, the transition-sensitive string distance metric which is inexpensive but has a superior separation capability is valuable as it can be used in a wide range of application fields.

(Second Embodiment)

Hamming distance is currently used to search information represented as a multidimensional array such as a two-dimensional image and a three-dimensional object. The Hamming distance is used to compare strings having the same length (in a case of two or more dimensions, arrays having the same size), and the Hamming distance is defined as the number of different elements (or the total number of dissimilarities). Like the Levenshtein distance, the Hamming distance does not reflect the degree of dispersion of dissimilar elements. Accordingly, even information having no relation to each other at all is classified as having the same Hamming distance, and it is highly possible that this may lead to an erroneous determination.

In the second embodiment of the present invention explained below, multidimensional arrays having the same size are compared, and a matrix distance having a transition-sensitive property will be explained.

In this case, an array element may be a symbolic element which can be quantitatively compared. The type and the structure of the symbol are not particularly limited. The value obtained by adding the Hamming distance between two multidimensional arrays to the total cost of transitions of element dissimilarities observed in the multidimensional space is defined as the transition-sensitive matrix distance. The element dissimilarity transition total cost reflects the degree of dispersion of dissimilar elements. Therefore, when the transition-sensitive matrix distance is used for searching information such as a two-dimensional image and a three-dimensional object, the transition-sensitive matrix distance provides more appropriate search results than the Hamming distance.

(Transition-Sensitive Matrix Metric)

Before explaining an information processing apparatus and an information processing method according to the second embodiment of the present invention in detail, a transition-sensitive matrix metric according to the embodiment of the present invention will be briefly explained.

<Fundamental Technique and Issues Associated Therewith>

First, distance metrics used for searching multidimensional data and the like will be briefly explained as a technique serving as a basis of the present invention (fundamental technique).

Not only text search but also identification, dissimilarity (similarity) examination, and search of multidimensional images and multidimensional sounds are performed in various fields with digitalization of information. These examples include various kinds of security systems requiring individual authentication in society and medical fields in which images are automatically determined. Accordingly, a multidimensional distance metric for performing highly accurate matching at a low cost is desired.

For example, there are two kinds of two-dimensional images, i.e., a bitmap format and a vector format. In the bitmap format, an image is drawn with dots. In the vector format, an image is drawn with lines and characters. Various multiplier filters are provided to perform local multiplicative summation using each dot (pixel) and pixels therearound in order to process or analyze an image in the bitmap format. Such examples include a differential filter using the primary differential in order to detect an edge, a Laplacian filter using the secondary differential in order to increase the sharpness of an edge, a smoothing filter for smoothing an image, and a Gaussian filter for boldfacing characters.

In addition, features are extracted from a local region of an image or the entire image, and these feature information are attached to image information in order to match and retrieve images at a high speed with a low cost. For example, there are function-based feature extraction methods such as a method for converting an image into a line drawing through filter processing and thereafter assigning an approximate function to each line segment and a wavelet conversion method using frequency analysis. However, in these methods, the types of applicable images are limited. In a content-based image retrieval, direct image matching is performed as follows. A region having a particular size is fixed or moved on the bitmap of an image in the bitmap format, and a Hamming distance in the region is measured.

As described above, the Hamming distance is well-known to represent a distance metric between two strings having the same length, and is defined as the minimum number of substitutions of characters necessary for converting a string into another string. The Hamming distance between two strings X and Y having a length n is formulated by expression 21 below. In expression 21 below, X[i] and Y[i] mean the i-th elements (characters) of the strings, X and Y, respectively.

$$HD(X, Y) = \sum_{i=1}^{n} d(X[i], Y[i]) \qquad \text{(Expression 21)}$$

It is assumed that an object to be compared is not a one-dimensional string but is a multidimensional array. When two-dimensional arrays X and Y having a size m×n are used as an example, a Hamming distance therebetween is defined by expression 22 below in the same manner. In this case, in expression 22 below, X[i, j] and Y[i, j] mean elements at the i-th column and the j-th row on the two-dimensional arrays, X and Y, respectively.

$$HD(X, Y) = \sum_{i=1}^{m} \sum_{j=1}^{n} d(X[i, j], Y[i, j]) \qquad \text{(Expression 22)}$$

It should be noted that d(x, y) in expression 21 and expression 22 is as shown in expression 11.

The fuzzy Hamming distance is expanded such that the element dissimilarity function does not yield a binary value, i.e., 0 and 1, but yields a real number in the range of [0, 1] representing a dissimilarity.

Like the Levenshtein distance, the Hamming distance does not reflect the degree of dispersion and locations of dissimilar elements. Accordingly, even information having no relation to each other at all is classified as having the same Hamming distance, and it is highly possible that this may lead to an erroneous determination. Therefore, when the transition-sensitive property reflecting the degree of dispersion and locations of dissimilar elements as explained in the first embodiment is introduced to the distance, the false positive determination rate can be reduced, and more appropriate information can be retrieved at a high speed with a low cost also in the matching of multidimensional arrays such as images.

<Overview of Transition-Sensitive Matrix Metric>

First, an overview of a transition-sensitive matrix metric according to the embodiment of the present invention will be hereinafter explained.

The transition-sensitive matrix metric according to the present embodiment is a matrix metric for determining a distance between two multidimensional arrays. The multidimensional arrays to be compared are arrays of the same dimension, and the arrays have the same size (an upper limit of each dimension) and have symbolic elements which can be quantitatively compared. Two elements are compared to determine dissimilarity between the two elements (element dissimilarity). In general, this is represented by a real number in the range between 0 and 1. In this case, either exact matching method or fuzzy comparison method can be used as the matching method. In the exact matching method, 0 is output for matching, and 1 is output for non-matching. In the fuzzy matching method, a real number in the range between 0 and 1 is output as the element dissimilarity. 0 represents exact match. 1 represents complete unmatch.

The transition-sensitive matrix distance (TMD) is defined as a value obtained by adding a multi-dimensional Hamming distance defined as the sum of the element dissimilarities of the multidimensional arrays to the total cost of transitions, i.e., ascending transitions (in short, ascents) and descending transitions (in short, descents), of the element dissimilarities observed in the multidimensional space.

<Formulation of Transition-Sensitive Matrix Distance>

The transition-sensitive matrix distance (TMD) having the characteristics as described above is formulated as follows.

In the following explanation, a two-dimensional array and a three-dimensional array are used as examples of formulation. However, it is to be understood that this formulation can be extended into a multidimensional array of four or higher dimensions in the same manner.

When two-dimensional arrays X and Y having a size M×N are given, the transition-sensitive matrix distance (TMD) is defined by expression 201 below.

$$TMD(X, Y) = HD(X, Y) + T(X, Y) \quad \text{(Expression 201)}$$

In this case, HD(X, Y) is the Hamming distance between an array X and an array Y in expression 201 above. The HD(X, Y) is defined by expression 202 below.

$$HD(X, Y) = \sum_{i=1}^{M} \sum_{j=1}^{N} d[i, j] \quad \text{(Expression 202)}$$

In the above expression 202, d[i, j] (0≤i≤M, 0≤j≤N) is an element dissimilarity matrix, and is defined by expressions 203 to 206 as follows. In this case, in expression 206 below, X[i, j] and Y[i, j] mean elements at the i-th column and the j-th row of the arrays, X and Y, respectively.

$$d[0, 0] = -1 \quad \text{(Expression 203)}$$

$$d[i, 0] = 1 \ (0 \le i \le M) \quad \text{(Expression 204)}$$

$$d[0, j] = 1 \ (0 \le j \le N) \quad \text{(Expression 205)}$$

$$d[i, j] = d(X[i, j], Y[i, j]) \ (1 \le i \le M, 1 \le j \le N) \quad \text{(Expression 206)}$$

In the above expression 206, d(x, y) is a function for outputting the dissimilarity or the normalized distance between the two elements x and y. The element dissimilarity is represented by a real number in the range between 0 to 1 as shown in expression 207 below.

$$0 \le d(x, y) = |x - y| \le 1 \quad \text{(Expression 207)}$$

In this case, when the element dissimilarity d(x, y) is 0, this means that the element x exactly matches the element y. When the element dissimilarity d(x, y) is 1, this means that the element x does not match the element y at all. The element dissimilarity d(x, x) between the same elements is 0.

The element dissimilarity d(x, y) may be made into a binary value using a threshold value C called a dissimilarity threshold value (dissimilarity threshold) as shown in expression 208 below.

$$d(x, y) = \begin{cases} 0 & (\text{if } |x - y| \le C) \\ 1 & (\text{otherwise}) \end{cases} \quad \text{(Expression 208)}$$

It should be noted that T(X, Y) in expression 201 is the total cost of transitions of element dissimilarities, which is defined as the sum of the total cost of transitions of element dissimilarities in the column representing the parameter i and the total cost of transitions of element dissimilarities in the row representing the parameter j as shown in expression 209 below.

$$T(X, Y) = \sum_{i=1}^{M} \sum_{j=1}^{N} \{t(d[i, j], d[i-1, j], A_1, B_1) + \quad \text{(Expression 209)}$$

$$t(d[i, j], d[i, j-1], A_2, B_2)\}$$

In the above expression 209, a function t(d1, d2, A, B) is a function for outputting a cost (transition cost) for changing from a certain element dissimilarity d1 to a different element dissimilarity d2, and is represented by expression 210 as follows.

$$t(d1, d2, A, B) = \begin{cases} A \cdot (d2 - d1) & (\text{if } 0 \le d1 \le d2) \\ B \cdot (d1 - d2) & (\text{if } 0 \le d2 \le d1) \\ 0 & (\text{otherwise}) \end{cases} \quad \text{(Expression 210)}$$

In the above expression 210, the coefficient A denotes a coefficient representing the cost of the ascending transition, and the coefficient B denotes a coefficient representing the cost of the descending transition. This transition cost is the amount reflecting the concept of entropy.

The ascending transition cost coefficients, $A_1$ and $A_2$, and the descending transition cost coefficients, $B_1$ and $B_2$, satisfy the condition represented by expression 211 below. In this case, in expression 211 below, [x] means the maximum integer not exceeding x.

$$0 \le (M-1) \cdot N \cdot (A_1 + B_1) + M \cdot (N-1) \cdot (A_2 + B_2) \le \left[\frac{M \cdot N}{2}\right]$$ (Expression 211)

When the above four cost coefficients are all the same, the total cost of transitions of element dissimilarities T(X, Y) can be simplified as shown in expression 212 and expression 213 below.

$$0 \le k = A_1 = A_2 = B_1 = B_2 \le \frac{\left[\frac{M \cdot N}{2}\right]}{2(2M \cdot N - M - N)}$$ (Expression 212)

$$T(X, Y) = k \cdot \sum_{i=1}^{M} \sum_{j=1}^{N} (|d[i, j] - d[i-1, j]| + |d[i, j] - d[i, j-1]|)$$ (Expression 213)

When the three-dimensional arrays X and Y having a size M×N×L are given, the transition-sensitive matrix distance (TMD) is defined by expression 251 below.

$$TMD_3(X, Y) = HD_3(X, Y) + T_3(X, Y)$$ (Expression 251)

In this case, $HD_3(X, Y)$ is the Hamming distance between a three-dimensional array X and a three-dimensional array Y in expression 251 above. The $HD_3(X, Y)$ is defined by expression 252 below.

$$HD_3(X, Y) = \sum_{i=1}^{M} \sum_{j=1}^{N} \sum_{k=1}^{L} d[i, j, k]$$ (Expression 252)

In the above expression 252, d[i, j, k] (0≤i≤M, 0≤j≤N, 0≤k≤L) is an element dissimilarity matrix, and is defined by expressions 253 to 257 as follows.

$$d[0, 0, 0] = -1$$ (Expression 253)

$$d[i, 0, 0] = 1 \ (0 \le i \le M)$$ (Expression 254)

$$d[0, j, 0] = 1 \ (0 \le j \le N)$$ (Expression 255)

$$d[0, 0, k] = 1 \ (0 \le k \le L)$$ (Expression 256)

$$d[i, j, k] = d(X[i, j, k], Y[i, j, k]) \ (1 \le i \le M, 1 \le j \le N, 1 \le k \le L)$$ (Expression 257)

It should be noted that $T_3(X, Y)$ in expression 251 is the total cost of transitions of element dissimilarities, which is defined as the sum of the total cost of transitions of element dissimilarities in the column representing the parameter i, the total cost of transitions of element dissimilarities in the row representing the parameter j, and the total cost of transitions of element dissimilarities in the layer representing the parameter k as shown in expression 258 below.

$$T_3(X, Y) = \sum_{i=1}^{M} \sum_{j=1}^{N} \sum_{k=1}^{L} \{t(d[i, j, k], d[i-1, j, k], A_1, B_1) + t(d[i, j, k], d[i, j-1, k], A_2, B_2) + t(d[i, j, k], d[i, j, k-1], A_3, B_3)\}$$ (Expression 258)

In the above expression 258, a function t(d1, d2, A, B) is a function for outputting a cost (transition cost) for changing from a certain element dissimilarity d1 to a different element dissimilarity d2, and is the same as expression 210 above.

As is evident from the comparison of the formulated expressions of the transition-sensitive matrix distances for the two-dimensional array and the three-dimensional array as described above, the transition-sensitive matrix distance calculation method according to the present embodiment can be easily extended into high-dimensional arrays of four or higher dimensions.

<Configuration of Information Processing Apparatus>

The configuration of the information processing apparatus according to the present embodiment is the same as the configuration of the information processing apparatus 10 according to the first embodiment of the present invention as shown in FIG. 3. The calculation performed by the element distance calculation unit 103 is not the calculation of the transition-sensitive string distance but the calculation of the transition-sensitive matrix distance. The detailed description about the configuration of the information processing apparatus according to the present embodiment is omitted in the explanation below.

<Flow of Information Processing Method>

Further, the information processing method according to the present embodiment is performed in the same manner as the flow of the information processing method as shown in the first embodiment of the present invention. Therefore, the detailed explanation thereabout is omitted.

<Specific Example>

Subsequently, the transition-sensitive matrix distance according to the present embodiment will be concretely explained with reference to FIGS. 24 and 25. FIGS. 24 and 25 are explanatory diagrams illustrating an example of a transition-sensitive matrix distance calculation method according to the present embodiment.

First, a case where the transition-sensitive matrix distance according to the present embodiment is applied to a two-dimensional array having the size of 3×3 will be explained with reference to FIG. 24. The example shown in FIG. 24 shows Hamming distances HD and transition-sensitive matrix distances TMD of five different arrays (b) to (f) with respect to an array (a) in which all the elements are 0.

Each of the array (b) and the array (c) has only one dissimilar element, and the Hamming distance HD thereof is 1. However, in the array (b), the dissimilar element is present at the uppermost left corner, whereas in the array (c), the dissimilar element is present in the center. Therefore, different TMD values are calculated for the array (b) and the array (c). On the other hand, the array (d) and the array (e) have five dissimilar elements. In the array (d), four dissimilar elements are blocked at one location, whereas in the array (e), five dissimilar elements are dispersed. Accordingly, the array (d) and the array (e) have different TMD values. It is understood that the TMD of the array (e) is 8.6, which is very close to the distance 9 of the array (f) in which all the elements are different.

FIG. 25 illustrates the transition-sensitive matrix distance according to the present embodiment applied to a three-dimensional array having the size of 3×3×3. The example shown in FIG. 24 shows Hamming distances $HD_3$ and transition-sensitive matrix distances $TMD_3$ of five different arrays (b) to (f) with respect to an array (a) in which all the elements are 0.

Like the two-dimensional array, calculated $TMD_3$ values in the three-dimensional array are different when arrays have dissimilar elements at different spatial positions even if the arrays have the same number of dissimilar elements.

<Example of Application of Transition-Sensitive Matrix Metric>

Figure 26:
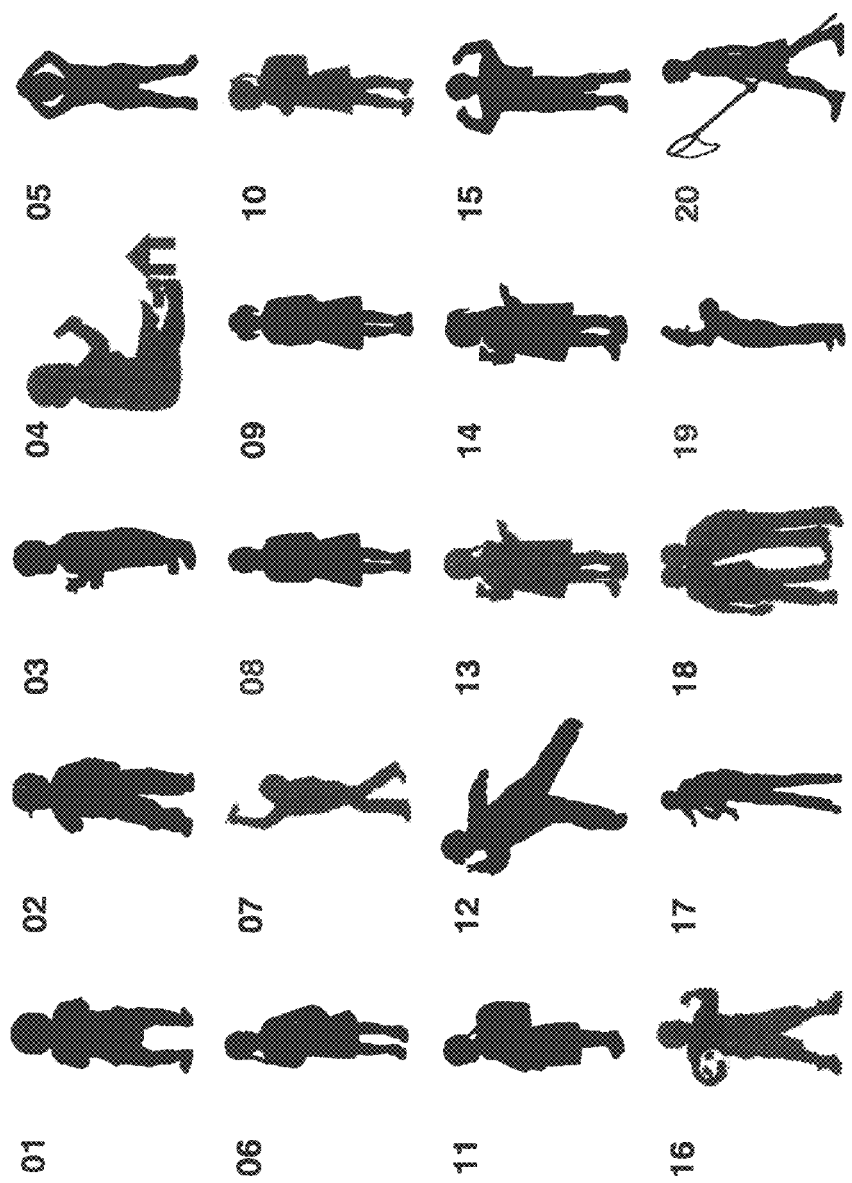
FIG. 26 is a flow diagram illustrating an example of application of the information processing method according to the embodiment.
Figure 28:
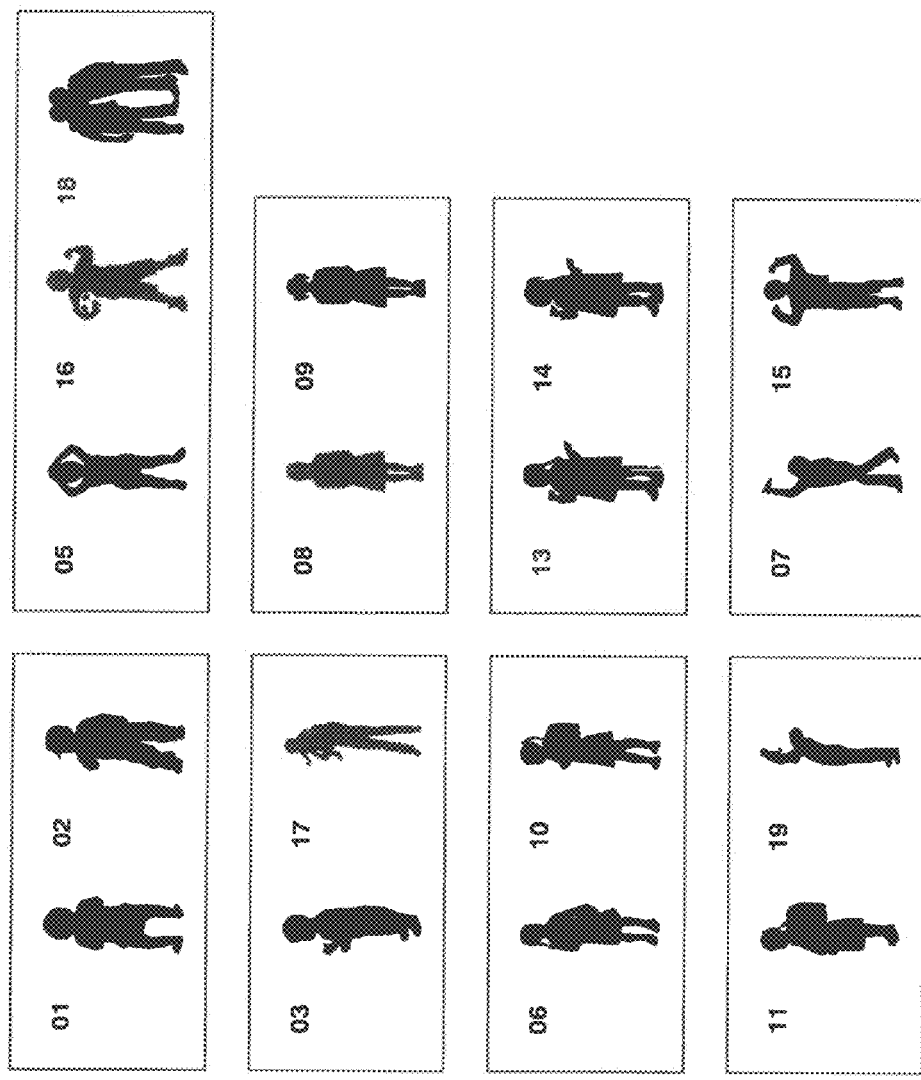
FIG. 28 is an explanatory diagram illustrating a result of application of the information processing method according to the embodiment.

Subsequently, an example of application of the transition-sensitive matrix metric according to the present embodiment will be concretely explained with reference to FIGS. 26 to 28. FIGS. 26 to 28 are explanatory diagrams illustrating an example where the transition-sensitive matrix metric according to the present embodiment is applied to matching and classification processing of two-dimensional image data.

FIG. 26 illustrates 20 kinds of image data S01 to S20. Each piece of image data is represented with a bitmap having 150×150 pixels.

First, a transition-sensitive matrix distance TMD between each pair of the image data is calculated. Thereafter, the calculated matrix distance TMD is normalized by being divided by the size of the array, 150×150=22500, and to obtain a dissimilarity. In this case, the transition cost coefficient is set at $A_1=B_1=A_2=B_2=\text{floor}(150\times150/2)/(2\times(2\times150\times150-150-150))=2.222\times10^{-5}$. The dissimilarity is calculated for all the combinations of the image data.

Subsequently, as shown in FIG. 27, a column having the maximum dissimilarity is adopted as the vertical and horizontal axes, and the array is sorted in the ascending order, so that similar groups (i.e., having the closest distance) are extracted. In this case, the dissimilarity array as shown in FIG. 27 is symmetrical with respect to the diagonal line (0.00) from the upper left corner representing self-homology to the lower right corner.

The extracted groups are shown in FIG. 28. As is evident from FIG. 28, image data in which the calculated distances are close to each other have similar external shapes.

In the example explained above, the transition-sensitive matrix metrics are calculated using the multidimensional arrays in question without processing the multidimensional arrays. Alternatively, like the case shown with the transition-sensitive string distance metrics shown in the first embodiment, the multidimensional array in question may be divided into a plurality of processing blocks, and the transition-sensitive matrix metric may be calculated in a recursive manner.

As described above, as compared with the Hamming distance (HD) in the related art, the transition-sensitive matrix distance according to the present embodiment can determine a highly-accurate distance at a low cost with almost the same amount of calculation even though only a minor calculation resource is added, and the transition-sensitive matrix distance according to the present embodiment can even distinguish multidimensional arrays which are determined to have the same distance by the Hamming distance in the related art.

(Hardware Configuration)

Figure 29:
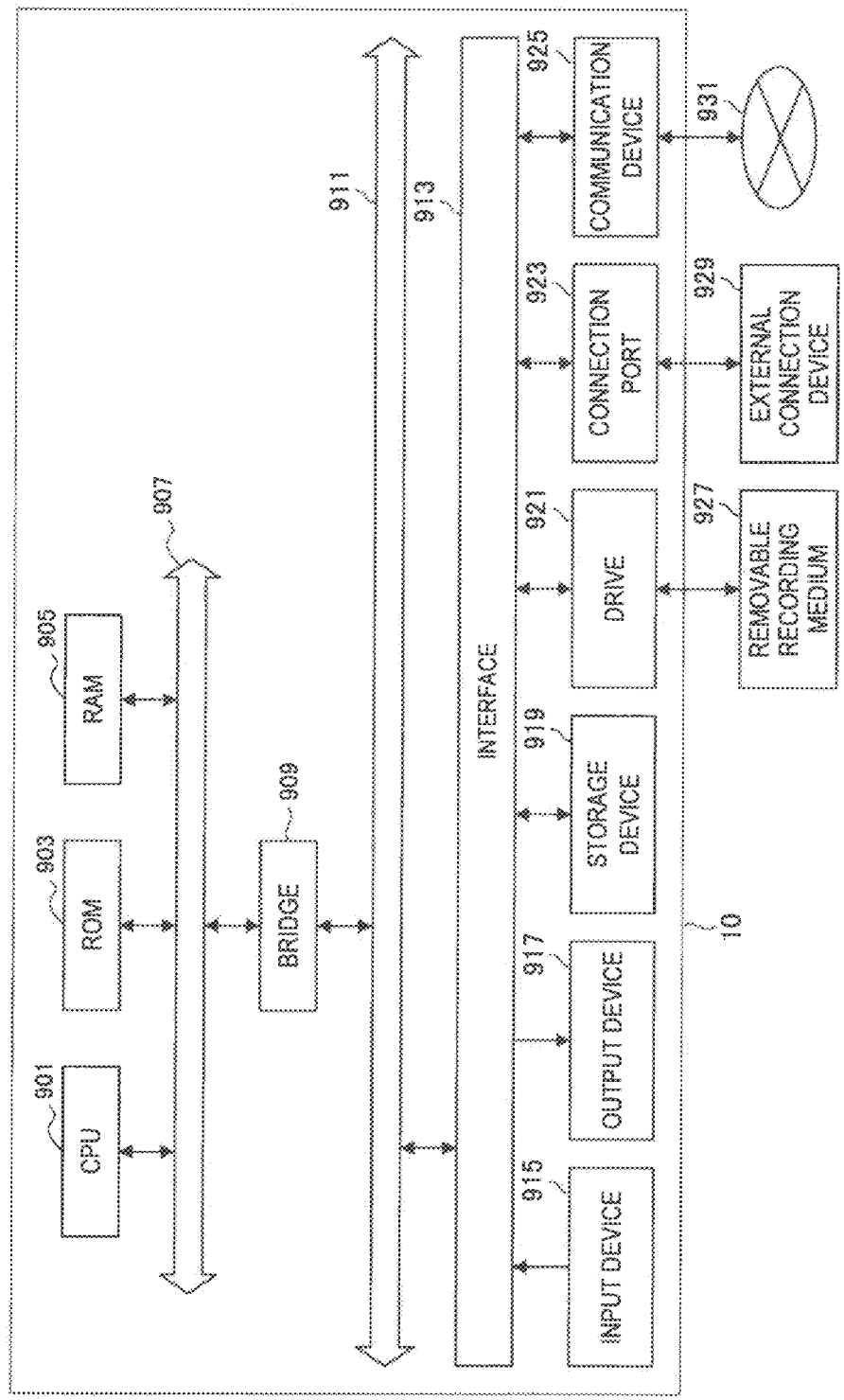
FIG. 29 is a block diagram illustrating a hardware configuration of the information processing apparatus according to the embodiment of the present invention.

Next, the hardware configuration of the information processing apparatus 10 according to the embodiment of the present invention will be described in detail with reference to FIG. 29. FIG. 29 is a block diagram for illustrating the hardware configuration of the information processing apparatus 10 according to the embodiment of the present invention.

The information processing apparatus 10 mainly includes a CPU 901, a ROM 903, and a RAM 905. Furthermore, the information processing apparatus 10 also includes a host bus 907, a bridge 909, an external bus 911, an interface 913, an input device 915, an output device 917, a storage device 919, a drive 921, a connection port 923, and a communication device 925.

The CPU 901 serves as an arithmetic processing apparatus and a control device, and controls the overall operation or a part of the operation of the information processing apparatus 10 according to various programs recorded in the ROM 903, the RAM 905, the storage device 919, or a removable recording medium 927. The ROM 903 stores programs, operation parameters, and the like used by the CPU 901. The RAM 905 primarily stores programs that the CPU 901 uses and parameters and the like varying as appropriate during the execution of the programs. These are connected with each other via the host bus 907 configured from an internal bus such as a CPU bus or the like.

The host bus 907 is connected to the external bus 911 such as a PCI (Peripheral Component Interconnect/Interface) bus via the bridge 909.

The input device 915 is an operation means operated by a user, such as a mouse, a keyboard, a touch panel, buttons, a switch and a lever. Also, the input device 915 may be a remote control means (a so-called remote control) using, for example, infrared light or other radio waves, or may be an externally connected device 929 such as a mobile phone or a PDA conforming to the operation of the information processing apparatus 10. Furthermore, the input device 915 generates an input signal based on, for example, information which is input by a user with the above operation means, and is configured from an input control circuit for outputting the input signal to the CPU 901. The user of the information processing apparatus 10 can input various data to the information processing apparatus 10 and can instruct the information processing apparatus 10 to perform processing by operating this input apparatus 915.

The output device 917 is configured from a device capable of visually or audibly notifying acquired information to a user. Examples of such device include display devices such as a CRT display device, a liquid crystal display device, a plasma display device, an EL display device and lamps, audio output devices such as a speaker and a headphone, a printer, a mobile phone, a facsimile machine, and the like. For example, the output device 917 outputs a result obtained by various processings performed by the information processing apparatus 10. More specifically, the display device displays, in the form of texts or images, a result obtained by various processes performed by the information processing apparatus 10. On the other hand, the audio output device converts an audio signal such as reproduced audio data and sound data into an analog signal, and outputs the analog signal.

The storage device 919 is a device for storing data configured as an example of a storage unit of the information processing apparatus 10 and is used to store data. The storage device 919 is configured from, for example, a magnetic storage device such as a HDD (Hard Disk Drive), a semiconductor storage device, an optical storage device, or a magneto-optical storage device. This storage device 919 stores programs to be executed by the CPU 901, various data, and acoustic signal data or image signal data, or the like, obtained from externally.

The drive 921 is a reader/writer for recording medium, and is embedded in the information processing apparatus 10 or attached externally thereto. The drive 921 reads information recorded in the attached removable recording medium 927 such as a magnetic disk, an optical disk, a magneto-optical disk, or a semiconductor memory, and outputs the read information to the RAM 905. Furthermore, the drive 921 can write in the attached removable recording medium 927 such as a magnetic disk, an optical disk, a magneto-optical disk, or a semiconductor memory. The removable recording medium 927 is, for example, a DVD medium, an HD-DVD medium, or a Blu-ray medium. The removable recording medium 927 may be a CompactFlash (CF; registered trademark), a flash memory, an SD memory card (Secure Digital Memory Card), or the like. Alternatively, the removable recording medium 927 may be, for example, an IC card (Integrated Circuit Card) equipped with a non-contact IC chip or an electronic appliance.

The connection port 923 is a port for allowing devices to directly connect to the information processing apparatus 10. Examples of the connection port 923 include a USB (Universal Serial Bus) port, an IEEE1394 port, a SCSI (Small Computer System Interface) port, and the like. Other examples of the connection port 923 include an RS-232C port, an optical audio terminal, an HDMI (High-Definition Multimedia Interface) port, and the like. By the externally connected apparatus 929 connecting to this connection port 923, the information processing apparatus 10 directly obtains acoustic signal data or image signal data from the externally connected apparatus 929 and provides acoustic signal data or image signal data to the externally connected apparatus 929.

The communication device 925 is a communication interface configured from, for example, a communication device for connecting to a communication network 931. The communication device 925 is, for example, a wired or wireless LAN (Local Area Network), Bluetooth (registered trademark), a communication card for WUSB (Wireless USB), or the like. Alternatively, the communication device 925 may be a router for optical communication, a router for ADSL (Asymmetric Digital Subscriber Line), a modem for various communications, or the like. This communication device 925 can transmit and receive signals and the like in accordance with a predetermined protocol such as TCP/IP on the Internet and with other communication devices, for example. The communication network 931 connected to the communication device 925 is configured from a network and the like, which is connected via wire or wirelessly, and may be, for example, the Internet, a home LAN, infrared communication, radio wave communication, satellite communication Heretofore, an example of the hardware configuration capable of realizing the functions of the information processing apparatus 10 according to the embodiment of the present invention has been shown. Each of the structural elements described above may be configured using a general-purpose material, or may be configured from hardware dedicated to the function of each structural element. Accordingly, the hardware configuration to be used can be changed as appropriate according to the technical level at the time of carrying out the present embodiment.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2010-117259 filed in the Japan Patent Office on May 21, 2010, the entire content of which is hereby incorporated by reference.

What is claimed is:

1. An information processing apparatus comprising:
a data retrieval unit that obtains at least two element data;
a dissimilarity calculation unit that calculates a dissimilarity between the at least two element data obtained by the data retrieval unit;
a transition cost calculation unit, including a processor, that calculates a cost of transition from one of the at least two element data obtained by the data retrieval unit to another of the at least two element data which is different from the one of the at least two element data based on the dissimilarity calculated by the dissimilarity calculation unit and at least two transition cost coefficients; and
a distance calculation unit that calculates an element distance representing a degree of dissimilarity between the at least two element data by using the dissimilarity calculated by the dissimilarity calculation unit and the cost calculated by the transition cost calculation unit,
wherein when the transition is from a dissimilarity having a small value to a dissimilarity having a relatively large value, the transition cost calculation unit calculates a first transition cost based on a first transition cost coefficient, and when the transition is from a dissimilarity having a large value to a dissimilarity having a relatively small value, the transition cost calculation unit calculates a second transition cost based on a second transition cost coefficient.

2. The information processing apparatus according to claim 1, wherein the distance calculation unit calculates a sum of a dissimilarity calculated by the dissimilarity calculation unit and the first transition cost and the second transition cost calculated by the transition cost calculation unit, and adopts the sum as the element distance.

3. The information processing apparatus according to claim 1, further comprising:
a data preprocessing unit for performing a predetermined preprocessing on the at least two element data obtained by the data retrieval unit.

4. The information processing apparatus according to claim 3,
wherein when the at least two element data are structured data, the data preprocessing unit divides the structured data into a plurality of structured elements, and the dissimilarity calculation unit, the transition cost calculation unit, and the distance calculation unit perform the processing on each of the structured elements.

5. The information processing apparatus according to claim 4,
wherein the structured data include codes in a structured program language.

6. The information processing apparatus according to claim 1,
wherein the first and second transition cost coefficients satisfy a condition that a sum of the first and second transition cost coefficient is equal to or greater than zero and equal to or less than one.

7. The information processing apparatus according to claim 1,
wherein the dissimilarity calculated by the dissimilarity calculation unit is a real number that is equal to or greater than zero and equal to or less than one.

8. The information processing apparatus according to claim 1,
wherein the dissimilarity calculated by the dissimilarity calculation unit is a binary number.

9. The information processing apparatus according to claim 8,
wherein the dissimilarity calculated by the dissimilarity calculation unit is either zero or one.

10. The information processing apparatus according to claim 1,
wherein the at least two element data include a plurality of characters or numbers.

11. The information processing apparatus according to claim 1,
wherein when a transition occurs from a first element data with a first dissimilarity to a second element data with a second dissimilarity, the transition cost calculation unit calculates a cost of transition according to the formula:

$$t(d1, d2, A, B) = \begin{cases} A \cdot (d2 - d1) & (\text{if } 0 \le d1 \le d2) \\ B \cdot (d1 - d2) & (\text{if } 0 \le d2 \le d1) \\ 0 & (\text{otherwise}) \end{cases}$$

wherein:
t is a cost of transition;
d1 is a first dissimilarity;
d2 is a second dissimilarity;
A is a first transition cost coefficient; and
B is a second transition cost coefficient.

12. The information processing apparatus according to claim 11,
wherein the first transition cost coefficient and second transition cost coefficientsatisfy the following condition: $0 \le A+B \le 1$.

13. An information processing method comprising the steps of:
obtaining at least two element data;
calculating a dissimilarity between the at least two element data;
calculating a cost of transition, using a processor, from one of the at least two element data to another of the at least two element data which is different from the one of the at least two element data based on the calculated dissimilarity and at least two transition cost coefficients; and
calculating an element distance representing a degree of dissimilarity between the at least two element data by using the calculated dissimilarity and the calculated transition cost,
wherein when the transition is from a dissimilarity having a small value to a dissimilarity having a relatively large value, the transition cost calculation unit calculates a first transition cost based on a first transition cost coefficient, and when the transition is from a dissimilarity having a large value to a dissimilarity having a relatively small value, the transition cost calculation unit calculates a second transition cost based on a second transition cost coefficient.

14. A non-transitory computer readable medium including computer program instructions that cause a processor to execute a method of processing information, the method comprising:
obtaining at least two element data;
calculating a dissimilarity between the at least two element data;
calculating a cost of transition from one of the at least two element data to another of the at least two element data which is different from the one of the at least two element data based on the calculated dissimilarity and at least two transition cost coefficients; and
calculating an element distance representing a degree of dissimilarity between the at least two element data by using the calculated dissimilarity and the calculated transition cost,
wherein when the transition is from a dissimilarity having a small value to a dissimilarity having a relatively large value, the transition cost calculation unit calculates a first transition cost based on a first transition cost coefficient, and when the transition is from a dissimilarity having a large value to a dissimilarity having a relatively small value, the transition cost calculation unit calculates a second transition cost based on a second transition cost coefficient.

* * * * *